US008592071B2

United States Patent
Usami et al.

(10) Patent No.: US 8,592,071 B2
(45) Date of Patent: Nov. 26, 2013

(54) LAMINATED POROUS FILM AND SEPARATOR FOR BATTERY

(75) Inventors: Yasushi Usami, Shiga (JP); Takeyoshi Yamada, Shiga (JP); Jun Takagi, Shiga (JP)

(73) Assignee: Mitsubishi Plastics, Inc., Tokyo (JP)

( * ) Notice: Subject to any disclaimer, the term of this patent is extended or adjusted under 35 U.S.C. 154(b) by 745 days.

(21) Appl. No.: 12/713,654

(22) Filed: Feb. 26, 2010

(65) Prior Publication Data

US 2011/0212358 A1 Sep. 1, 2011

(51) Int. Cl.
*H01M 2/16* (2006.01)
*B32B 3/00* (2006.01)

(52) U.S. Cl.
USPC ........................................ 429/144; 428/316.6

(58) Field of Classification Search
USPC .......................................................... 429/144
See application file for complete search history.

(56) References Cited

U.S. PATENT DOCUMENTS

2009/0219672 A1* 9/2009 Masuda et al. ................ 361/502

FOREIGN PATENT DOCUMENTS

| JP | 63-199742 | 8/1988 |
|---|---|---|
| JP | 6-84450 | 3/1994 |
| JP | 2509030 | 4/1996 |
| JP | 8-250097 | 9/1996 |
| JP | 9-255804 | 9/1997 |
| JP | 2883726 | 2/1999 |
| JP | 2000-30683 | 1/2000 |
| JP | 3523404 | 2/2004 |
| JP | 2005-171230 A | 6/2005 |
| JP | 2007-3975 | 1/2007 |
| JP | 2008-307890 | 12/2008 |
| JP | 2008-311220 | 12/2008 |
| WO | WO 2005/103127 A1 | 11/2005 |
| WO | WO 2006/038532 A1 | 4/2006 |
| WO | WO 2007/046226 A1 | 4/2007 |

OTHER PUBLICATIONS

Machine translation of JP 08-250097.*
U.S. Appl. No. 13/378,107, filed Dec. 14, 2011, Yamada et al.
Japanese Office Action issued Jan. 31, 2012, in Patent Application No. 2007-211919.
Japanese Office Action issued Oct. 18, 2011, in Patent Application No. 2007-211895.
Japanese Office Action issued Oct. 18, 2011, in Patent Application No. 2007-211909.
Japanese Office Action issued Oct. 2, 2012, in Japan patent application No. 2007-211909.
U.S. Appl. No. 13/213,122, filed Aug. 19, 2011, Usami et al.
Japanese Office Action Issued Mar. 5, 2013 in Patent Application No. 2012-084160.

* cited by examiner

*Primary Examiner* — Maria J Laios
(74) *Attorney, Agent, or Firm* — Oblon, Spivak, McClelland, Maier & Neustadt, L.L.P.

(57) ABSTRACT

A laminated porous film having at least two porous layers layered one upon another. One porous layer consists of a resin layer containing a polypropylene resin. The other layer is a heat-resistant layer consisting of a resin composition whose crystal fusion peak temperature is higher than that of the resin composition of the layer containing the polypropylene resin. The laminated porous film has a β activity and/or a β crystal generation power.

10 Claims, 2 Drawing Sheets

LAMINATED POROUS FILM AND SEPARATOR FOR BATTERY

BACKGROUND OF THE INVENTION

1. Field of the Invention

The present invention relates to a laminated porous film and more particularly to a laminated porous film which can be utilized as packing, hygiene, livestock, agricultural, building, medical products, separation films, light diffusing plates, separators for batteries and preferably utilized as separators for nonaqueous electrolyte secondary batteries.

2. Description of the Related Art

A secondary battery is widely used as the power source of OA, FA, household appliances, and portable devices such as communication instruments. The secondary battery has a favorable volumetric efficiency when it is mounted on devices and allows the devices to be compact and lightweight. Therefore there is an increase in the use of portable devices in which a lithium-ion rechargeable battery is mounted. Owing to research and development of a large secondary battery which have been made in many fields relating to the problem of energy and environment such as load leveling, UPS, an electric car, and the like, the secondary battery is allowed to have a large capacity, a high output, a high voltage, and an excellent long-term storage stability. Therefore the lithium-ion rechargeable battery which is a kind of the nonaqueous electrolyte secondary battery has widely spread in its use.

The upper limit of the working voltage of the lithium-ion rechargeable battery is usually set to 4.1V to 4.2V. Because electrolysis occurs in an aqueous solution at such a high voltage, the aqueous solution cannot be used as an electrolyte. Therefore as an electrolyte capable of withstanding a high voltage, a so-called nonaqueous electrolyte in which an organic solvent is used is adopted.

As a solvent for the nonaqueous electrolyte, an organic solvent having a high permittivity which allows a large number of lithium ions to be present is widely used. Organic carbonate ester such as polypropylene carbonate or ethylene carbonate is mainly used as the organic solvent having a high permittivity. As a supporting electrolyte serving as the ion source of the lithium ion in the solvent, an electrolyte having a high reactivity such as lithium phosphate hexafluoride is used in the solvent by melting it.

A separator is interposed between the positive electrode of the lithium-ion rechargeable battery and its negative electrode to prevent an internal short circuit from occurring. Needless to say, the separator is demanded to have insulating performance as its role. In addition the separator is required to have a porous structure so that it has air permeability to allow the movement of the lithium ion and a function of diffusing and holding the electrolyte. To satisfy these demands, a porous film is used as the separator.

Because batteries having a high capacity are used recently, the degree of importance for the safety of the battery has increased.

A shut-down characteristic (hereinafter referred to as SD characteristic) contributes to the safety of the separator for the battery. The SD characteristic has a function of closing fine pores when the battery has a high temperature of 100° C. to 150° C. As a result, the ion conduction inside the battery is cut off. Thereby it is possible to prevent the temperature inside the battery from rising. To use the porous film as the separator for the battery, it is necessary for the battery to have the SD characteristic.

As other characteristic contributing to the safety of the separator for the battery, a break-down characteristic (hereinafter referred to as BD characteristic) is used. The BD characteristic has a function of preventing the film from being broken and keeping separating the positive pole and the negative pole from each other even when the battery becomes abnormal in its operation and has thermo runaway that the temperature of the battery becomes not less than 200° C. The BD characteristic allows insulation to be maintained even at a high temperature and prevents a wide range of short circuit from occurring between the electrodes, thereby preventing the occurrence of an accident such as firing caused by an abnormal heat generation of the battery. Therefore to use the porous film as the separator for the battery, it is preferable for the battery to have the BD characteristic. It is also preferable that the break-down characteristic indicating a lowest temperature at which the separator is broken is as high as possible.

In the method of producing the separator for the battery disclosed in U.S. Pat. No. 2,883,726 (patent document 1), the film consisting of polyethylene and polypropylene layered one upon another is made porous by stretching the film in one axial direction at two stages by changing temperature.

The separator produced by the above-described method contains the polypropylene layer whose crystal fusion peak temperature is higher than that of a conventional separator consisting of a monolayer of the polyethylene. Thus the separator is heat-resistant and is thus advantageous because the separator has a high BD characteristic. But with a recent high energy density of the battery, the polypropylene is insufficient in its heat resistance. The separator is demanded to display the BD characteristic at high temperatures.

In addition the separator produced by the above-described method has a problem in its strength. Specifically the separator is weak when it is torn in the same direction as a stretching direction. That is, the separator is liable to crack in the stretching direction.

The above-described production method has also a problem that a strict control is required for the production conditions and thus the productivity is unpreferable.

In Examined Japanese Patent Application Nos. 6-84450 (patent document 2) and U.S. Pat. No. 2,509,030 (patent document 3), to enhance the transparency of the porous film, there are proposed methods for obtaining the porous film by stretching the propylene sheet containing much β crystal which is one of the crystalline morphology.

But the porous film consisting of the polypropylene is insufficient in its heat resistance. Thus there is a demand for the development of a film capable of displaying the BD characteristic at a higher temperature.

Patent document 1: U.S. Pat. No. 2,883,726
Patent document 2: Examined Japanese Patent Application Laid-Open No. 6-84450
Patent document 3: U.S. Pat. No. 2,509,030

SUMMARY OF THE INVENTION

The present invention has been made in view of the above-described problem. Therefore it is an object of the present invention to provide a laminated porous film which ensures a porous structure having a sufficient intercommunicable performance and yet maintains an intended strength and is capable of displaying a break-down characteristic (BD characteristic) superior to those of a conventional porous film consisting of polypropylene.

To solve the above-described problem, as the first invention, there is provided a laminated porous film having at least two porous layers consisting of a first layer and a second layer laminated one upon another. The first layer contains a polypropylene resin. The second layer is a heat-resistant layer consisting of a resin composition whose crystal fusion peak temperature is higher than that of a resin composition of the first layer. The laminated porous film has a β activity and/or a β crystal generation power.

In the laminated porous film of the present invention, the first layer contains the polypropylene resin (A); and the second layer is formed as the heat-resistant layer consisting of the resin composition whose crystal fusion peak temperature is higher than that of the resin composition of the first layer.

The second layer formed as the heat-resistant layer consists of the resin composition whose crystal fusion peak temperature is higher than that of the resin composition of the first layer so that the second layer has a high break-down temperature to allow the second layer to have an excellent break-down characteristic (BD characteristic).

In the present invention, the "break-down temperature" means the lowest temperature at which the laminated porous film breaks. Specifically the "break-down temperature" means the lowest temperature at which the laminated porous film breaks when it is heated by using a method described in the examples of the present invention.

As the second invention, there is provided at least two porous layers consisting of a first layer and a second layer laminated one upon another. The first layer contains a polypropylene resin. The second layer is a heat-resistant layer consisting of a resin composition containing a filler. The laminated porous film has a β activity and/or a β crystal generation power.

That is, the heat-resistant second layer is the layer consisting of a resin composition containing the filler. By so doing, the second layer is provided with heat resistance and can be easily formed as the porous layer by using the filler. It is preferable that similarly to the first invention, the second layer containing the filler is composed of the resin composition having a higher crystal fusion peak temperature than that of the resin composition of the first layer.

Because the laminated porous films of the first and second inventions have the β activity and/or the β crystal generation power, it is possible to form the layers having fine pores formed therein. Thereby the laminated porous films of the first and second inventions are capable of displaying an excellent air permeability characteristic.

Whether the laminated porous film has the β activity is judged according to whether the crystal fusion peak temperature derived from the β crystal is detected by performing a differential thermal analysis of the laminated porous film with a differential scanning calorimeter.

Whether the laminated porous film has the β crystal generation power is judged according to whether a diffraction peak derived from the β crystal is detected by measuring the β crystal generation power with an X-ray analyzer.

The β activity and/or the β crystal generation power are measured in the form of the laminated porous film when the laminated porous film of the present invention consists of the layer containing the polypropylene resin and the heat-resistant layer and when other porous layers are laminated on the first and second layers.

It is preferable that the β crystal nucleating agent is contained in the resin composition of the layer containing the polypropylene resin or added to the polypropylene resin so that the layer or the polypropylene resin has the β activity and/or the β crystal generation power.

It is preferable that the β crystal nucleating agent is mixed with the polypropylene resin at a ratio of 0.0001 to 5.0 parts by mass to 100 parts by mass of the polypropylene resin.

In the first and second invention, it is preferable that the second layer formed as the heat-resistant layer is made of a composition consisting of a mixed resin of the polypropylene resin and a thermoplastic resin (B) whose crystal fusion peak temperature is not less than 170° C. and that in the first layer, the mixing ratio of the thermoplastic resin (B) is set lower than that in the second layer or the thermoplastic resin (B) is not mixed with the polypropylene resin.

The "thermoplastic resin whose crystal fusion peak temperature is not less than 170° C." means a resin different from the polypropylene resin. The detected peak value of the crystal fusion temperature of the resin is not less than 170° C. when the resin is heated from 25° C. to 400° C. at a heating speed of 10° C./minute in accordance with JIS k7121 by using a differential scanning calorimeter.

The upper limit value of the crystal fusion peak temperature of the thermoplastic resin (B) whose crystal fusion peak temperature is not less than 170° C. is 350° C., although the upper limit thereof is not limited to a specific value.

It is preferable to set the mixing mass ratio of the polypropylene resin (A) to the thermoplastic resin (B) whose crystal fusion peak temperature is not less than 170° C. to 10 to 90/90 to 10.

It is preferable that the thermoplastic resin (B) whose crystal fusion peak temperature is not less than 170° C. consists of at least one kind of a resin selected from among a group of a polyester resin, a polystyrene resin, a fluorine resin, and a polymethylpentene resin.

It is preferable that the heat-resistant layer (HR layer) composing the second layer contains the thermoplastic resin whose crystal fusion peak temperature is not less than 200° C. and that the break-down temperature at which the second layer breaks is not less than 200° C. It is also preferable that the crystal fusion peak temperature of the thermoplastic resin of the second layer is not more than 400° C., although the upper limit of the crystal fusion peak temperature thereof is not limited to a specific temperature.

"Thermoplastic resin whose crystal fusion peak temperature is not less than 200° C." means a resin different from the polypropylene resin. The detected peak value of the crystal fusion temperature of the resin is not less than 200° C. when the resin is heated from 25° C. to 400° C. at a heating speed of 10° C./minute in accordance with JIS k7121 by using a differential scanning calorimeter.

Similarly to the thermoplastic resin (B) whose crystal fusion peak temperature is not less than 170° C., it is preferable that the thermoplastic resin (B) whose crystal fusion peak temperature is not less than 200° C. consists of at least one kind of a resin selected from among the group of the polyester resin, the polystyrene resin, the fluorine resin, and the polymethylpentene resin.

It is preferable that the first layer consists of a composition containing a mixed resin of the polypropylene resin and a resin whose crystal fusion peak temperature is lower than that of the polypropylene resin and is not less than 100° C.

The crystal fusion peak temperature of the composition of the first layer is set lower than that of the composition of the second layer. A shut-down temperature at which pores of the first layer are closed is set to a range more than 100° C. and not more than 160° C.

In the present invention, the "shut-down temperature" means the lowest temperature at which fine pores of the laminated porous film are closed. Specifically the "shut-down temperature" means the lowest temperature at which the air permeability resistance after the laminated porous film is heated becomes 10 times larger than the air permeability resistance before it is heated, when it is heated by using a method described in the examples of the present invention.

The first layer contains the polypropylene resin and the resin (C) whose crystal fusion peak temperature is lower than that of the polypropylene resin and not less than 100° C. Therefore the crystal fusion peak temperature of the laminated porous film of the present invention is lower than that of the conventional porous film consisting of polypropylene. Thus when the laminated porous film is used as the separator for a battery, as described above, the first layer is capable of displaying the shut-down characteristic in a proper temperature range of more than 100° C. and not more than 160° C.

On the other hand, because the second layer consists of the composition containing the resin whose crystal fusion peak temperature is higher than that of the polypropylene resin, the second layer is capable of displaying the shut-down characteristic in a temperature range higher than a temperature range in which the conventional porous film consisting of the propylene displays the shut-down characteristic.

The present invention provides the laminated porous film excellent in the shut-down characteristic and the break-down characteristic by combining the first layer having the shut-down characteristic in the temperature range lower than a temperature range in which the conventional porous film consisting of the polypropylene resin displays the shut-down characteristic with the second layer which displays the break-down characteristic in the temperature range higher than a temperature range in which the conventional porous film consisting of the polypropylene resin displays the break-down characteristic.

"The resin (C) whose crystal fusion peak temperature is lower than that of the polypropylene resin and is not less than 100° C." means a resin different from the polypropylene resin. When the resin is heated from 25° C. to 240° C. at a heating speed of 10° C./minute by using the differential scanning calorimeter, the resin has the crystal fusion peak temperature in a temperature range which is lower than that of the polypropylene resin (A) and is not less than 100° C.

It is preferable that the crystal fusion peak temperature of the resin (C) whose crystal fusion peak temperature is lower than that of the polypropylene resin is not less than 100° C. nor more 150° C. By setting the crystal fusion peak temperature of the resin (C) to the above-described temperature range, the battery separator consisting of the laminated porous film is capable of displaying the shut-down characteristic in an especially suitable temperature range.

The laminated porous film of the present invention may include a third layer which is layered on the first and second layers. It is preferable that the third layer consists of a composition whose crystal fusion peak temperature is lower than the crystal fusion peak temperature of the composition of the first layer.

Specifically the laminated porous film has the porous first through third layers. The first and second layers have structures similar to those of the first and second layers of the laminated porous film of the second invention. The first layer consists of a composition containing the polypropylene resin. The second layer is formed as a heat-resistant layer consisting of a composition having a peak value of its crystal fusion temperature higher than a peak value of the crystal fusion temperature of the composition of the first layer or formed as a heat-resistant layer consisting of a filler-containing resin composition. The third layer consists of a composition having a peak value of the crystal fusion temperature lower than a peak value of the crystal fusion temperature of the composition of the first layer. Similarly to the above-described embodiments, the laminated porous film has the β activity and/or the β crystal generation power.

In the laminated porous film of the three-layer construction, because the first layer consists of the composition containing the polypropylene resin, the first layer is capable of providing the laminated porous film with a necessary strength. The second layer is capable of providing the laminated porous film with a heat resistance. The third layer consists of the composition having a peak value of the crystal fusion temperature lower than a peak value of the crystal fusion temperature of the composition of the first layer. Therefore the third layer is capable of closing pores thereof at a temperature lower than the temperature at which the first layer closes pores thereof.

It is preferable that the third layer contains a thermoplastic resin whose crystal fusion peak temperature is not less than 100° C. nor more than 150° C. and is formed as a shut-down layer having a function of closing pores at not less than 100° C. nor more than 150° C.

The thermoplastic resin (C) whose crystal fusion peak temperature is not less than 100° C. nor more than 150° C. is similar to the thermoplastic resin whose crystal fusion peak temperature is not less than 100° C. nor more than 150° C. That is, when the thermoplastic resin is heated from 25° C. to 240° C. at the heating speed of 10° C./minute by using the differential scanning calorimeter, the detected peak value of the crystal fusion temperature of thermoplastic resin is not less than 100° C. nor more than 150° C. The polypropylene resin is suitable as the thermoplastic resin (C).

It is preferable that an air permeability resistance of the laminated porous film of the present invention is 1 to 10000 seconds/100 ml, when the air permeability resistance is measured in accordance with JIS P8117.

It is preferable that a pin puncture strength of the laminated porous film is not less than 1.5N when it is measured in conditions in which the diameter of a pin is 1.0 mm, the leading end thereof is 0.5 R, and a pin puncture strength is 300 mm/minute in accordance with Official Japan Agricultural Standard No. 1019.

The present invention provides a separator for a battery consisting of the laminated porous film of the present invention and having an air permeability resistance of 5 to 3000 seconds/100 ml, when the air permeability resistance is measured in accordance with JIS P8117.

The present invention also provides a battery in which the separator is incorporated.

Effect of the Invention

The laminated porous film of the present invention has at least the porous first layer and the second porous layer laminated one upon another. The porous first layer contains the polypropylene resin (A). The second layer is the heat-resistant layer (HR layer) consisting of the resin composition whose crystal fusion peak temperature is higher than that of the resin composition of the first layer or the filler-containing heat-resistant layer. The laminated porous film has the β activity and/or the β crystal generation power. Therefore the laminated porous film has the break-down temperature higher than that of a conventional porous film consisting of polypropylene and the BD characteristic superior to that of the conventional porous film consisting of the polypropylene.

Because the laminated porous film of the present invention has the β activity and/or the β crystal generation power, it has fine pores and ensures a sufficient intercommunicable performance. The first layer retains the intended strength. Therefore the laminated porous film is excellent in its mechanical strength such as its pin puncture strength and tear strength and is useful as the separator for a battery.

In addition the laminated porous film of the present invention eliminates the need for a strict control of production conditions and can be produced simply and efficiently.

In the laminated porous film of the present invention, because the first layer consists of the composition containing the mixed resin of the polypropylene resin (A) and the resin (C) whose crystal fusion peak temperature is lower than that of the polypropylene resin and is not less than 100° C., the laminated porous film is capable of displaying an excellent shut-down characteristic in a suitable temperature range when it is used as the battery separator.

When the laminated porous film of the present invention has the three-layer construction having the first layer through the third layer containing the resin (C) whose crystal fusion peak temperature is not less than 100° C. nor more than 150° C., the first layer retains the strength, the second layer provides the break-down characteristic thereto, and the third layer provides the shut-down characteristic.

DETAILED DESCRIPTION OF THE PREFERRED EMBODIMENTS

Figure 1:
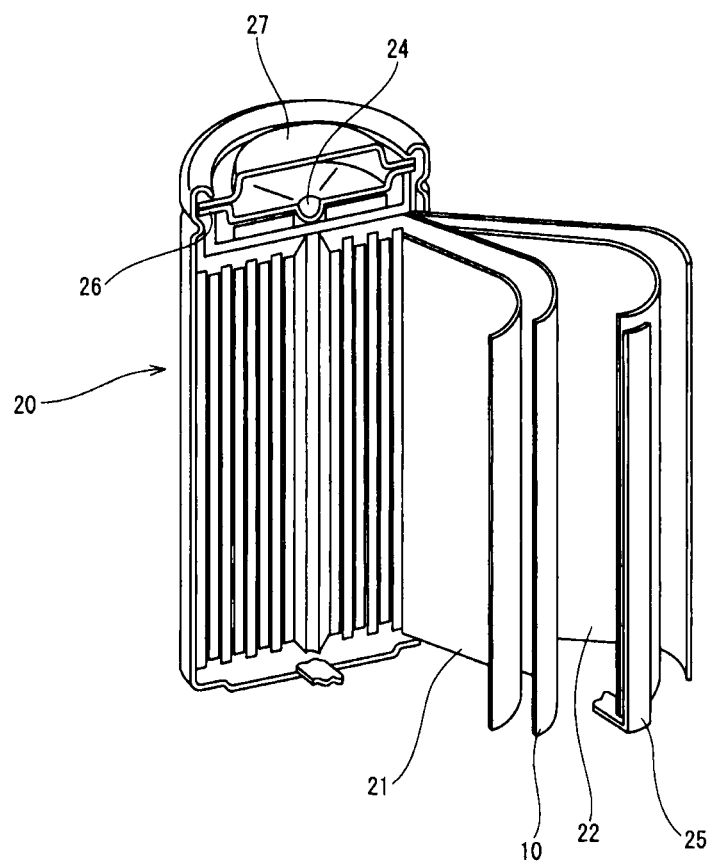
FIG. 1 is a partly cut-out perspective view showing a non-aqueous electrolyte battery accommodating a laminated porous film of the present invention as a battery separator.

The first embodiment of the laminated porous film of the present invention is described in detail below.

The laminated porous film of the first embodiment consists of a porous first layer and a porous second layer laminated one upon another. The first layer is the layer containing a polypropylene resin. The second layer is formed as a heat-resistant layer (HR layer) consisting of a resin composition having α crystal fusion peak temperature higher than that of the resin composition of the first layer. The laminated porous film has a β activity and/or a β crystal generation power.

An important characteristic of the laminated porous film of the present invention is that it has the β activity and/or the β crystal generation power. The β activity and the β crystal generation power can be considered as an index indicating that polypropylene in a membrane material generates the β crystal before the membrane material is stretched. When the polypropylene in the membrane material generates the β crystal before the membrane material is stretched, fine pores are formed by stretching the membrane material. Thereby it is possible to obtain a separator for a battery having an air permeability characteristic.

Whether the laminated porous film has the β activity is judged according to whether the crystal fusion peak temperature derived from the β crystal of the polypropylene resin is detected by performing differential thermal analysis of the laminated porous film with a differential scanning calorimeter.

More specifically after the temperature of the laminated porous film is raised from 25° C. to 240° C. at a heating speed of 10° C./minute, the temperature is held at 240° C. for one minute. After the temperature of the laminated porous film is dropped from 240° C. to 25° C. at a cooling speed of 10° C./minute, the temperature is held at 240° C. for one minute. When the crystal fusion peak temperature (Tmβ) derived from the β crystal is detected at re-raising of the temperature of the laminated porous film from 25° C. to 240° C. at the heating speed of 10° C./minute, it is judged that the laminated porous film has the β activity.

The β activity degree of the laminated porous film is computed based on an equation shown below by using a detected crystal fusion heat amount ($\Delta Hm\alpha$) derived from an α crystal of the polypropylene resin and a detected crystal fusion heat amount ($\Delta Hm\beta$) derived from the β crystal.

$$\beta \text{activity degree}(\%)=[\Delta Hm\beta/(\Delta Hm\beta+\Delta Hm\alpha)]\times 100$$

For example, in the case of homo-propylene, the β activity degree can be computed from the crystal fusion heat amount ($\Delta Hm\beta$), derived from the β crystal, which is detected mainly in a range not less than 145° C. and less than 160° C. and from the crystal fusion heat amount ($\Delta Hm\alpha$), derived from the α crystal, which is detected mainly in a range not less than 160° C. nor more than 175° C. In the case of random polypropylene in which ethylene is copolymerized at 1 to 4 mol %, the β activity degree can be computed from the crystal fusion heat amount ($\Delta Hm\beta$), derived from the β crystal, which is detected mainly in a range not less than 120° C. and less than 140° C. and from the crystal fusion heat amount ($\Delta Hm\alpha$), derived from the α crystal, which is detected mainly in a range not less than 140° C. nor more than 165° C.

It is favorable that the β activity degree of the laminated porous film is large. Specifically the β activity degree of the laminated porous film is favorably not less than 20%, more favorably not less than 40%, and most favorably not less than 60%. When the laminated porous film has the β activity degree not less than 20%, a large amount of the β crystal of the polypropylene can be generated in the membrane material before the membrane material is stretched. Thereby pores fine and homogeneous can be formed by stretching the membrane material. Consequently the obtained laminated porous film has a high mechanical strength and is excellent in the air permeability performance thereof.

An upper limit value of the β activity degree is not limited to a specific value. The higher the β activity degree is, the more effectively the above-described effect is obtained. Therefore it is preferable that the upper limit of the β activity degree is close to 100%.

Whether the laminated porous film has the β crystal generation power is judged based on a diffraction profile obtained by measuring the laminated porous film which has undergone specific heat treatment with a wide-angle X-ray.

In detail, after the laminated porous film is thermally treated at 170 to 190° C. higher than the melting point of the polypropylene resin, the laminated porous film is gradually cooled to carry out the wide-angle X-ray measurement of the laminated porous film in which the β crystal has been generated and grown. When a diffraction peak derived from a surface of the β crystal of the polypropylene resin is detected in a range of $2\theta=16.0°\sim16.5°$, it is judged that the laminated porous film has the β crystal generation power.

Regarding the detail of the β crystal structure of the polypropylene resin and the wide-angle X-ray diffraction, it is possible to refer to Macromol. Chem. 187, 643-652 (1986), Prog. Polym. Sci. Vol. 16, 361-404 (1991), Macromol. Symp. 89, 499-511 (1995), Macromol. Chem. 75, 134 (1964), and reference documents listed in these documents. The method of evaluating the β crystal generation power is shown in detail in the examples of the present invention described later.

As a method of providing the laminated porous film with the β activity and/or the β crystal generation power, it is possible to exemplify a method of not adding a substance for accelerating the generation of the α crystal of the polypropylene resin of the resin composition of the first layer containing the polypropylene resin (PP layer) to the resin of the PP layer, a method of adding polypropylene treated to generate a peroxide radical, as described in U.S. Pat. No. 3,739,481 to the resin of the PP layer, and a method of adding the β crystal nucleating agent to the resin of the PP layer.

It is especially preferable to obtain the β activity and/or the β crystal generation power by adding the β crystal nucleating agent to the resin of the PP layer.

By adding the crystal nucleating agent to the resin of the PP layer, it is possible to accelerate the generation of the β crystal of the polypropylene resin homogeneously and efficiently and obtain the laminated porous film having the β activity and/or the β crystal generation power.

It is preferable to add β crystal nucleating agent to the polypropylene resin so that the laminated porous film has the β activity generation power.

The details of the component of each layer are described below.

Description of First Layer

As the polypropylene resin of the first layer, it is possible to exemplify random copolymers or block copolymers consisting of homo-propylene (propylene homopolymer) or propylene and α-olefin such as ethylene, 1-butene, 1-pentene, 1-hexene, 1-heptene, 1-octene, 1-nonen or 1-decene. Of the above-described polypropylene resins, the homo-propylene is used more favorably than the propylene to provide the laminated porous film with a necessary mechanical strength.

It is favorable that the polypropylene resin has an isotactic structure fraction pentaddo (mmmm fraction) showing tacticity at 80 to 99%. It is more favorable to use the polypropylene resin having the isotactic structure fraction pentaddo of 83 to 98% and most favorable to use the polypropylene resin having the isotactic structure fraction pentaddo of 85 to 97%. When the isotactic structure fraction pentaddo is too low, there is a fear that the mechanical strength of the film becomes low. On the other hand, the upper limit of the isotactic structure fraction pentaddo is specified by the upper limit industrially currently obtained. But when a resin having a higher regularity is developed, the upper limit of the isotactic structure fraction pentaddo will be specified differently.

The isotactic structure fraction pentaddo (mmmm fraction) means a three-dimensional structure in which all of five methyl groups which are side chains for a main chain composed of a carbon-carbon bond composed of arbitrary continuous five propylene units are positioned in the same direction or means a ratio thereof. The attribution of a signal in a methyl group region complies with A. Zambelli et al (Marco molecules 8,687, (1975)).

It is favorable that Mw/Mn which is a parameter showing the molecular-weight distribution of the polypropylene resin is 2.0 to 10.0. It is more favorable to use the polypropylene resin having the Mw/Mn of 2.0 to 8.0 and most favorable to use the polypropylene resin having the Mw/Mn of 2.0 to 6.0. The smaller the Mw/Mn is, the narrower the molecular-weight distribution is. When the Mw/Mn is less than 2.0, there occurs a problem that extrusion moldability is low, and in addition it is difficult to industrially produce the laminated porous film. On the other hand, when the Mw/Mn exceeds 10.0, the amount of a low molecular-weight component becomes large. Thereby the mechanical strength of the laminated porous film is liable to deteriorate. The Mw/Mn is obtained by a GPC (gel permeation chromatography) method.

Although the melt flow rate (MFR) of the polypropylene resin is not limited to a specific one, the melt flow rate (MFR) thereof is favorably 0.5 to 15 g/10 minutes and more favorably 1.0 to 10 g/10 minutes. When the MFR is less than 0.5 g/10 minutes, the melt viscosity of the resin is high at a molding time and thus the productivity of the film deteriorates. On the other hand, when the MFR is more than 15 g/10 minutes, the film has a low mechanical strength. Thus a problem is liable to occur in practical use. The MFR is measured in conditions where temperature is 230° C. and a load is 2.16 kg in accordance with JIS K7210.

Description of β Crystal Nucleating Agent

As the β crystal nucleating agent to be contained in the first layer, the following substances are listed. The substances may be used in combination of not less than two kinds thereof.

As the β crystal nucleating agent, it is possible to list amide compounds; tetraoxaspiro compounds; quinacridones; iron oxide having a nano-scale size; alkali metal salts of carboxylic acid or alkaline earth metal salts thereof represented by 1,2-potassium hydroxystearate, magnesium benzoate, magnesium succinate, and magnesium phthalate; aromatic sulfonic acid compounds represented by sodium benzensulfonate and sodium naphthalene sulfonate; diesters or triesters of dibasic or tribasic carboxylic acid; phthalocyanine-based pigments represented by phthalocyanine blue; two-component compounds composed of a component A which is an organic dibasic acid and a component B which is oxides, hydroxides or salts of the IIA group of the Periodic Table; and compositions consisting of a cyclic phosphorous compound and a magnesium compound. The following β crystal nucleating agents are especially preferable.

As the especially preferable β crystal nucleating agent, the amino compounds shown by the following general formulas (I), (II), and (III) can be used:

RIb-NHCO-RIa-CONH-RIc            General formula (I)

RIIb-CONH-RIIa-CONH-RIIc         General formula (II)

RIIIb-CONH-RIIIa-NHCO-RIIIc      General formula (III)

RIa, RIIa, and RIIIa in the above-described formulas (I), (II), and (III) are identical to one another or different from one another and denote bivalent hydrocarbon radicals, having 1 to 28 carbon atoms, which may have been substituted. RIb, RIc, RIIb, RIIc, RIIIb, and RIIIc in the above-described formulas (I), (II), and (III) are identical to one another or different from one another and denote bivalent hydrocarbon radicals having, 1 to 18 carbon atoms, which may have been substituted.

Above all, as the amide compounds shown by the general formulas (I), (II), and (III), amide compounds shown by general formulas (1), (2) or (3) are exemplified as one form of especially preferable β crystal nucleating agent.

The amide compound shown by the general formula (1) included in the general formula (I) is shown by the following general formula (1):

$$R_2-NHCO-R_1-CONH-R_3 \quad (1)$$

In the formula (1), $R_1$ denotes a dicarboxylic acid residue of saturated or unsaturated aliphatic, alicyclic or aromatic hydrocarbons having 1 to 28 carbon atoms. $R_2$ and $R_3$ are identical to one another or different from one another and denote a cycloalkyl group or a cycloalkenyl group having 3 to 18 carbon atoms, the groups shown by the following formulas (a), (b), (c) or (d) (chemical formulas 1 through 4).

Following formula (a)

Chemical Formula 1

Following formula (b)

Chemical Formula 2

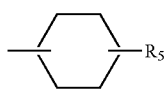

Following formula (c)

Chemical Formula 3

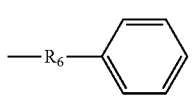

Following formula (d)

Chemical Formula 4

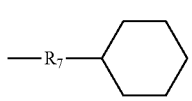

In the chemical formulas 1 through 4, $R_4$ and $R_5$ are identical to one another or different from one another and denote a hydrogen atom or a straight-chain or branched-chain alkyl group having 1 to 12 carbon atoms. $R_6$ and $R_7$ are identical to one another or different from one another and denote a straight-chain or branched-chain alkylene group having 1 to 12 carbon atoms.

The amide compound shown by the general formula (2) included in the general formula (II) is shown by the following general formula (2);

$$R_8\text{—NHCO—}R_9\text{—CONH—}R_{10} \quad (2)$$

In the formula (2), $R_8$ denotes an amino acid residue of saturated or unsaturated aliphatic, alicyclic or aromatic hydrocarbons having 1 to 28 carbon atoms. $R_9$ and $R_{10}$ are identical to one another or different from one another and denote a cycloalkyl group and a cycloalkenyl group having 3 to 18 carbon atoms, the groups shown by the following formulas (e), (f), (g) or (h) (chemical formulas 5 through 8).

Following formula (e)

Chemical Formula 5

Following formula (f)

Chemical Formula 6

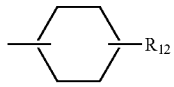

Following formula (g)

Chemical Formula 7

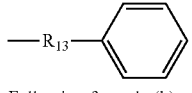

Following formula (h)

Chemical Formula 8

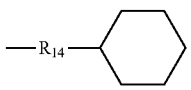

In the chemical formulas 5 through 8, $R_{11}$ denotes a hydrogen atom, an alkyl group, an alkenyl group, a cycloalkyl group or a phenyl group straight-chained or branched-chained and having 1 to 12 carbon atoms. $R_{12}$ denotes an alkyl group, a cycloalkyl group or a phenyl group straight-chained or branched-chained and having 1 to 12 carbon atoms. $R_{13}$ and $R_{14}$ are identical to one another or different from one another and denote a straight-chain or branched-chain alkylene group having 1 to 4 carbon atoms.

As the amino acid of the "amino acid residue" shown by $R_8$, not only natural amino acid, but also non-natural amino acid may be permitted. The amino acid may be a D-amino acid or an K-amino acid and also any of α-type, β-type, γ-type, and ε-type.

The amide compound shown by the general formula (3) included in the general formula (III) is shown by the following general formula (3):

$$R_{15}\text{—CONH—}R_{16}\text{—NHCO—}R_{17} \quad (3)$$

In the formula (3), $R_{15}$ denotes a diamine residue of the aliphatic, alicyclic or aromatic hydrocarbons having 1 to 24 carbon atoms. $R_{16}$ and $R_{17}$ are identical to one another or different from one another and denote a cycloalkenyl group or a cycloalkyl group having 3 to 12 carbon atoms, the groups shown by the following formulas (i), (j), (k) or (l) (chemical formulas 9 through 12).

Following formula (i)

Chemical Formula 9

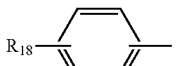

Following formula (j)

Chemical Formula 10

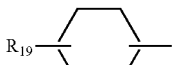

Following formula (k)

Chemical Formula 11

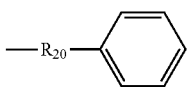

Following formula (l)

Chemical Formula 12

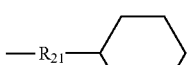

In the chemical formulas 9 through 12, $R_{18}$ denotes a hydrogen atom, a straight-chain or branched-chain alkyl group or a straight-chain or branched-chain alkenyl group having one to four carbon atoms. $R_{19}$ denotes a straight-chain or branched-chain alkyl group, a straight-chain or branched-chain cycloalkyl group or a straight-chain or branched-chain phenyl group having 1 to 12 carbon atoms. $R_{20}$ and $R_{21}$ are identical to one another or different from one another and denote a straight-chain or branched-chain alkylene group having one to three carbon atoms.

The amide compound shown by the general formula (1) can be prepared by amidating dicarboxylic acid and monoamine.

As the dicarboxylic acids, it is possible to list malonic acid, diphenylmalonic acid, succinic acid, phenyl succicinate, glutaric acid, 3,3-dimethylglutaric acid, adipic acid, pimelic acid, suberic acid, azelaic acid, sebacic acid, 1,12-dodecanedioic acid, 1,14-tetradecanedeoic acid, 1,18-octadecanedioic acid, 1,2-cyclohexane dicarboxylic acid, p-phenylene diacetate, phenylene diethanoate, phtharic acid, 4-tert-butylphthalic acid, isophthalic acid, 5-tert-butylisophthalic acid, terephthalic acid, 1,8-nphthalic acid, 1,4-naphthalenedicarboxylic acid, 2,6-naphthalenedicarboxylic acid, 2,7-naphthalenedicarboxylic acid, diphenic acid, 3,3'-biphenyldicarboxylic acid, 4,4'-biphenyldicarboxylic acid, 4,4'-binaphtyldicarboxylic acid, bis(3-carboxyphenyl)methane, bis(4-carboxyphenyl)methane, 2,2-bis(3-carboxyphenyl)propane, 2,2-bis(4-carboxyphenyl)propane, 3,3'-sulfonyldibenzoic acid, 4,4'-sulfonyldibenzoic acid, 4,4'-sulfonyldibenzoic acid, 3,3'-oxydibenzoic acid, 4,4'-oxydibenzoic acid, 3,3'-carbonyldibenzoic acid, 4,4'-carbonyldibenzoic acid, 3,3'-thiodibenzoic acid, 4,4'-thiodibenzoic acid, 4,4'-(p-phenylenedioxy)dibenzoic acid, 4,4'-isophthaloyldibenzoic acid, 4,4'-terephthaloyldibenzoic acid, and dithiosalicylic acid.

As the above-described monoamines, it is possible to list cyclopropylamine, cyclobutylamine, cyclopentylamine, cyclohexylamine, 2-methylcyclohexylamine, 3-methylcyclohexylamine, 4-methylcyclohexylamine, 2-ethylcyclohexylamine, 4-ethylcyclohexylamine, 2-propylcyclohexylamine, 2-isopropylcyclohexylamine, 4-propylcyclohexylamine, 4-isopropylcyclohexylamine, 2-tert-butylcyclohexylamine, 4-n-butylcyclohexylamine, 4-isobutylcyclohexylamine, 4-sec-butylcyclohexylamine, 4-tert-butylcyclohexylamine, 4-n-pentylcyclohexylamine, 4-isopentylcyclohexylamine, 4-sec-pentylcyclohexylamine, 4-tert-pentylcyclohexylamine, 4-hexylcyclohexylamine, 4-heptylcyclohexylamine, 4-octylcyclohexylamine, 4-nonylcyclohexylamine, 4-decylcyclohexylamine, 4-undecylcyclohexylamine, 4-dodecylcyclohexylamine, 4-cyclohexylcyclohexylamine, 4-phenylcyclohexylamine, cycloheptylamine, cyclododecylamine, cyclohexylmethylamine, α-cyclohexylethylamine, β-cyclohexylethylamine, α-cyclohexylpropylamine, β-cyclohexylpropylamine, γ-cyclohexylpropylamine, aniline, o-toluidine, m-toluidine, p-toluidine, o-ethyl aniline, p-ethyl aniline, o-propyl aniline, m-propyl aniline, p-propyl aniline, o-cumidine, m-cumidine, p-cumidine, o-tert-butylaniline, p-n-butylaniline, p-isobutylaniline, p-sec-butylaniline, p-tert-butylaniline, p-n-amylaniline, p-isoamylaniline, p-sec-amylaniline, p-tert-amylaniline, p-hexylaniline, p-heptylaniline, p-octylaniline, p-nonylaniline, p-decylaniline, p-undecylaniline, p-dodecylaniline, p-cyclohecylaniline, o-aminodiphenyl, m-aminodiphenyl, p-aminodiphenyl, p-aminostyrene, benzylamine, α-phenylethylamine, β-phenylethylamine, α-phenylpropylamine, β-phenylpropylamine, and γ-phenylpropylamine.

The amide compounds shown by the general formula (2) can be prepared by amidating amino acid, monocarboxylic acid, and monoamine.

As the above-described amino acids, it is possible to list aminoacetic acid, α-aminopropionic acid, β-aminopropionic acid, α-aminoacrylic acid, α-aminobutanoic acid, β-aminobutanoic acid, γ-aminobutanoic acid, α-amino-α-methylbutanoic acid, γ-amino-α-methylenebutanoic acid, α-aminoisobutanoic acid, β-aminoisobutanoic acid, α-amino-n-pentanic acid, β-aminocrotonic acid, α-amino-β-methylpentanoic acid, 2-amino-4-pentenoic acid, α-amino-n-caproic acid, 6-aminocaproic acid, α-aminoisocaproic acid, 7-aminoheputanicacid, α-amino-n-caprylicacid, 8-aminocaprylicacid, 9-aminononanoic acid, 11-aminoundecanoic acid, 12-aminododecanoic acid, 1-aminocyclohexanecarboxylic acid, 2-aminocyclohexanecarboxylic acid, 3-aminocyclohexanecarboxylic acid, 4-aminocyclohexanecarboxylic acid, p-aminomethylcyclohexanecarboxylic acid, 2-amino-2-norbornanecarboxylic acid, α-aminophenylacetic acid, α-amino-β-phenylpropionic acid, 2-amino-2-phenylpropionic acid, 3-amino-3-phenylpropionic acid, α-aminocinnamic acid, 2-amino-4-phenylbutanoic acid, 4-amino-3-phenylbutanoic acid, anthranilic acid, m-aminobenzoic acid, p-aminobenzoic acid, 2-amino-4-methylbenzoic acid, 2-amino-6-methylbenzoic acid, 3-amino-4-methylbenzoic acid, 2-amino-3-methylbenzoic acid, 2-amino-5-methylbenzoic acid, 4-amino-2-methylbenzoic acid, 4-amino-3-methylbenzoic acid, 2-amino-3-methoxybenzoic acid, 3-amino-4-methoxybenzoic acid, 4-amino-3-methoxybenzoic acid, 2-amino-4,5-dimethoxybenzoic acid, o-aminophenyl acetate, m-aminophenyl acetate, p-aminophenyl acetate, 4-(4-aminophenyl)butanoic acid, 4-aminomethyl benzoic acid, 4-aminomethyl phenyl acetic acid, o-aminocinnamic acid, m-aminocinnamic acid, p-aminocinnamic acid, p-aminohippurate, 2-amino-1-naphthonic acid, 3-amino-1-naphthonic acid, 4-amino-1-naphthonic acid, 5-amino-1-naphthonic acid, 6-amino-1-naphthonic acid, 7-amino-1-naphthonic acid, 8-amino-1-naphthonic acid, 1-amino-2-naphthonic acid, 3-amino-2-naphthonic acid, 4-amino-2-naphthonic acid, 5-amino-2-naphthonic acid, 6-amino-2-naphthonic acid, 7-amino-2-naphthonic acid, and 8-amino-2-naphthonic acid.

As the above-described monocarboxylic acids, it is possible to list cyclopropanecarboxylic acid, cylclobutanecarboxylic acid, methylcyclopentancarboxylic acid, 3-methylcyclopentancarboxylic acid, 2-methylcyclopentancarboxylic acid, 3-methylcyclopentancarboxylic acid, 1-phenylcyclopentancarboxylic acid, cyclopentenecarboxylic acid, cyclohexanecarboxylic acid, 1-methylcyclohexanecarboxylic acid, 2-methylcyclohexanecarboxylic acid, 3-methylcyclohexanetcarboxylic acid, 4-methylcyclohexanecarboxylic acid, 4-propylcyclohexanetcarboxylic acid, 4-butylcyclohexanetcarboxylic acid, 4-pentylcyclohexanetcarboxylic acid, 4-hexylcyclohexanetcarboxylic acid, 4-phenylcyclohexanetcarboxylic acid, 1-cyclohexanetcarboxylic acid, cyclohexanecarboxylic acid, 4-butylcyclohexanecarboxylic acid, cycloheptanecarboxylic acid, 1-cycloheptenecarboxylic acid, 1-methylcycloheptanecarboxylic acid, 4-methylcycloheptanecarboxylic acid, cyclohexylacetic acid, benzoic acid, o-methyl-benzoic acid, m-methyl-benzoic acid, p-methyl-benzoic acid, p-ethyl-benzoic acid, p-propyl-benzoic acid, p-butyl benzoate, p-tert-butyl benzoate, p-pentyl benzoate, p-hexyl benzoate, o-phenyl benzoate, p-phenyl benzoate, p-cyclohexylbenzoate, o-phenylacetic acid, phenylpropionic acid, and phenylbutanoic acid.

The monoamine similar to monoamine which is a material of the amide compound shown by the general formula (1) are listed.

The amide compound shown by the general formula (3) can be prepared by amidating diamine and monocarboxylic acid.

As the diamine, it is possible to list 1,2-diaminopropane, 1,3-diaminopropane, 1,4-diaminobutane, 1,3-diaminopentane, 1,5-diaminopentane, 1,6-diaminohexane, 1,2-diaminocyclohexane, 1,4-diaminocyclohexane, 4,4'-diaminodicyclohexylmethane, 4,4'-diamino-3,3'-dimethyldicyclohexylmethane, 4,4'-diamino-3,3'-dimethyldicyclohexylmethane, 1,3-bis(aminomethyl)

cyclohexane, 1,4-bis(aminomethyl)cyclohexane, isophronediamine, menthanediamine, o-phenylenediamine, m-phenylenediamine, p-phenylenediamine, 1,5-diaminonaphthalene, 4,4'-diaminodiphenylmethane, 4,4'-diaminodiphenylether, and 4,4'-diaminodiphenyl sulfone.

The monocarboxylic acids similar to monocarboxylic acid which is a material of the amide compound shown by the general formula (2) are listed.

As other form of especially preferable β crystal nucleating agent, it is possible to exemplify a tetraoxaspiro compound shown by a general formula (4) shown below:

Chemical formula 13

(4)

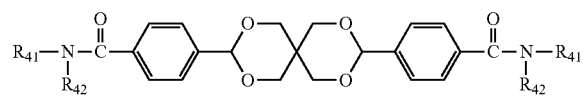

In the general formula 4, $R_{41}$ and $R_{42}$ may be identical to one another or different from one another and denote a hydrogen atom or a hydrocarbon radical having 1 to 18 carbon atoms which may have been substituted, preferably the hydrogen atom, an alkyl group, a cycloalkyl group or an aryl group. Alternatively it is preferable that $R_{41}$, $R_{42}$, and nitrogen atoms cooperate with each other to display a nitrogen-containing heterocyclic group and favorably $R_{41}$ and $R_{42}$ are connected with each other at the ends to display an alkylene group having 2 to 6 carbon atoms.

The tetraoxaspiro compounds are listed as follows: 3,9-bis[4-(N-cyclohexylcarbamoyl)phenyl]-2,4,8,10-tetraoxaspiro[5.5]undecane, 3,9-bis{4-[N-(4-t-butylcyclohexyl)carbamoyl]pheny}-2,4,8,10-tetraoxaspiro[5.5]undecane, 3,9-bis{4-[N-(2,4-di-t-butylcyclohexyl) carbamoyl]phenyl}-2,4,8,10-tetraoxaspiro[5.5]undecane, 3,9-bis{4-[N-(1-adamantyl) carbamoyl]phenyl}-2,4,8,10-tetraoxaspiro[5.5]undecane, 3,9-bis[4-(N-phenylcarbamoyl)phenyl]-2,4,8,10-tetraoxaspiro[5.5]undecane, 3,9-bis{4-[N-(4-t-butylphenyl) carbamoyl]phenyl}-2,4,8,10-tetraoxaspiro[5.5]undecane, 3,9-bis{4-[N-(2,4-di-t-butylphenyl) carbamoyl]phenyl}-2,4,8,10-tetraoxaspiro[5.5]undecane, 3,9-bis{4-[N-(1-naphtyl) carbamoyl]phenyl}-2,4,8,10-tetraoxaspiro[5.5]undecane, 3,9-bis{4-[N-n-butylcarbamoyl]phenyl}-2,4,8,10-tetraoxaspiro[5.5]undecane, 3,9-bis{4-[N-n-hexylcarbamoyl]phenyl}-2,4,8,10-tetraoxaspiro[5.5]undecane, 3,9-bis{4-[N-n-dodecylcarbamoyl]phenyl}-2,4,8,10-tetraoxaspiro[5.5]undecane, 3,9-bis[4-[N-n-octadecylcarbamoyl]phenyl]-2,4,8,10-tetraoxaspiro[5.5]undecane, 3,9-bis(4-carbamoyl]phenyl)-2,4,8,10-tetraoxaspiro[5.5]undecane, 3,9-bis[4-N,N-dicyclohexylcarbamoyl]phenyl)-2,4,8,10-tetraoxaspiro[5.5]undecane, 3,9-bis[4-N,N-diphenylcarbamoyl]phenyl]-2,4,8,10-tetraoxaspiro[5.5]undecane, 3,9-bis[4-(N-n-butyl-N-phenylcarbamoyl]phenyl]-2,4,8,10-tetraoxaspiro[5.5]undecane, 3,9-bis[4-(1-pyrrolidinylcarbonyl)phenyl]-2,4,8,10-tetraoxaspiro[5.5]undecane, and 3,9-bis[4-(1-piperidinylcarbonyl)phenyl]-2,4,8,10-tetraoxaspiro[5.5]undecane.

As other forms of especially preferable β crystal nucleating agent, it is possible to list quinacridone-type compounds such as quinacridone, dimethylquinacridone, and dimethoxyquinacridone; a quinacridonequinone type such as quinacridonequinone, 5,12-dihydro(2,3b)acridine-7-1, mixed crystal of 4-dione and quino(2,3b)acridine-6,7,13-1,4-(5H, 12H)-tetron, and dimethoxyquinacridonequinone; and dihydroquinacridone-type such as dihydroquinacridone, dimethoxyhydroquinacridone, and dibenzohydroquinacridone.

As other forms of especially preferable β crystal nucleating agent, it is possible to list dicarboxylates of metals of the IIa group of the Periodic Table such as calcium salts of pimelic acid, calcium salts of suberic acid, and the like; and mixtures of dicarboxylic acid and metal salts of the IIa group of the Periodic Table.

Above all, salts of the metals of the IIa group of the Periodic Table and acid imide shown by a formula (5) are especially preferable:

Chemical formula 14

(5)

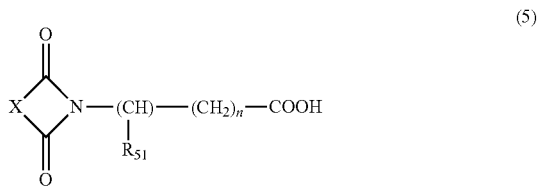

In the formula, n is a natural number of 1 through 12. $R_{51}$ denotes a hydrogen atom, a carboxyl group or a hydrocarbon radical, having 1 to 12 carbon atoms, which may have been substituted and preferably the hydrogen atom, the carboxyl group or a straight-chain or branched-chain alkyl group, having 1 to 12 carbon atoms, which may have been substituted, a cycloalkyl group having 5 to 8 carbon atoms or an aryl group having 6 to 12 atoms. X denotes a bivalent hydrocarbon radical which may have been substituted, favorably a bivalent aromatic hydrocarbon radical, having 6-12 carbon atoms, which may have been substituted, and more favorably the alkyl group having 1 to 12 carbon atoms, the cycloalkyl group having 5 to 8 carbon atoms or the bivalent aromatic hydrocarbon radical, having 6 to 12 atoms, which may have been substituted with the aryl group having 6 to 12 atoms.

As the above-described salts, it is possible to exemplify calcium salts of phthaloyl glycine, hexahydrophthaloyl glycine, N-naphthaloyl alanine, and N-4-methylphthaloyl glycine.

As other forms of especially favorably β crystal nucleating agent, it is possible to exemplify compositions consisting of cyclic phosphorous compounds shown by a general formula (6) shown below and at least one kind of a magnesium compound selected from among the group of magnesium fatty acid, aliphatic magnesium phosphate, magnesium oxide, magnesium hydroxide, magnesium carbonate, and magnesium salts of the cyclic phosphorous compound shown by a general formula (7) shown below and magnesium phosphonate compounds shown by a general formula (8) shown below or compositions consisting of cyclic phosphorous compounds shown by a general formula (9) shown below and at least one kind of a magnesium compound selected from among the group of magnesium phosphonate compounds shown by a general formula (8), magnesium sulfate, and talc.

The cyclic phosphorous compound is shown by a general formula (6) shown below.

Chemical formula 15

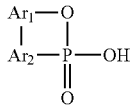
(6)

In the general formula (6), $Ar_1$ and $Ar_2$ are identical to one another or different from one another and denote bivalent aromatic hydrocarbon radicals, having 6 to 12 carbon atoms, which may have been substituted, favorably an arylene group, having 1 to 18 carbon atoms, which may have been substituted, and more favorably the arylene group, an alkylarylene group, a cycloalkylarylene group, an arylalylene group or an aralkylarylene group.

The magnesium salts of the cyclic phosphorous compound are shown by a general formula (7) shown below.

Chemical formula 16

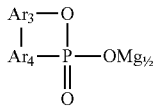
(7)

In the general formula (7), $Ar_3$ and $Ar_4$ are identical to one another or different from one another and denote bivalent aromatic hydrocarbon radicals, having 6 to 12 carbon atoms, which may have been substituted, favorably the arylene group having 1 to 18 carbon atoms, which may have been substituted, and more favorably the arylene group, the alkylarylene group, the cycloalkylarylene group, the arylalylene group or the aralkylarylene group.

The magnesium phosphonate compounds are shown by a general formula (8) shown below.

Chemical formula 17

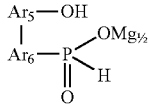
(8)

In the general formula (7), $Ar_5$ and $Ar_6$ are identical to one another or different from one another and denote bivalent aromatic hydrocarbon radicals, having 6 to 12 carbon atoms, which may have been substituted, favorably the arylene group having 1 to 18 carbon atoms, which may have been substituted, and more favorably the arylene group, the alkylarylene group, the cycloalkylarylene group, the arylalylene group or the aralkylarylene group.

The cyclic phosphorous compound is shown by a general formula (9) shown below.

Chemical formula 18

(9)

In the general formula (7), $Ar_7$ and $Ar_8$ are identical to one another, or different from one another and denote the bivalent aromatic hydrocarbon radicals, having 6 to 12 carbon atoms, which may have been substituted, favorably the arylene group having 1 to 18 carbon atoms, which may have been substituted, and more favorably the arylene group, the alkylarylene group, the cycloalkylarylene group, the arylalylene group or the aralkylarylene group.

As the cyclic phosphorous compound shown by the general formula (6), it is possible to list 10-hydroxy-9,10-dihydro-9-oxa-10-phosphaphenanethrene-10-oxide, 1-methyl-10-hydroxy-9,10-dihydro-9-oxa-10-phosphaphenanethrene-10-oxide, 2-methyl-10-hydroxy-9,10-dihydro-9-oxa-10-phosphaphenanthrene-10-oxide, 6-methyl-10-hydroxy-9,10-dihydro-9-oxa-10-phosphaphenanthrene-10-oxide, 7-methyl-10-hydroxy-9,10-dihydro-9-oxa-10-phosphaphenanethrene-10-oxide, 8-methyl-10-hydroxy-9,10-dihydro-9-oxa-10-phosphaphenanethrene-10-oxide, 6,8-dimethyl-10-hydroxy-9,10-dihydro-9-oxa-10-phosphaphenanethrene-10-oxide, 2,6,8-trimethyl-10-hydroxy-9,10-dihydro-9-oxa-10-phosphaphenanethrene-10-oxide, 2-ethyl-10-hydroxy-9,10-dihydro-9-oxa-10-phosphaphenanethrene-10-oxide, 6-ethyl-10-hydroxy-9,10-dihydro-9-oxa-10-phosphaphenanethrene-10-oxide, 8-ethyl-10-hydroxy-9,10-dihydro-9-oxa-10-phosphaphenanethrene-10-oxide, 6,8-diethyl-10-hydroxy-9,10-dihydro-9-oxa-10-phosphaphenanethrene-10-oxide, 2,6,8-triethyl-10-hydroxy-9,10-dihydro-9-oxa-10-phosphaphenanethrene-10-oxide, 2-i-propyl-10-hydroxy-9,10-dihydro-9-oxa-10-phosphaphenanethrene-10-oxide, 6-i-propyl-10-hydroxy-9,10-dihydro-9-oxa-10-phosphaphenanethrene-10-oxide, 8-i-propyl-10-hydroxy-9,10-dihydro-9-oxa-10-phosphaphenanethrene-10-oxide, 6,8-di-i-propyl-10-hydroxy-9,10-dihydro-9-oxa-10-phosphaphenanethrene-10-oxide, 2,6,8-tri-i-propyl-10-hydroxy-9,10-dihydro-9-oxa-10-phosphaphenanethrene-10-oxide, 2-s-butyl-10-hydroxy-9,10-dihydro-9-oxa-10-phosphaphenanethrene-10-oxide, 6-s-butyl-10-hydroxy-9,10-dihydro-9-oxa-10-phosphaphenanethrene-10-oxide, 8-s-butyl-10-hydroxy-9,10-dihydro-9-oxa-10-phosphaphenanethrene-10-oxide, 1,8-di-s-butyl-10-hydroxy-9,10-dihydro-9-oxa-10-phosphaphenanethrene-10-oxide, 2,6,8-tri-s-butyl-10-hydroxy-9,10-dihydro-9-oxa-10-phosphaphenanethrene-10-oxide, 2-t-butyl-10-hydroxy-9,10-dihydro-9-oxa-10-phosphaphenanethrene-10-oxide, 6-t-butyl-10-hydroxy-9,10-dihydro-9-oxa-10-phosphaphenanethrene-10-oxide, 8-t-butyl-10-hydroxy-9,10-dihydro-9-oxa-10-phosphaphenanethrene-10-oxide, 1,6-di-t-butyl-10-hydroxy-9,10-dihydro-9-oxa-10-phosphaphenanethrene-10-oxide, 2,6-di-t-butyl-10-hydroxy-9,10-dihydro-9-oxa-10-phosphaphenanethrene-10-oxide, 2,7-di-t-butyl-10-hydroxy-9,10-dihydro-9-oxa-10-phosphaphenanethrene-10-oxide, 2,8-di-t-butyl-10-hydroxy-9,10-dihydro-9-oxa-10-phosphaphenanethrene-10-oxide, 6,8-di-t-butyl-10-hydroxy-9,10-dihydro-9-oxa-10-phosphaphenanethrene-10-oxide, 2,6,8-tri-t-butyl-10-hydroxy-9,10-dihydro-9-oxa-10-phosphaphenanethrene-10-oxide, 2-t-amyl-10-hydroxy-9,10-dihydro-9-oxa-10-phosphaphenanethrene-10-oxide, 6-t- amyl-10-hydroxy-9,10-dihydro-9-oxa-10-phosphaphenanethrene-10-oxide, 8-t-amyl-10-hydroxy-9,10-dihydro-9-oxa-10-phosphaphenanethrene-10-oxide, 6,8-di-t-amyl-10-hydroxy-9,10-dihydro-9-oxa-10-phosphaphenanethrene-10-oxide, 2,6,8-tri-t-amyl-10-hydroxy-9,10-dihydro-9-oxa-10-phosphaphenanethrene-10-oxide, 2-t-octyl-10-hydroxy-9,10-dihydro-9-oxa-10-phosphaphenanethrene-10-oxide, 6-t-octyl-10-hydroxy-9,10-dihydro-9-oxa-10-phosphaphenanethrene-10-oxide, 8-t-octyl-10-hydroxy-9,10-dihydro-9-oxa-10-phosphaphenanethrene-10-oxide, 6,8-di-t-octyl-10-hydroxy-9,10-dihydro-9-oxa-10-phosphaphenanethrene-10-oxide, 2,6,8-tri-t-octyl-10-hydroxy-9,10-dihydro-9-oxa-10-phosphaphenanethrene-10-oxide, 2-cyclohexyl-10-hydroxy-9,10-dihydro-9-oxa-10-phosphaphenanethrene-10-oxide, 6-cyclohexyl-10-hydroxy-9,10-dihydro-9-oxa-10-phosphaphenanethrene-10-oxide, 8-cyclohexyl-10-hydroxy-9,10-dihydro-9-oxa-10-phosphaphenanethrene-10-oxide, 6,8-di-cyclohexyl-10-hydroxy-9,10-dihydro-9-oxa-10-phosphaphenanethrene-10-oxide, 2,6,8-tri-cyclohexyl-10-hydroxy-9,10-dihydro-9-oxa-10-phosphaphenanethrene-10-oxide, 6-phenyl-10-hydroxy-9,10-dihydro-9-oxa-10-phosphaphenanethrene-10-oxide, 2-benzyl-10-hydroxy-9,10-dihydro-9-oxa-10-phosphaphenanethrene-10-oxide, 6-benzyl-10-hydroxy-9,10-dihydro-9-oxa-10-phosphaphenanethrene-10-oxide, 8-benzyl-10-hydroxy-9,10-dihydro-9-oxa-10-phosphaphenanethrene-10-oxide, 6,8-di-benzyl-10-hydroxy-9,10-dihydro-9-oxa-10-phosphaphenanethrene-10-oxide, 2,6,8-tri-benzyl-10-hydroxy-9,10-dihydro-9-oxa-10-phosphaphenanethrene-10-oxide, 2-(α-methylbenzyl)-10-hydroxy-9,10-dihydro-9-oxa-10-phosphaphenanethrene-10-oxide, 6-(α-methylbenzyl)-10-hydroxy-9,10-dihydro-9-oxa-10-phosphaphenanethrene-10-oxide, 8-(α-methylbenzyl)-10-hydroxy-9,10-dihydro-9-oxa-10-phosphaphenanethrene-10-oxide, 6,8-di(α-methylbenzyl)-10-hydroxy-9,10-dihydro-9-oxa-10-phosphaphenanethrene-10-oxide, 2,6,8-tri(α-methylbenzyl)-10-hydroxy-9,10-dihydro-9-oxa-10-phosphaphenanethrene-10-oxide, 2,6-(α,α-dimethylbenzyl)-10-hydroxy-9,10-dihydro-9-oxa-10-phosphaphenanethrene-10-oxide, 6-t-butyl-8-methyl-10-hydroxy-9,10-dihydro-9-oxa-10-phosphaphenanethrene-10-oxide, 6-benzyl-8-methyl-10-hydroxy-9,10-dihydro-9-oxa-10-phosphaphenanethrene-10-oxide, 6-cyclohexyl-8-t-butyl-10-hydroxy-9,10-dihydro-9-oxa-10-phosphaphenanethrene-10-oxide, 6-benzyl-8-t-butyl-10-hydroxy-9,10-dihydro-9-oxa-10-phosphaphenanethrene-10-oxide, 6-di(α-methylbenzyl)-8-t-butyl-10-hydroxy-9,10-dihydro-9-oxa-10-phosphaphenanethrene-10-oxide, 6-t-butyl-8-cyclohexyl-10-hydroxy-9,10-dihydro-9-oxa-10-phosphaphenanethrene-10-oxide, 6-benzyl-8-cyclohexyl-10-hydroxy-9,10-dihydro-9-oxa-10-phosphaphenanethrene-10-oxide, 6-t-butyl-8-benzyl-10-hydroxy-9,10-dihydro-9-oxa-10-phosphaphenanethrene-10-oxide, 6-cyclohexyl-8-benzyl-10-hydroxy-9,10-dihydro-9-oxa-10-phosphaphenanethrene-10-oxide, 2,6-di-t-butyl-8-benzyl-10-hydroxy-9,10-dihydro-9-oxa-10-phosphaphenanethrene-10-oxide, and 2,6-dicyclohexyl-8-benzyl-10-hydroxy-9,10-dihydro-9-oxa-10-phosphaphenanethrene-10-oxide.

It is possible to use these cyclic phosphorous compounds singly or in combination of not less than two kinds thereof.

As magnesium compounds used as the β crystal nucleating agent of the present invention in combination with the cyclic phosphorous compound shown by the above-described general formula (6), it is possible to list magnesium acetate, magnesium propionate, n-magnesium butyrate, i-magnesium butyrate, i-magnesium valerianate, n-magnesium hexanoate, n-magnesiumoctanoate, magnesium 2-ethylhexoate, magnesium decanoate, magnesium laurate, magnesium myristate, magnesium myristoleate, magnesium palmitate, magnesium palmitoleate, magnesium stearate, magnesium oleate, linoleate, magnesium linolenate, magnesium arachidate, magnesium behenate, magnesium eruate, lignocerate, magnesium cerotate, magnesium montanate, magnesium mellisate, 12-magnesium hydrorxyoctadecanoate, magnesium ricinoleate, magnesium cerebronate, (mono, di-mixed)magnesium hexylphosphate, (mono, di-mixed)magnesium octylphosphate, (mono, di-mixed)magnesium ethylhexylphosphate, (mono, di-mixed) magnesium decylphosphate, (mono, di-mixed)magnesium lauryl phosphate, (mono, di-mixed)magnesium myristic phosphate, (mono, di-mixed) magnesium palmyticphosphate, (mono, di-mixed)magnesium stearyl phosphate, (mono, di-mixed)magnesium oleyl phosphate, (mono, di-mixed)magnesium linoleic phosphate, (mono, di-mixed) magnesium rinoryl phosphate, (mono, di-mixed)magnesium dokocyl phosphate, (mono, di-mixed) magnesium erucyl phosphate, (mono, di-mixed)magnesium tetracocyl phosphate, (mono, di-mixed)magnesium hexacosyl phosphate, (mono, di-mixed)magnesium octacosyl phosphate, magnesium oxide, magnesium hydroxide, and magnesium carbonate.

As magnesium compounds used as the β crystal nucleating agent of the present invention in combination with the cyclic phosphorous compound shown by the above-described general formula (6), it is possible to exemplify magnesium salts of the above-described compounds exemplified as the cyclic phosphorous compound shown by the above-described general formula (6), magnesium-bis(1'-hydroxy-2,2'-biphentlene phosphonate), magnesium-bis(5-methyl-1'-hydroxy-2,2'-biphenylene phosphonate), magnesium-bis(6-methyl-1'-hydroxy-2,2'-biphenylene phosphonate), magnesium-bis(1'-hydroxy-4'-methyl-2,2'-biphenylene phosphonate), magnesium-bis(1'-hydroxy-5'-methyl-2,2'-biphenylene phosphonate), magnesium-bis(1'-hydroxy-6'-methyl-2,2'-biphenylene phosphonate), magnesium-bis(1'-hydroxy-4',6'-dimethyl-2,2'-biphenylene phosphonate), magnesium-bis(5,4',6'-trimethyl-1'-hydroxy-2',2'-biphenylene phosphonate), magnesium-bis(5-ethyl-1'-hydroxy-2',2'-biphenylene phosphonate), magnesium-bis(1'-hydroxy-4'-ethyl-2,2'-biphenylene phosphonate), magnesium-bis(1'-hydroxy-6'-ethyl-2,2'-biphenylene phosphonate), magnesium-bis(1'-hydroxy-4',6'-diethyl-2,2'-biphenylene phosphonate), magnesium-bis(5,4',6'-triethyl-1'-hydroxy-2',2'-biphenylene phosphonate), magnesium-bis(5-1-propyl-1'-hydroxy-2',2'-biphenylene phosphonate), magnesium-bis(1'-hydroxy-4'-1-propyl-2,2'-biphenylene phosphonate), magnesium-bis(1'-hydroxy-6'-1-propyl-2,2'-biphenylene phosphonate), magnesium-bis(1'-hydroxy-4',6'-di-i-propyl-2,2'-biphenylene phosphonate), magnesium-bis(6,4',6'-tri-i-propyl-1'-hydroxy-2',2'-biphenylene phosphonate), magnesium-bis(5-s-butyl-1'-hydroxy-2',2'-biphenylene phosphonate), magnesium-bis(1'-hydroxy-4'-s-butyl-2,2'-biphenylene phosphonate), magnesium-bis(1'-hydroxy-6'-s-butyl-2,2'-biphenylene phosphonate), magnesium-bis(1'-hydroxy-6'-s-butyl-2,2'-biphenylene phosphonate), magnesium-bis(6,6'-di-s-butyl-1'-hydroxy-2,2'-biphenylene phosphonate), magnesium-bis(5,4',6'-tri-s-butyl-1'-hydroxy-2,2'-biphenylene phosphonate), magnesium-bis(5-t-butyl-1'-hydroxy-2',2'-biphenylene phosphonate), magnesium-bis(1'-hydroxy-4'-t-butyl-2,2'-biphenylene phosphonate), magnesium-bis(1'-hydroxy-6'-t-butyl-2,2'-biphenylene phosphonate), magnesium-bis(5,6'-di-t-butyl-1'-hydroxy-2,2'-biphenylene phosphonate), magnesium-bis(5,4'-di-t-butyl-1'-hydroxy-2,2'-biphenylene phosphonate), magnesium-bis(5,5'-di-t-butyl-1'-hydroxy-2,2'-biphenylene phosphonate), magnesium-bis(6,4'-di-t-butyl-1'-hydroxy-2,2'-biphenylene phosphonate), magnesium-bis(1'-hydroxy-4',6'-di-t-butyl-2,2'-biphenylene phosphonate), magnesium-bis(5,4',6'-tri-t-butyl-1'-hydroxy-2,2'-biphenylene phosphonate), magnesium-bis(5-t-amyl-1'-hydroxy-2,2'-biphenylene phosphonate), magnesium-bis(1'-hydroxy-4'-t-amyl-2,2'-biphenylene phosphonate), magnesium-bis(1'-hydroxy-6'-t-amyl-2,2'-biphenylene phosphonate), magnesium-bis(1'-hydroxy-4',6'-di-t-amyl-2,2'-biphenylene phosphonate), magnesium-bis(5,4',6'-tri-t-amyl-1'-hydroxy-2,2'-biphenylene phosphonate), magnesium-bis(5-t-octyl-1'-hydroxy-2,2'-biphenylene phosphonate), magnesium-bis(1'-hydroxy-4'-t-octyl-2,2'-biphenylene phosphonate), magnesium-bis(1'-hydroxy-6'-t-octyl-2,2'-biphenylene phosphonate), magnesium-bis(1'-hydroxy-4',6'-di-t-octyl-2,2'-biphenylene phosphonate), magnesium-bis(5,4',6'-tri-t-octyl-1'-hydroxy-2,2'-biphenylene phosphonate), magnesium-bis(5-cyclohexyl-1'-hydroxy-2,2'-biphenylene phosphonate), magnesium-bis(1'-hydroxy-4'-cyclohexyl-2,2'-biphenylene phosphonate), magnesium-bis(1'-hydroxy-6'-cyclohexyl-2,2'-biphenylene phosphonate), magnesium-bis(1'-hydroxy-4',6'-di-cyclohexyl-2,2'-biphenylene phosphonate), magnesium-bis(5,4',6'-tri-cyclohexyl-1'-hydroxy-2,2'-biphenylene phosphonate), magnesium-bis(1'-hydroxy-4'-phenyl-2,2'-biphenylene phosphonate), magnesium-bis(5-benzyl-1'-hydroxy-2,2'-biphenylene phosphonate), magnesium-bis(1'-hydroxy-4'-benzyl-2,2'-biphenylene phosphonate), magnesium-bis(1'-hydroxy-6'-benzyl-2,2'-biphenylene phosphonate), magnesium-bis(1'-hydroxy-4',6'-di-benzyl-2,2'-biphenylene phosphonate), magnesium-bis(5,4',6'-tri-benzyl-1'-hydroxy-2,2'-biphenylene phosphonate), magnesium-bis[5-(α-methylbenzyl)-1'-hydroxy-2,2'-biphenylene phosphonate], magnesium-bis[1'-hydroxy-4'-(α-methylbenzyl)-2,2'-biphenylene phosphonate], magnesium-bis[1'-hydroxy-6'-(α-methylbenzyl)-2,2'-biphenylene phosphonate], magnesium-bis[1'-hydroxy-4',6'-di(α-methylbenzyl)-2,2'-biphenylenephosphonate), magnesium-bis[5,4'6'-tri-(α-methylbenzyl)-1'-hydroxy-2,2'-biphenylenephosphonate), magnesium-bis[5,4'-di(α,α-dimethylbenzyl)-1'-hydroxy-2,2'-biphenylenephosphonate), magnesium-bis(1'-hydroxy-4'-t-butyl-6'-methyl-2,2'-biphenylenephosphonate), magnesium-bis(1'-hydroxy-4'-benzyl-6'-methyl-2,2'-biphenylenephosphonate), magnesium-bis(1'-hydroxy-4'-cyclohexyl-6'-t-butyl-2,2'-biphenylenephosphonate), magnesium-bis(1'-hydroxy-4'-benzyl-6'-t-butyl-2,2'-biphenylenephosphonate), magnesium-bis[1'-hydroxy-4'-(α-methylbenzyl)-6'-t-butyl-2,2'-biphenylenephosphonate], magnesium-bis(1'-hydroxy-4'-t-butyl-6'-cyclohexyl-2,2'-biphenylenephosphonate), magnesium-bis(1'-hydroxy-4'-benzyl-6'-cyclohexyl-2,2'-biphenylenephosphonate), magnesium-bis(1'-hydroxy-4'-t-butyl-6'-benzyl-2,2'-biphenylenephosphonate), magnesium-bis(1'-hydroxy-4'-cyclohexyl-6'-benzyl-2,2'-biphenylenephosphonate), magnesium-bis(5,4'-di-t-butyl-6'-benzyl-1'-hydroxy-2,2'-biphenylenephosphonate), and magnesium-bis(5,4'-dicyclohexyl-6'-benzyl-1'-hydroxy-2,2'-biphenylene phosphonate).

It is possible to use these magnesium compounds singly or in combination of not less than two kinds thereof.

The mass ratio of the magnesium compound to the cyclic phosphorous compound shown by the general formula (6) is not limited to a specific ratio, but is normally 0.01 to 100 parts by mass of the magnesium compound and preferably 0.1 to 10 parts by mass of the magnesium compound to one part by mass of the cyclic phosphorous compound.

As the cyclic phosphorous compound shown by the general formula (9), it is possible to list 9,10-dihydro-9-oxa-10-phosphaphenanethrene-10-oxide, 1-methyl-9,10-dihydro-9-oxa-10-phosphaphenanethrene-10-oxide, 2-methyl-9,10-dihydro-9-oxa-10-phosphaphenanethrene-10-oxide, 6-methyl-9,10-dihydro-9-oxa-10-phosphaphenanethrene-10-oxide, 7-methyl-9,10-dihydro-9-oxa-10-phosphaphenanethrene-10-oxide, 8-methyl-9,10-dihydro-9-oxa-10-phosphaphenanethrene-10-oxide, 6,8-dimethyl-9,10-dihydro-9-oxa-10-phosphaphenanethrene-10-oxide, 2,6,8-trimethyl-9,10-dihydro-9-oxa-10-phosphaphenanethrene-10-oxide, 2-ethyl-9,10-dihydro-9-oxa-10-phosphaphenanethrene-10-oxide, 6-ethyl-9,10-dihydro-9-oxa-10-phosphaphenanethrene-10-oxide, 8-ethyl-9,10-dihydro-9-oxa-10-phosphaphenanethrene-10-oxide, 6,8-diethyl-9,10-dihydro-9-oxa-10-phosphaphenanethrene-10-oxide, 2,6,8-triethyl-9,10-dihydro-9-oxa-10-phosphaphenanethrene-10-oxide, 2-i-propyl-9,10-dihydro-9-oxa-10-phosphaphenanethrene-10-oxide, 6-i-propyl-9,10-dihydro-9-oxa-10-phosphaphenanethrene-10-oxide, 8-i-propyl-9,10-dihydro-9-oxa-10-phosphaphenanethrene-10-oxide, 6,8-di-i-propyl-9,10-dihydro-9-oxa-10-phosphaphenanethrene-10-oxide, 2,6,8-tri-i-propyl-9,10-dihydro-9-oxa-10-phosphaphenanethrene-10-oxide, 2-s-butyl-9,10-dihydro-9-oxa-10-phosphaphenanethrene-10-oxide, 6-s-butyl-9,10-dihydro-9-oxa-10-phosphaphenanethrene-10-oxide, 8-s-butyl-9,10-dihydro-9-oxa-10-phosphaphenanethrene-10-oxide, 1,8-di-s-butyl-9,10-dihydro-9-oxa-10-phosphaphenanethrene-10-oxide, 2,6,8-tri-s-butyl-9,10-dihydro-9-oxa-10-phosphaphenanethrene-10-oxide, 2-t-butyl-9,10-dihydro-9-oxa-10-phosphaphenanethrene-10-oxide, 6-t-butyl-9,10-dihydro-9-oxa-10-phosphaphenanethrene-10-oxide, 8-t-butyl-9,10-dihydro-9-oxa-10-phosphaphenanethrene-10-oxide, 1,6-di-t-butyl-9,10-dihydro-9-oxa-10-phosphaphenanethrene-10-oxide, 2,6-di-t-butyl-9,10-dihydro-9-oxa-10-phosphaphenanethrene-10-oxide, 2,7-di-t-butyl-9,10-dihydro-9-oxa-10-phosphaphenanethrene-10-oxide, 2,8-di-t-butyl-9,10-dihydro-9-oxa-10-phosphaphenanethrene-10-oxide, 6,8-di-t-butyl-9,10-dihydro-9-oxa-10-phosphaphenanethrene-10-oxide, 2,6,8-tri-t-butyl-9,10-dihydro-9-oxa-10-phosphaphenanethrene-10-oxide, 2-t-amyl-9,10-dihydro-9-oxa-10-phosphaphenanethrene-10-oxide, 6-t-amyl-9,10-dihydro-9-oxa-10-phosphaphenanethrene-10-oxide, 8-t-amyl-9,10-dihydro-9-oxa-10-phosphaphenanethrene-10-oxide, 6,8-di-t-amyl-9,10-dihydro-9-oxa-10-phosphaphenanethrene-10-oxide, 2,6,8-tri-t-amyl-9,10-dihydro-9-oxa-10-phosphaphenanethrene-10-oxide, 2-t-octyl-9,10-dihydro-9-oxa-10-phosphaphenanethrene-10-oxide, 6-t-octyl-9,10-dihydro-9-oxa-10-phosphaphenanethrene-10-oxide, 8-t-octyl-9,10-dihydro-9-oxa-10-phosphaphenanethrene-10-oxide, 6,8-di-t-octyl-9,10-dihydro-9-oxa-10-phosphaphenanethrene-10-oxide, 2,6,8-tri-t-octyl-9,10-dihydro-9-oxa-10-phosphaphenanethrene-10-oxide, 2-cyclohexyl-9,10-dihydro-9-oxa-10-phosphaphenanethrene-10-oxide, 6-cyclohexyl-9,10-dihydro-9-oxa-10-phosphaphenanethrene-10-oxide, 8-cyclohexyl-9,10-dihydro-9-oxa-10-phosphaphenanethrene-10-oxide, 6,8-di-cyclohexyl-9,10-dihydro-9-oxa-10-phosphaphenanethrene-10-oxide, 2,6,8-tri-cyclohexyl-9,10-dihydro-9-oxa-10-phosphaphenanethrene-10-oxide, 6-phenyl-9,10-dihydro-9-oxa-10-phosphaphenanethrene-10-oxide, 2-benzyl-9,10-dihydro-9-oxa-10-phosphaphenanethrene-10-oxide, 6-benzyl-9,10-dihydro-9-oxa-10-phosphaphenanethrene-10-oxide, 8-benzyl-9,10-dihydro-9-oxa-10-phosphaphenanethrene-10-oxide, 6,8-di-benzyl-9,10-dihydro-9-oxa-10-phosphaphenanethrene-10-oxide, 2,6,8-tri-benzyl-9,10-dihydro- 9-oxa-10-phosphaphenanethrene-10-oxide, 2-(α-methylbenzyl)-9,10-dihydro-9-oxa-10-phosphaphenanethrene-10-oxide, 6-(α-methylbenzyl)-9,10-dihydro-9-oxa-10-phosphaphenanethrene-10-oxide, 8-(α-methylbenzyl)-9,10-dihydro-9-oxa-10-phosphaphenanethrene-10-oxide, 6,8-di(α-methylbenzyl)-9,10-dihydro-9-oxa-10-phosphaphenanethrene-10-oxide, 2,6,8-tri(α-methylbenzyl)-9,10-dihydro-9-oxa-10-phosphaphenanethrene-10-oxide, 2,6-di(α,α-dimethylbenzyl)-9,10-dihydro-9-oxa-10-phosphaphenanethrene-10-oxide, 6-t-butyl-8-methyl-9,10-dihydro-9-oxa-10-phosphaphenanethrene-10-oxide, 6-benzyl-8-methyl-9,10-dihydro-9-oxa-10-phosphaphenanethrene-10-oxide, 6-cyclohexyl-8-t-butyl-9,10-dihydro-9-oxa-10-phosphaphenanethrene-10-oxide, 6-benzyl-8-t-butyl-9,10-dihydro-9-oxa-10-phosphaphenanethrene-10-oxide, 6-(α-methylbenzyl)-8-t-butyl-9,10-dihydro-9-oxa-10-phosphaphenanethrene-10-oxide, 6-t-butyl-8-cyclohexyl-9,10-dihydro-9-oxa-10-phosphaphenanethrene-10-oxide, 6-benzyl-8-cyclohexyl-9,10-dihydro-9-oxa-10-phosphaphenanethrene-10-oxide, 6-t-butyl-8-benzyl-9,10-dihydro-9-oxa-10-phosphaphenanethrene-10-oxide, 6-cyclohexyl-8-benzyl-9,10-dihydro-9-oxa-10-phosphaphenanethrene-10-oxide, 2,6-di-t-butyl-8-benzyl-9,10-dihydro-9-oxa-10-phosphaphenanethrene-10-oxide, and 2,6-dicyclohexyl-8-benzyl-9,10-dihydro-9-oxa-10-phosphaphenanethrene-10-oxide.

It is possible to use these cyclic phosphorous compounds singly or in combination of not less than two kinds thereof.

As the magnesium compounds to be used as the β crystal nucleating agent of the present invention in combination with the cyclic phosphorous compound shown by the general formula (9), it is possible to list various magnesium phosphonate compounds, magnesium sulfate, basic magnesium sulfate (magnesium oxysulfate), and talc. It is possible to use these magnesium compounds singly and in combination of not less than two kinds thereof.

The mass ratio of the magnesium compound to the cyclic phosphorous compound shown by the general formula (9) is not limited to a specific one, but is set normally 0.01 to 100 parts by mass of the magnesium compound and preferably 0.1 to 10 parts by mass of the magnesium compound to one part by mass of the cyclic phosphorous compound.

As the "bivalent hydrocarbon radicals" of the "bivalent hydrocarbon radicals which may have been substituted" described in the present specification, it is possible to list saturated straight-chain bivalent hydrocarbon radicals, unsaturated straight-chain bivalent hydrocarbon radicals, saturated cyclic bivalent hydrocarbon radicals, and unsaturated cyclic bivalent hydrocarbon radicals.

As the saturated straight-chain bivalent hydrocarbon radical, it is possible to list groups resulting from the removal of one terminal hydrogen atom from a straight-chain alkyl group (for example, $C_{1-10}$ alkyl groups such as methyl, ethyl, n-propyl, n-butyl, n-pentyl, n-hexyl, n-heptyl, n-octyl, n-nonyl) are exemplified. More specifically straight-chain $C_{1-6}$ alkylene such as methylene, ethylene, propylene, butylene, pentylene, and the like.

As the unsaturated straight-chain bivalent hydrocarbon radical, it is possible to list groups resulting from the removal of one terminal hydrogen atom from a straight-chain alkenyl group (for example, $C_{2-6}$ alkenyl groups of such as vinyl, aryl, 1-propenyl, 1-butenyl, 2-nutenyl, 3-butenyl, 1-pentenyl, 2-pentenyl, 3-pentenyl, 4-pentenyl, 1-hexenyl, 2-hexenyl, 3-hexenyl, 4-hexenyl, and 5-hexenyl) and a straight-chain alkynyl group (for example, $C_{2-6}$ alkynyl groups such as ethynyl, 1-propynyl, 2-propynyl, 1-butynyl, 2-butynyl, 3-butynyl, 1-pentynyl, 2-pentynyl, 3-pentynyl, 4-pentynyl, 1-hexynyl, 2-hexynyl, 3-hexynyl, 4-hexynyl, and 5-hexynyl). More specifically, straight-chain $C_{2-6}$ alkenylene and $C_{2-6}$ alkynylene are listed.

As the saturated cyclic bivalent hydrocarbon radicals, it is possible to list groups (for example, $C_{5-7}$ cycloalkylene) resulting from the removal of one hydrogen atom at an arbitrary position (favorably carbon atoms different from carbon atoms having bonding hands and more favorably a carbon atom remotest from the carbon atom having the bonding hands) of cycloalkyl groups (for example, $C_{3-9}$ cycloalkyl groups such as cyclopropyl, cyclobutyl, cyclopentyl, cyclohexyl, cycloheptyl, cyclooctyl, and cyclononyl) and the like.

As the unsaturated cyclic bivalent hydrocarbon radicals, it is possible to list groups (for example, $C_{6-12}$ arylene and the like) resulting from the removal of one hydrogen atom disposed at an arbitrary position (favorably carbon atoms different from carbon atoms having bonding hands and more favorably carbon atoms remotest from the carbon atoms having the bonding hands) of a cycloalkenyl group (for example, a $C_{3-6}$ cycloalkenyl group such as 2-cyclopentene-1-yl, 3-cyclopentene-1-yl, 3-cyclohexene-1-yl, 1-cyclobutene-1-yl, 1-cyclopentene-1-yl, and the like), a cycloalkanedienyl group (for example, a $C_{4-6}$ cycloalkanedienyl group such as 2,4-cyclopentanediene-1-yl, 2,4-cyclohexanediene-1-yl, 2,5-cyclohexanediene-1-yl, and the like), and an aryl group (for example, a $C_{6-12}$ aryl group such as phenyl, naphthyl, and the like).

As the "bivalent hydrocarbon radicals which may have been substituted", it is possible to list a hydroxyl group, halogen atoms (fluorine, chlorine, bromine, iodine), a nitro group, a cyano group, an amino group which may have been substituted, lower alkyl group which may have been substituted, a lower alkoxy group which may have been substituted with one to five halogen atoms (for example, fluorine, chlorine, bromine, iodine), a carboxyl group which may be esterified, and a carbamoyl group which may have been substituted. These substituent groups may have been substituted at chemically allowed one to three positions (preferably one or two).

As the hydrocarbon radical of the "hydrocarbon radical which may have been substituted" described in the present specification, an aliphatic chain hydrocarbon radical, an alicyclic hydrocarbon radical, an aryl group, and an aralkyl group are listed.

As the "aliphatic chain hydrocarbon radical", straight-chain or branched-chain aliphatic hydrocarbon radicals such as an alkyl group, an alkenyl group, and an alkynyl group are listed.

As the alkyl group, it is possible to list $C_{1-10}$ (preferably $C_{1-6}$ alkyl and the like) alkyl groups such as methyl, ethyl, n-propyl, isopropyl, n-butyl, isobutyl, sec-butyl, tert-butyl, n-pentyl, isopentyl, neopentyl, 1-methylpropyl, n-hexyl, isohexyl, 1,1-dimethylbutyl, 2,2-dimethylbutyl, 3,3-dimethylbutyl, 3,3-dimethylpropyl, 2-ethylbutyl, n-heptyl, 1-methylheptyl, 1-ethylhexyl, n-octyl, 1-methylheptyl, and nonyl.

As the alkenyl group, it is possible to list $C_{2-6}$ alkenyl groups such as vinyl, aryl, isopropenyl, 2-methylaryl, 1-propenyl, 2-methyl-1-propenyl, 1-butenyl, 2-butenyl, 3-butenyl, 2-ethyl-1-butenyl, 2-methyl-2-butenyl, 3-methyl-2-butenyl, 1-pentenyl, 2-pentenyl, 3-pentenyl, 4-pentenyl, 4-methyl-3-pentenyl, 1-hexenyl, 2-hexenyl, 3-hexenyl, 4-hexenyl, and 5-hexenyl.

As the alkynyl group, it is possible to list $C_{2-6}$ alkynyl groups such as ethynyl, 1-propynyl, 2-propynyl, 1-butynyl, 2-butynyl, 3-butynyl, 1-pentynyl, 2-pentynyl, 3-pentynyl, 4-pentynyl, 1-hexynyl, 2-hexynyl, 3-hexynyl, 4-hexynyl, and 5-hexynyl.

As examples of the hydrocarbon radical, the "alicyclic hydrocarbon radical" is exemplified, as described above. As the "alicyclic hydrocarbon radical", saturated or unsaturated alicyclic hydrocarbon radicals such as a cycloalkyl group, a cycloalkenyl group, a cycloalkanedienyl group are listed.

As the "cycloalkyl group", $C_{3-9}$ cycloalkyl groups such as cyclopropyl, cyclobutyl, cyclopentyl, cyclohexyl, cycloheptyl, cyclooctyl, and cyclononyl are listed.

As the "cycloalkenyl group", $C_{3-6}$ cycloalkenyl groups such as 2-cyclopentene-1-yl, 3-cyclopentene-1-yl, 2-cyclohexene-1-yl, 3-cyclohexene-1-yl, 1-cyclobutene-1-yl, and cyclopentene-1-yl are listed.

As the "cycloalkanedienyl group", $C_{4-6}$ cycloalkanedienyl groups such as 2,4-cyclopentanediene-1-yl, 2,4-cyclohexanediene-1-yl, and 2,5-cyclohexanediene-1-yl are listed.

As examples of the hydrocarbon radical, the "aryl group" is exemplified, as described above. As the "aryl group", monocyclic and condensed polycyclic aromatic hydrocarbon radicals are exemplified. Specifically, $C_{6-14}$ aryl groups such as phenyl, naphthyl, anthryl, phenanthryl, and acenaphthylenyl are listed.

As examples of the hydrocarbon radical, the "aralkyl group" is exemplified, as described above. As the "aralkyl group", $C_1$—19 aralkyl groups such as benzyl, phenethyl, diphenylmethyl, 1-naphthylmethyl, 2-naphthylmethyl, 2,2-diphenylethyl, 3-phenylpropyl, 4-phenylbutyl, 5-phenylpentyl, 2-biphenylylmethyl, 3-biphenylylmethyl, and 4-biphenylylmethyl are listed.

As the substituent of the "hydrocarbon radical which may have been substituted", it is possible to list an alkyl group which may have been substituted, an alkenyl group which may have been substituted, an alkynyl group which may have been substituted, an aryl group which may have been substituted, a cycloalkyl group which may have been substituted, a cycloalkenyl group which may have been substituted, a heterocyclic group which may have been substituted, an amino group which may have been substituted, an imidoyl group which may have been substituted, an amino group which may have been substituted, a hydroxyl group which may have been substituted, a thiol group which may have been substituted, a carboxylic group which may have been esterified, a carbamoyl group which may have been substituted, a thiocarbamoyl group which may have been substituted, halogen atoms (for example fluorine, chlorine group, iodine, preferably chlorine, bromine), a cyano group, a nitro group, an acyl group derived from sulfonic acid, and an acyl group derived from the carboxylic group. These substituents may have been substituted at one to three (preferably one or two positions) chemically permitted positions.

As an example of especially preferable β crystal nucleating agent, it is possible to exemplify "Enujesuta-NU-100" produced by New Japan Chemical Co., Ltd. As examples of the polypropylene resin to which the β crystal nucleating agent is added, it is possible to list polypropylene "Bepol B-022SP" produced by Aristec Inc., "Beta (β)-PP BE60-7032" produced by Borealis Inc., and polypropylene "BNX BETAPP-LN" produced by Mayzo Inc.

It is necessary to appropriately adjust the mixing ratio of the crystal nucleating agent to the polypropylene resin of the first layer according to the kind of the β crystal nucleating agent or the composition of the polypropylene resin. It is favorable to use 0.0001 to 5.0 parts by mass of the β crystal nucleating agent, more favorable to use 0.001 to 3.0 parts by mass thereof, and especially favorable to use 0.01 to 1.0 parts by mass thereof for 100 parts by mass of the polypropylene resin. When the mixing ratio of the β crystal nucleating agent is not less than 0.0001 parts by mass, it is possible to sufficiently generate and grow the β crystal of the polypropylene resin at a production time and securely obtain the β activity and/or the β crystal generation power to a sufficient degree. Thereby the obtained laminated porous film is capable securely obtaining the β activity and/or the β crystal generation power to a sufficient degree, thus obtaining desired air permeability performance and mechanical strength. The addition of the β crystal nucleating agent not more than 5.0 parts by mass to the polypropylene resin is economically advantageous and in addition, prevents the β crystal nucleating agent from bleeding to the surface of the film, which is preferable.

When the composition of the first layer contains the polypropylene resin as its main component and the β crystal nucleating agent added to the polypropylene resin, the total mass of the polypropylene resin and the β crystal nucleating agent is set to not less than 70 mass %, favorably not less than 80 mass %, and more favorably not less than 90 mass % for the whole mass of the first layer.

The composition of the first layer may contain ordinary additives or other components in a range in which they do not inhibit the properties of the first layer. The additives are added to the resin to improve and adjust molding processability, productivity, and various properties of the laminated porous film. It is possible to list a recycle resin which is generated from trimming loss such as a lug; inorganic particles such as silica, talc, kaolin, calcium carbonate, and the like; pigments such as titanium oxide, carbon black, and the like; a flame retardant; a weathering stabilizer, a heat stabilizer, an antistatic agent; a melt viscosity improving agent; a crosslinking agent; a lubricant; plasticizer; an age resistor; an antioxidant; a light stabilizer; an ultraviolet ray absorber; a neutralizing agent; an antifog agent; an anti-blocking agent; a slip agent; and a coloring agent. Specifically the antioxidant described on pages 154 through 158, the ultraviolet ray absorber described on pages 178 through 182, the surface active agent serving as the antistatic agent described on pages 271 through 275, the lubricant described on pages 283 through 294 of "Formulation for Plastics".

Description of Second Layer

The second layer is formed as the heat-resistant layer (HR layer) consisting of the resin composition having α crystal fusion peak temperature higher than that of the resin composition of the first layer.

The second layer may have any constructions, provided that it has a large number of pores intercommunicable with each other in the thickness direction thereof and consists of a composition having the crystal fusion peak temperature higher than that of the resin composition of the first layer. For example, the second layer may have a structure having fine pores formed in a membrane material made of a thermoplastic resin composition or may have a structure in which particulate or fibrous micro-substances aggregate to form a layer and gaps between the micro-substances form the fine pores. It is preferable that the HR layer of the present invention has the former structure which allows uniform fine pores to be formed and a porosity and the like to be easily controlled.

The thermal property of the thermoplastic resin contained in the composition composing the second layer is important. That is, it is necessary to so select the thermoplastic resin that the crystal fusion peak temperature of the composition composing the second layer is higher than that of the resin composition composing the first layer. Specifically, it is preferable that the second layer contains the thermoplastic resin whose crystal fusion peak temperature is not less than 200° C. Although the upper limit of the crystal fusion peak temperature of the thermoplastic resin of the second layer is not limited to a specific temperature, the upper limit thereof is preferably not more than 400° C.

The crystal fusion peak temperature is a peak value of the crystal fusion temperature detected when the second layer having a temperature of 25° C. is heated at a heating speed of 10 C/minute in accordance with JIS k7121 by using a differential scanning calorimeter.

As the thermoplastic resin (heat-resistant thermoplastic resin) whose crystal fusion peak temperature is not less than 200° C. is not limited to a specific one, it is possible to use the following heat-resistant thermoplastic resins satisfying the condition of the crystal fusion peak temperature: Polyolefin resin such as polymethylpentene, ethylene-propylene-diene; polyether resin such as polyacetal, polyphenylene ether, polyether ether ketone, polysulfone, polyether sulfone, and polyphenylene sulfide; polyamide resin such as nylon 6, nylon 6-6, and nylon 6-12; polystyrene resin; methacrylic resin; polyvinyl chloride resin; fluorine resin; polyester resin, and aramid resin.

It is possible to preferably use the polyester resin, the polystyrene resin, the fluorine resin, and the polymethyl pentene. In using the laminated porous film as a battery separator, the polymethyl pentene and the fluorine resin are preferable as the thermoplastic resin from the standpoint of the resistance thereof to chemicals.

As the polyester resin, copolymers of dicarboxylic acid and alcohol components are exemplified. More specifically, polyethylene terephthalate, polybutylene terephthalate, polyarylate, polytrimethylene terephthalate, and polyethylene naphthalate are listed. To improve the heat resistance of the laminated porous film of the present invention, the polybutylene terephthalate which has a high crystallizability and crystalline speed is used more suitably than the other polyester resins.

The polyester resin can be produced by using a known method or commercially available products can be used. For example, as the polybutylene terephthalate, it is possible to obtain "Duranex" (commercial name) produced by Polyplastics Co., Ltd. and "Nobadyuran" (commercial name) produced by Mitsubishi Engineering-Plastic Corporation as commercially available products.

As the polystyrene resin, a homopolymer of styrene and copolymers of styrene and monomers copolymerizable with the styrene are exemplified. Specifically it is possible to list atactic polystyrene, syndiotactic polystyrene, a styrene-conjugated diene copolymer, and hydrogenated derivatives thereof. As the styrene-conjugated diene copolymer, acrylonitrile-styrene resin (AS resin), acrylonitrile-butadiene-styrene resin (ABS resin) are listed.

Of these polystyrene resins, to improve the heat resistance of the laminated porous film of the present invention, the syndiotactic polystyrene having a high crystallizability can be used more suitably than the other polystyrene resins.

The polystyrene resin can be produced by using a known method. Alternatively it is possible to use products commercially available. For example, as the syndiotactic polystyrene, "Zarekku" (commercial name) produced by Idemitsu Kosan Co., Ltd.) can be obtained as a product commercially available.

As the fluorine resin, it is possible to list polytetrafluoroethylene, an ethylene-tetrafluoroethylene copolymer, a tetrafluoroethylene-hexafluoropropylene copolymer, a tetrafluoroethylene-perfluoroalkoxy vinyl ether copolymer, and polyvinylidene fluoride. Of these fluorine resins, the polyvinylidene fluoride can be suitably used from the standpoint of molding processability.

The fluorine resin can be produced by using a known method. Alternatively it is possible to use products commercially available. For example, as the ethylene-tetrafluoroethylene copolymer and the polytetrafluoroethylene, a product "Fluon" (commercial name) produced by Asahi Glass Co., Ltd. and a product "Porifuron" (commercial name) produced by Daikin Corporation) can be obtained respectively as products commercially available.

As necessary, mixtures of not less than two kinds of resins may be used for the second layer. In this case, it is favorable to mix the above-described heat-resistant thermoplastic resins with each other or the heat-resistant thermoplastic resin and other thermoplastic resin with each other. It is especially favorable to mix the heat-resistant thermoplastic resins with each other.

As other thermoplastic resins that can be mixed with the heat-resistant thermoplastic resin, it is possible to list polyolefin resin such as low-density polyethylene, high-density polyethylene, linear low-density polyethylene, an ethylene-vinyl acetate copolymer, and polypropylene; and polyester resin such as polycarbonate and polyarylate. In using the laminated porous film as the battery separator, it is preferable to use the polyolefin resin as the other thermoplastic resin from the standpoint of the resistance thereof to chemicals.

As necessary, the resin composition composing the second layer may contain a rubber component such as a thermoplastic elastomer. As the thermoplastic elastomer, it is possible to list styrene butadiene thermoplastic elastomer, polyolefin thermoplastic elastomer, urethane thermoplastic elastomer, polyester thermoplastic elastomer, polyamide thermoplastic elastomer, 1,2-polybutadiene thermoplastic elastomer, polyvinyl chloride thermoplastic elastomer, and ionomer.

A filler is contained in the resin composition of the second layer of the laminated porous film of the first embodiment. As described above, the second layer is made of the resin composition having a higher crystal fusion peak temperature than that of the polypropylene resin of the first layer. As described above, it is preferable that the resin composition of the second layer contains the filler in addition. Because the second layer contains the filler, it is possible to form a porous structure efficiently in the second layer and easily control the configuration of pores.

As the filler, both inorganic and organic fillers can be used. It is possible to use them singly or in combination of not less than two kinds thereof. From the standpoint of the heat resistance of the second layer, it is preferable to use the inorganic filler.

As examples of the inorganic filler, carbonates such as calcium carbonate, magnesium carbonate, and barium carbonate; sulfates such as calcium sulfate, magnesium sulfate, barium sulfate; chlorides such as sodium chloride, calcium chloride, and magnesium chloride; oxides such as aluminum oxide, calcium oxide, magnesium oxide, zinc oxide, titanium oxide, and silica; and silicates such as talc, clay, and mica. Of these inorganic fillers, barium sulfate is preferable because it has a low solubility in an electrolyte when it operates when the laminated porous film is used as the battery separator.

As the organic filler, resin particles having a higher crystal fusion peak temperature than that of the thermoplastic resin contained in the second layer are favorable. Crosslinked resin particles whose gel fraction is 4 to 10% are more favorable. As examples of the organic filler, it is possible to list thermoplastic resins such as ultra-high-molecular-weight polyethylene, polystyrene, polymethyl methacrylate, polycarbonate, polyethylene terephthalate, polybutylene terephthalate, polyphenylene sulfide, polysulfone, polyethersulfone, polyether ether ketone, polytetrafluoroethylene, polyimide, polyetherimide, melamine, benzoguanamin; and thermosetting resins. Of these organic fillers, the crosslinked polystyrene is especially preferable.

The average particle diameter of the filler is 0.1 to 50 µm, favorably 0.3 to 10 µm, more favorably 0.5 to 5 µm. When the average particle diameter of the filler is less than 0.1 µm, owing to aggregation of filler particles, the dispersibility thereof deteriorates. Thus it is difficult to uniformly disperse the filler particles in the thermoplastic resin composition. When the average particle diameter of the filler is less than 0.1 µm, the dispersibility of the filler deteriorates. Thus in forming fine pores by debonding the interface of the filler and the thermoplastic resin by stretching the film, there occurs shortage in the number starting points in forming the second layer porous. Thus it is difficult to efficiently obtain the laminated porous film. On the other hand, when the average particle diameter of the filler exceeds 50 µm, it is difficult to thin the film and in addition the mechanical strength thereof deteriorates conspicuously, which is unpreferable.

In forming fine pores by debonding the interface of the filler and the thermoplastic resin, the mixing amount of the filler for 100 parts by mass of the whole thermoplastic resin contained in the second layer is set to 50 to 400 parts by mass and favorably 50 to 300 parts by mass. When the amount of the filler is less than 50 parts by mass, the effect to be obtained by adding the filler to the thermoplastic resin cannot be sufficiently obtained. Thus it is difficult to obtain a desired preferable porous structure. On the other hand, when the amount of the filler is more than 400 parts by mass, failure such as burning of the resin is liable to occur at a molding step, and in addition forming stability deteriorates.

In any of the first and second embodiments, the resin composition composing the second layer may contain a plasticizer. In adding the filler to the resin, it is preferable to add the plasticizer thereto to improve the dispersibility of the filler.

As the plasticizer, it is possible to list ester compounds, amide compounds, alcohol compounds, amine compounds, epoxy compounds, ether compounds, mineral oil, wax, liquid silicone, fluorine oil, liquid polyethers, liquid polybutenes, liquid polybutadienes, carboxylates, carboxylic acid compounds, sulfonates, sulfone compounds, amine salts, and fluorine compounds.

Specifically it is possible to exemplify the compounds described in "Plastic Formulation" (second edition published on Nov. 30, 1985 by TAISEISHA Ltd.) described on pages 31 through 64, page 83, pages 97 through 100, pages 154 through 158, pages 178 through 182, pages 271 through 275, and pages 283 through 294. It is also possible to use the compounds of the surfactants listed in "New Introduction to Surfactants" (third edition published by Sanyo Chemical Industries, Ltd. in August of 1992) as the plasticizer.

More specifically, as the ester compounds, tetraglycerine tristearate, glycerol tristearate, stearyl stearyrate, ethylene carbonate, distearyl carbonate, and dioctyl naphthalate are listed.

As the amide compounds, ethylene-bis-stearamide, hexamethylene-bis-stearamide, and the like are listed.

As the alcohol compounds, stearyl alcohol, oleyl alcohol, dodecylphenol, and the like are listed.

As the amine compounds, dihydroxyethylstearylamine, laurylamine, and the like are listed.

As the amine salt compounds, stearyldimethylbetaine, lauryltrimethylammonium chloride, and the like are listed.

As the epoxy compounds, epoxidized soybean is exemplified.

As the ether compounds, triethylene glycol, and the like are listed.

As the mineral oil, kerosene, naphthene oil, and the like are exemplified.

As the wax, paraffin wax and the like are exemplified.

As the carboxylates, calcium stearate, sodium oleate, and the like are listed.

As the carboxylic acid compounds, stearic acid, caproic acid, and the like are listed.

As the sulfonates, sodium dodecylbenzene sulfonate, and the like are listed.

As the sulfone compounds, sulfolane, dipropylsulfone, and the like are listed.

In view of the use of the laminated porous film of the present invention, it is preferable that the plasticizer has a melting point not less than 25° C. and a boiling point not less than 140° C.

That the melting point of the plasticizer is not less than 25° C. is defined that the plasticizer has the crystal fusion peak temperature not less than 25° C. in measurement made by using a differential scanning calorimeter or that the plasticizer whose kinematic viscosity at 25° C. is not less than $100000=^2/$ second.

That the boiling point of the plasticizer is not less than 140° C. means that the boiling point is clearly not less than 140° C. or a case in which the mass of the plasticizer after it is heated for one hour does not decrease by not less than 10% with respect to the mass thereof before it is heated.

The mixing amount of the plasticizer for 100 parts by mass of the entire thermoplastic resin contained in the second layer is set to 0.1 to 30 parts by mass, favorably 0.1 to 20 parts by mass, and more favorably 0.5 to 10 parts by mass. When the mixing amount of the plasticizer is less than 0.1 parts by mass, it is difficult for the second layer to display an intended favorable stretchability, and a nonuniform porous structure is liable to be formed. That is, it is impossible to sufficiently obtain the effect to be provided by the addition of the plasticizer to the thermoplastic resin. When the mixing amount of the plasticizer exceeds 30 parts by mass, disadvantages such as deterioration of the resin and bleeding are liable to occur at a production step in molding the laminated porous film into a membrane material.

The resin composition of the second layer may contain additives in a range in which the addition of the additives to the thermoplastic resin does not damage the object of the present invention and the properties of the second layer. Specifically, additives which can be added to the thermoplastic resin are the same as those which can be added to the PP layer.

Description of Laminated Construction

The laminated structure is not limited to a specific one, provided that the first layer and the second layer constructing the basic part thereof are present. The simplest laminated construction is a two-layer construction consisting of the first layer and the second layer. The second simplest laminated construction is a two-kind three-layer construction consisting of both outer layers and an intermediate layer. These two constructions are preferable. In the case of the two-kind three-layer construction, the first layer/the second layer/the first layer and the second layer/the first layer/the second layer can be adopted. As necessary, it is possible to form a three-kind three-layer construction by combining a layer having other function with the first and second layers. It is also possible to increase the number of layers as necessary. For example, four-layer, five-layer, six-layer, and seven-layer constructions can be adopted.

The ratio of the thickness of the first layer to that of the second layer is set to 0.1 to 10, favorably 0.3 to 5, and more favorably 0.5 to 3. That the ratio is not more than 0.1 means that the first layer is not substantially formed. Thus it is difficult to provide the laminated porous film with a sufficient strength. When the ratio is more than 10, the BD characteristic cannot be sufficiently displayed. Thus when the laminated porous film is applied to a battery, it is difficult to ensure the safety of the battery. When layers other than the first and second layers are formed, the ratio of the total of the thickness of the other layers to the entire thickness of the laminated porous film is 0.1 to 0.5 and preferably 0.1 to 0.3.

Although the shape of the laminated porous film is flat or tubular, the flat shape is more favorable than the tubular shape because the former allows several products to be obtained widthwise from one sheet. Therefore the former provides a high productivity and allows the inner surface of the sheet to be coated.

The thickness of the laminated porous film of the present invention is set to 1 to 500 μm, favorably 5 to 300 μm, and more favorably 7 to 100 μm. When the laminated porous film is used as the battery separator, the thickness of the laminated porous film is set to favorably 1 to 50 μm and more favorably 10 to 30 μm. When the laminated porous film is used as the separator for the battery, it is necessary to set the thickness of the laminated porous film to not less than 1 μm and preferably not less than 10 μm. Thereby it is possible to obtain a substantially necessary electrical insulating performance. In this case, when a high voltage is applied to the battery, short-circuit hardly occurs and the battery is safe. When the thickness of the laminated porous film is set to not more than 500 μm and preferably not more than 30 μm, it is possible to set the electric resistance of the laminated porous film low, which ensures a sufficient performance of the battery.

The properties of the laminated porous film of the present invention can be freely adjusted according to the composition of the first layer or that of second layer, the number of layers, the ratio among the thicknesses of layers to be laminated, the combination of the first and second layers and other layers having properties other than those of the first and second layers, and a production method.

As one of the characteristics of the laminated porous film of the present invention, the laminated porous film has a higher heat resistance than a conventional porous film containing the polypropylene resin. More specifically, it is preferable that the laminated porous film of the present invention displays the BD characteristic at not less than 200° C. That is, the break-down temperature of the laminated porous film of the present invention is not less than 200° C., favorably not less than 220° C., and more favorably not less than 250° C.

Let it be supposed that the laminated porous film of the present invention having the break-down temperature at not less than 200° C. is used as the battery separator. Even though a battery stores heat or generates heat and the separator is subjected to a high temperature, the battery separator is not broken and prevents a direct contact between the positive and negative poles. Thus the battery little gives rise to explosion and firing. Therefore the battery separator is very safe.

The upper limit of the break-down temperature is not limited to a specific temperature.

The "break-down temperature" means the lowest temperature of temperatures at which the laminated porous film of the present invention breaks when it is heated by using a method described in the examples of the present invention which is described later.

As means for raising the shut-down temperature, it is effective to increase the volume ratio of the second layer to the first layer or select a thermoplastic resin having a higher crystal fusion peak temperature as the thermoplastic resin to be contained in the second layer.

The air permeability resistance of the laminated porous film of the first embodiment is set to 1 to 10000 seconds/100 ml, favorably 5 to 3000 seconds, and more favorably 10 to 1000 seconds. Let it be supposed that the air permeability resistance of the laminated porous film is larger than 10000 seconds/100 ml. In this case, a numerical value of the air permeability resistance is obtained in measurement. But when the laminated porous film has the air permeability resistance in this range, the laminated porous film has a structure in which pores are intercommunicable with each other to a very low extent. That is, the pores are not substantially intercommunicable with each other. On the other hand, when the air permeability resistance of the laminated porous film is less than 1 second/100 ml, the laminated porous film has a coarse porous structure and pore diameters are very large, which is unpreferable.

The air permeability resistance means the degree of difficulty in pass-through of air in the thickness direction of the film and is expressed by seconds it takes for air having a volume of 100 ml to pass through the film. Therefore the smaller a numerical value is, the more easily the air passes through the film. On the other hand, the larger the numerical value is, the more difficultly the air passes therethrough. That is, the smaller the numerical value is, the more intercommunicable pores are in the thickness direction of the film. On the other hand, the larger the numerical value is, the more difficultly the air passes therethrough. That is, the smaller the numerical value is, the less intercommunicable pores are in the thickness direction of the film. The intercommunicable performance means the degree of connection or communication among the pores in the thickness direction of the film. When the laminated porous film has a low air permeability resistance, it is applicable to various uses. For example, when the laminated porous film having a low air permeability resistance is used as a separator of a lithium-ion rechargeable battery, the separator facilitates the movement of lithium ions, thus allowing the battery to have an excellent performance.

The porosity of the laminated porous film of the present invention is set to favorably 5 to 80% and more favorably 20 to 70%. The porosity is an important factor for specifying a porous structure. When the porosity is less than 5%, it is difficult to substantially obtain intercommunicable performance. When the porosity is more than 80%, it is difficult to handle the film in terms of the mechanical strength thereof, which is unpreferable.

The porosity is measured by using the method described in the example of the present invention.

Irrespective of the thickness of the laminated porous film of the present invention, the pin puncture strength thereof is set to favorably not less than 1.5N, more favorably not less than 2.0N, and most favorably not less than 3.0N. When the laminated porous film of the present invention is used as the battery separator, the pin puncture strength greatly affects the generation of a short circuit at a production time of the battery and the productivity thereof. When the pin puncture strength is less than 1.5N, there is a high possibility that the film is broken by a foreign matter at the production time of the battery, which increases the probability of the generation of the short circuit. Although the upper limit value of the pin puncture strength is not limited to a specific value, normally the film whose pin puncture strength is less than 10N is used.

The pin puncture strength is measured by using the method described in the example of the present invention.

It is preferable that the laminated porous film of the present invention has a small anisotropy from the standpoint of the property thereof. The anisotropy can be expressed by the ratio of a tensile strength in an MD direction (pick-up direction (flow direction)) to a tensile strength in a TD direction (direction perpendicular to the MD direction) or the ratio of a tear strength in the MD direction to a tear strength in the TD direction.

Exemplifying the tensile strength, the lower limit of the ratio of the strength in the MD direction to the strength in the TD direction is set to 0.05, favorably not less than 0.1, and more favorably not less than 0.3. When the above-described ratio is more than 0.05, the obtained film has a favorable physical balance. In addition it is easy to handle the film, and the obtained film has a small anisotropy in its porous structure. The upper limit of the ratio of "MD strength/TD strength" is set to not more than 20, favorably not more than 10, and more favorably not more than 7. When the ratio of "MD strength/TD strength" is less than 20, the obtained film has a favorable physical balance. In addition it is easy to handle the film, and the obtained film has a small anisotropy in its porous structure.

The method of measuring the tensile strength is carried out in accordance with JIS K7127. Specifically both the MD and the TD are measured by setting the width thereof to 15 mm, the length thereof to 150 mm, the distance between evaluation points to 50 mm, the distance between chucking points to 70 mm, and the cross head speed to 200 mm/minute. In the present invention, the tensile strength is measured at a break point of the film.

The MD tensile strength is set to not less than 50 MPa, favorably not less than 100 MPa and more favorably not less than 120 MPa. The film having the MD tensile strength more than 50 MPa is capable of withstanding a force applied when it is handled. Although the upper limit value of the MD tensile strength is not limited to a specific value, preferably, the upper limit value thereof is so set that the balance between the MD tensile strength and the TD tensile strength is not out of the above-described range.

The TD tensile strength is set to not less than 50 MPa, favorably not less than 100 MPa, and more favorably not less than 120 MPa. The film having the TD tensile strength more than 50 MPa is capable of withstanding a force applied when it is handled. Although the upper limit value of the TD tensile strength is not limited to a specific value, preferably, the upper limit value thereof is so set that the balance between the TD tensile strength and the MD tensile strength is not out of the above-described range.

Description of Production Method

The method of producing the laminated porous film of the present invention is described below. The present invention is not limited to the laminated porous film produced by the production method.

The method of producing the laminated porous film of the present invention is classified into the following two methods in terms of making layers porous and the order of laminating the layers.

(a) A method of forming a porous film, containing the polypropylene resin, which is to be formed as the first layer and a porous film consisting of a composition, having a higher crystal fusion peak temperature than that of the composition of the porous film of the first layer, which is to be formed as the second layer and layering the porous film which is to be formed as the first layer and the porous film which is to be formed as the second layer one upon another.

(b) A method of forming a laminated unporous membrane material composed of at least two layers consisting of the first layer containing the polypropylene resin and the second layer consisting of the composition whose crystal fusion peak temperature is higher than that of the composition of the first layer and making the laminated unporous membrane material porous.

As the former method, it is possible to exemplify a method of laminating the porous film which is to be formed as the first layer and the porous film which is to be formed as the second layer one upon another and a method of layering the first and second layers one upon another with an adhesive agent.

As the latter method, after an unporous membrane material containing the polypropylene resin and an unporous membrane material consisting of a composition having the crystal fusion peak temperature higher than that of the composition of the unporous membrane material are formed, both unporous membrane materials are layered one upon another. Thereafter both unporous membrane materials are made porous. As another method, after the laminated unporous membrane material is directly formed by carrying out co-extrusion, the unporous membrane material is made porous.

In the present invention, the method of using the co-extrusion is especially preferable because production steps of the method are simple and from the standpoint of the productivity to be obtained thereby.

Separately from the above-described classification, the method of producing the laminated porous film of the present invention can be also classified by the method of making the second layer porous.

That is, when the first layer has the β activity and/or the β crystal generation power, fine pores can be easily formed by stretching the first layer. As the method of making the second layer porous, it is possible to use known methods such as a filler method, a phase separation method, an extraction method, a chemical treatment method, an irradiation etching method, a foaming method, and methods to be carried out in combination of these techniques. In the present invention, it is preferable to use the filler method.

In the filler method, the unporous layer or the unporous membrane material is formed by using a composition in which the filler is added to the resin and debonding the interface of the resin and the filler by stretching the unporous layer or the unporous membrane material to form the fine pores.

In the phase separation method also called a conversion method or a micro phase separation method, the fine pores are formed based on a phase separation phenomenon of a solution of a high polymer molecule. Specifically the phase separation method is classified into (a) a method of forming the fine pores by the phase separation of the high polymer molecule and (b) a method of making the second layer porous while the fine pores are being formed at a polymerization time. The former method is classified into a solvent gel method using a solvent and a thermofusion rapid solidification method. Both methods can be used.

In the extraction method, an additive removable in a post process is mixed with the thermoplastic resin composition composing the second layer to form the unporous layer or the unporous membrane material. Thereafter the additive is extracted with a chemical to form the fine pores. As the additive, a polymeric additive, an organic additive, and an inorganic additive are listed.

As an example of the extraction method in which the polymeric additive is used, it is possible to exemplify a method of forming the unporous layer or the unporous membrane material by using two kinds of polymers different from each other in the solubility in an organic solvent and immersing the unporous layer or the unporous membrane material in the organic solvent in which one of the two kinds of polymers dissolves to extract one of the two kinds of polymers. More specifically it is possible to exemplify a method of forming the unporous layer or the unporous membrane material consisting of polyvinyl alcohol and polyvinyl acetate and extracting the polyvinyl acetate by using acetone and n-hexane, and a method of containing a hydrophilic polymer in a block copolymer or a graft copolymer to form the unporous layer or the unporous membrane material and removing the hydrophilic polymer by using water.

As an example of the extraction method in which the organic additive is used, it is possible to exemplify a method of adding a substance soluble to an organic solvent in which the thermoplastic resin composing the second layer is insoluble to form the unporous layer or the unporous membrane material and immersing the unporous layer or the unporous membrane material in the organic solvent to remove the substance by extraction.

As the above-described substance, it is possible to list higher aliphatic alcohol such as stearyl alcohol and ceryl alcohol; n-alkanes such as n-decane and n-dodecane; paraffin wax; liquid paraffin; and kerosene. These substances can be extracted with the organic solvent such as isopropanol, ethanol, and hexane. As the above-described substance, water-soluble substances such as sucrose, sugar, and the like are listed. Because these water-soluble substances can be extracted with water, they impose burden on environment to a low extent.

In the chemical treatment method, fine pores are formed by chemically cutting bonds at a portion of a polymeric substrate and performing a bonding reaction. More specifically, methods of forming fine pores by performing chemical treatment such as redox treatment, alkali treatment, and acid treatment are exemplified.

In the irradiation etching method, fine pores are formed by irradiating the polymeric substrate with neutron rays or laser.

In the fusion method, fine polymer powder such as powder of polytetrafluoroethylene, polyethylene or polypropylene is sintered after it is molded.

As the foaming method, it is possible to use any of a mechanical foaming method, a physical foaming method, and a chemical foaming method.

As a preferable method of producing the laminated porous film of the first embodiment, it is possible to exemplify a method of forming a laminated unporous membrane material composed at least two layers, namely, the first and second layers by using the thermoplastic resin composition, containing the polypropylene resin, which has the β activity and/or the β crystal generation power and the thermoplastic resin composition in which the filler is added to the thermoplastic resin having the higher peak value of the crystal fusion temperature than the peak value of the crystal fusion temperature of the polypropylene resin and stretching the laminated unporous membrane material to form a large number of fine pores intercommunicable with each other in the thickness direction of the laminated unporous membrane material.

The method of producing the laminated unporous membrane material is not limited to a specific method, but known methods may be used. It is possible to exemplify a method of fusing the thermoplastic resin composition by using an extruder, co-extruding it from a T die, and cooling it with a cast roll to solidify it. It is also possible to adopt a method of cutting open a film produced by using a tubular method to make it planar.

The method of stretching the laminated unporous membrane material includes a roll stretching method, a rolling process, a tenter stretching method, and a simultaneous biaxial stretching method. Uniaxial stretching or biaxial stretching is performed by using one of the above-described methods or in combination of not less than two of the above-described methods.

As a preferable form of the first embodiment, description is made on a method of producing the laminated porous film having a two-kind three-layer construction by forming the laminated unporous membrane material having a two-kind three-layer construction by a T die co-extrusion by using the polypropylene resin-containing thermoplastic resin composition having the β activity and/or the β crystal generation power to form the first layer and the thermoplastic resin composition in which the filler is added to the thermoplastic resin having the higher peak value of the crystal fusion temperature than the peak value of the crystal fusion temperature of the polypropylene resin to form the second layer and biaxially stretching the laminated unporous membrane material to make the obtained laminated porous film porous.

It is preferable that the resin composition composing the first layer contains at least the polypropylene resin and the β crystal nucleating agent. These components are mixed with each other with a Henschel mixer, a super mixer or a tumbler-type mixer. It is preferable to use the Henschel mixer. Alternatively all components are put in a bag and mixed with each other by hand. Thereafter the components are fused and kneaded with a uniaxial extruder, a twin screw extruder or a kneader to pelletize the components. It is preferable to use the twin screw extruder.

In forming the resin composition composing the second layer, the components thereof including the thermoplastic resin, the filler, the plasticizer described in the description of the second layer, and additives as desired are mixed with one another with a Henschel mixer, a super mixer or a tumbler-type mixer. Thereafter the components are fused and kneaded with the uniaxial extruder, the twin screw extruder or the kneader to pelletize the components. It is preferable to use the twin screw extruder.

The pellet of the resin composition for the first layer and the pellet of the resin composition for the second layer are supplied to the extruder to extrude them from a co-extrusion mouthpiece of a T die. As the kind of the T die to be used, both a two-kind three-layer multi-manifold type and a two-kind three-layer feed block type can be used.

Although the gap of the T die to be used is determined according to an ultimately necessary thickness of a film, a stretching condition, a draft ratio, and various conditions, the gap of the T die is set to normally 0.1 to 3.0 mm and favorably 0.5 to 1.0 mm. It is unpreferable to set the gap of the T die to less than 0.1 mm from the standpoint of a production speed. When the gap of the T die is more than 3.0 mm, the draft ratio becomes large, which is not preferable from the standpoint of stability in the production of the film.

Although the extrusion processing temperature in the extrusion molding is appropriately adjusted according to the flow property of the resin composition and the moldability thereof, the extrusion processing temperature is set to favorably 150 to 420° C. and more favorably 180 to 400° C. When the extrusion processing temperature is more than 150° C., the fused resin has a sufficiently low viscosity and an excellent moldability, which is preferable. When the extrusion processing temperature is less than 420° C., it is possible to restrain the resin composition from deteriorating.

The temperature at which the membrane material is cooled to solidify it is very important in the present invention. At temperatures shown below, the β crystal in the polypropylene resin of the unstretched membrane material is generated and grown, and the ratio of the β crystal in the membrane material can be adjusted. The temperature at which the membrane material is cooled to solidify it by means of the cast roll is set to favorably 80 to 150° C., more favorably 90 to 140° C., and most favorably 100 to 130° C. By setting the temperature at which the membrane material is cooled to solidify it to not less than 80° C., the ratio of the β crystal in the membrane material solidified by cooling it can be sufficiently increased, which is preferable. By setting the cooling temperature to not more than 150° C., it is possible to prevent the occurrence of a trouble that extruded fused resin adheres to the cast roll and sticks to it and thus efficiently process the resin composition into the membrane material, which is preferable.

By setting the temperature of the cast roll to the above-described temperature range, it is favorable to adjust the ratio of the β crystal of the polypropylene resin of the unstretched membrane material to 30 to 100%. The ratio of the β crystal is set favorably to 40 to 100%, more favorably 50 to 100%, and most favorably 60 to 100%. By setting the ratio of the β crystal of the unstretched membrane material to not less than 30%, it is easy to make the membrane material porous by a stretching operation to be performed at a subsequent production step. Thereby it is possible to obtain a film having a favorable air permeability characteristic.

The ratio of the β crystal is computed based on the following equation by using α crystal fusion heat amount ($\Delta Hm\alpha$) derived from the α crystal of the polypropylene and α crystal fusion heat amount ($\Delta Hm\beta$) derived from the β crystal detected when the temperature of the membrane material is raised from 25° C. to 240° C. by using the differential scanning calorimeter.

Ratio of βcrystal(%)=[$\Delta Hm\beta/(\Delta Hm\beta+\Delta Hm\alpha)$]×100

Thereafter the obtained laminated unporous membrane material is biaxially stretched. Simultaneous biaxial stretching or sequential biaxial stretching is performed. In forming the laminated porous film superior in its BD characteristic intended by the present invention, it is possible to select a stretching condition at each stretching step. In the present invention, the sequential biaxial stretching capable of easily controlling the porous structure is preferable. Stretching in a pick-up direction (MD) (flow direction) in which the membrane material is picked up is called "vertical stretching", whereas stretching in a direction (TD) perpendicular to the pick-up direction is called "horizontal stretching".

In using the sequential biaxial stretching, it is necessary to select a stretching temperature according to the composition of a resin composition to be used, the crystal fusion peak temperature, and the degree of crystallization. The stretching temperature in the vertical stretching is set to 20 to 130° C., favorably 40 to 120° C., and more favorably 60 to 110° C. The magnification in the vertical stretching is favorably 2 to 10, more favorably 3 to 8, and most favorably 4 to 7. By performing the vertical stretching in the above-described range, it is possible to prevent the film from being broken at a stretching time and generate proper starting points in forming the porous structure. The stretching temperature in the horizontal stretching is set to 100 to 160° C., favorably 110 to 150° C., and more favorably 120 to 145° C. The magnification in the horizontal stretching is set to favorably 2 to 10, more favorably 3 to 8, and most favorably 3 to 7. By performing the horizontal stretching in the above-described range, it is possible to moderately enlarge the starting points of pores formed by the vertical stretching and generate a fine porous structure. The stretching speed in the stretching process is set to favorably 500 to 12000%/minute, more favorably 1500 to 10000%/minute, and most favorably 2500 to 8000%/minute.

It is preferable to heat-treat the laminated porous film obtained in the above-described procedure at 100 to 170° C. and favorably at 120 to 170° C. to improve the dimensional stability thereof. As necessary relaxation treatment may be performed at a rate of 1 to 15% during the heat treatment process. By uniformly cooling the laminated porous film after the heat treatment is carried out and winding it on a roll or the like, the laminated porous film of the present invention is obtained.

The laminated porous film of the present invention can be applied to various uses in which air permeability is required. The laminated porous film can be suitably used as materials for the battery separator; hygienic materials such as disposable diaper, body fluid absorbing pats such as sanitary products, a bed sheet, and the like; medical materials such as surgical gown, a base material for stupe; clothing materials such as jumper, sportswear, rain wear, and the like; building materials such as wallpaper, a roof-waterproofing material, a heat insulation material, a sound-absorbing material, and the like; a desiccant; a moisture agent; a deoxidizer; a pocket warmer; and materials for keeping foods fresh and packing food.

Above all, the laminated porous film of the present invention can be suitably used as a separator of a nonaqueous electrolyte battery such as a lithium-ion rechargeable battery utilized as the power source of various electronic apparatuses.

When the laminated porous film of the present invention is used as the separator of the nonaqueous electrolyte battery, the air permeability resistance thereof is set to 5 to 3000 seconds/100 ml, favorably 20 to 2000 seconds/100 ml, more favorably 50 to 1000 seconds/100 ml, and most favorably 50 to 500 seconds/100 ml.

When the laminated porous film has the air permeability resistance more than 3000 seconds/100 ml, a numerical value of the air permeability resistance is obtained in measurement. But the laminated porous film has a structure in which pores are intercommunicable with each other to a very low extent. Thus inmost cases, in the air permeability resistance in this range, the film cannot be substantially utilized as the battery separator. That is, it is preferable that the film has the air permeability resistance less than 3000 seconds/100 ml, because in this range, the battery has a necessary ion conduction performance and a sufficient battery property. It is preferable that the air permeability resistance is more than 5 seconds/100 ml, because in this range, the diameters of pores are appropriately small and thus the battery separator is capable of maintaining a necessary mechanical strength.

The air permeability resistance means a pass-through degree of air in the thickness direction of the separator and is expressed by seconds it takes for air having a volume of 100 ml to pass through the separator. Therefore the smaller a numerical value is, the more easily the air passes through the separator. On the other hand, the larger the numerical value is, the more difficultly the air passes therethrough. That is, the smaller the numerical value is, the more inter communicable pores are in the thickness direction of the separator. On the other hand, the larger the numerical value is, the more difficultly the air passes therethrough. That is, the smaller the numerical value is, the less intercommunicable pores are in the thickness direction of the separator. The intercommunicable performance means the degree of connection of the pores in the thickness direction of the separator. When the separator has a low air permeability resistance, the separator facilitates the movement of lithium ions, thus allowing the battery to have an excellent performance.

Other properties of the laminated porous film of the present invention can be freely adjusted according to the composition of the resin compositions composing the first and second layers, the construction of the layers, a production method, and the like.

When the laminated porous film of the present invention is used as the battery separator, the porosity is set to 5 to 80%, favorably 20 to 70%, more favorably 30 to 70%, and most favorably 40 to 65%. The porosity is an important factor for specifying the porous structure. When the laminated porous film has a porosity not less than 5%, the laminated porous film can be used as the separator having a favorable intercommunicable performance and an excellent air permeability characteristic. When the porosity is not more than 80%, it is possible to prevent the occurrence of a problem that the number of fine pores is so large that the separator has a low mechanical strength, which is preferable in handling it.

Description of Separator for Battery

A nonaqueous electrolyte battery accommodating the laminated porous film of the present invention as its separator is described below with reference to FIG. 1.

Both a positive plate 21 and a negative plate 22 are spirally wound by overlapping the positive plate 21 and the negative plate 22 on each other via a separator 10. The outer sides of the positive plate 21 and the negative plate 22 are fixed with a tape to integrate the wound positive plate 21, the negative plate 22, and the separator 10 with one another. In spirally winding them, the thickness of the separator 10 is set to favorably 5 to 40 µm and especially favorably to 30 µm. By setting the thickness of the separator 10 to not less than 5 µm, the separator 10 is resistant to tear. By setting the thickness of the separator 10 to not more than 40 µm, it is possible to increase the area of a battery in accommodating the wound separator in the battery can and increase the capacity of the battery.

The positive plate 21, the separator 10, and the negative plate 22 integrally wound is accommodated inside a bottomed cylindrical battery case and welded to a positive lead 24 and a negative lead 25 respectively. Thereafter the electrolyte is injected to the battery can. After the electrolyte penetrates into the separator 10 sufficiently, the periphery of the opening of the battery can is sealed with a positive lid 27 via a gasket 26. Thereafter preparatory charge and aging are carried out to produce the cylindrical nonaqueous electrolyte battery.

A lithium salt is dissolved in an organic solvent to obtain the electrolyte. Although the organic solvent is not limited to a specific one, the following substances are used: esters such as propylene carbonate, ethylene carbonate, butylene carbonate, γ-butyrolactone, γ-valerolactone, dimethyl carbonate, methyl propionate, and butyl acetate; nitriles such as acetonitrile; ethers such as 1,2-dimethoxyethane, 1,2-dimethoxymethane, dimethoxypropane, 1,3-dioxolane, tetrahydrofuran, 2-methyltetrahydrofuran, and 4-methyl-1,3-dioxofuran; and sulfolane. These organic solvents can be used singly or in combination of not less than two kinds thereof.

It is especially preferable to use an electrolyte in which 1.4 mol/L of lithium phosphate hexafluoride ($LiPF_6$) is dissolved in a solvent containing two parts by mass of the methyl ethyl carbonate mixed with one part by mass of the ethylene carbonate.

As the negative pole, an alkali metal or a compound containing the alkali metal integrated with a current collector such as a net made of stainless steel is used. As the alkali metal, lithium, sodium or potassium is used. As the compound containing the alkali metal, alloys of the alkali metal and aluminum, lead, indium, potassium, cadmium, tin or magnesium; compounds of the alkali metal and a carbon material; and compounds of the alkali metal having a low electric potential and a metal oxide or a sulfide are listed.

In using the carbon material for the negative pole, it is possible to use those capable of doping or de-doping lithium ions. For example, it is possible to use graphite, pyrolytically decomposed carbons, cokes, glassy carbons, calcined organic polymeric compounds, mesocarbon micro bead, carbon fiber, and activated carbon.

In the first embodiment, a carbon material having an average particle diameter of 10 µm is mixed with a solution in which vinylidene fluoride is dissolved in N-methylpyrrolidone to obtain slurry. After the slurry consisting of the mixture of the above-described substances is passed through a 70-mesh net to remove large particles, the slurry is uniformly applied to both surfaces of a negative pole current collector consisting of a belt-shaped copper foil having a thickness of 18 µm and is dried. After the slurry is compression-molded with a roll press machine, the molding is cut to obtain the belt-shaped negative plate.

As the positive pole, metal oxides such as a lithium cobalt oxide, a lithium nickel oxide, a lithium manganese oxide, a manganese dioxide, a vanadium pentoxide or a chromium oxide and metal sulfides such as a molybdenum disulfide are used as an active substance. A conductive assistant and a binding agent such as polytetrafluoroethylene are added to the positive active substance to obtain a combination of these substances. Thereafter the combination of these substances is processed into a molding by using a current collector such as stainless steel net as the core of the positive pole. The molding formed in this manner is used as the positive pole.

In the first embodiment, as the positive pole, a belt-shaped positive plate produced as described below is used. That is, as a conductive assistant, scaly graphite is added to the lithium cobalt oxide ($LiCoO_2$) at a mass ratio (lithium cobalt oxide: scaly graphite) of 90:5. Both substances are mixed with each other to form a mixture. The mixture and a solution in which the polyvinylidene fluoride is dissolved in the N-methylpyrrolidone are mixed with each other to obtain slurry. After the slurry consisting of the mixture of these substances is passed through the 70-mesh net to remove large particles, the slurry is uniformly applied to both surfaces of a positive current collector consisting of an aluminum foil and dried. After the slurry is compression-molded with the roll press machine, the molding is cut to obtain the belt-shaped positive plate.

Examples 1-1 through 1-4 of the first embodiment and comparison Examples 1-1 and 1-2 are described below.

A pick-up direction (flow direction) in which the laminated porous film is picked up is described as a "vertical" direction, whereas a direction perpendicular to the vertical direction is described as a "horizontal" direction.

Examples 1-1 Through 1-4 and Comparison Examples 1-1 and 1-2

Based on the composition of the materials of each layer shown in table 1, materials of each layer were supplied to a twin screw extruder (diameter: 40 mm φ, L/D=32) produced by Toshiba Machine Co., Ltd. to prepare a pellet of each layer of each example and comparison example. After the pellet prepared for each layer was supplied to a uniaxial extruder having a diameter of 40 mm, each pellet was extruded from a T die through a mono-layer feeding block or a two-kind three-layer feeding block according to the construction of each layer shown in table 1. After each pellet was picked up by a cast roll having a temperature shown in table 1, the pellet was cooled to solidify it. Thereby a membrane material having a width of 300 mm and a thickness of 180 µm was obtained. After the membrane material was vertically stretched between rollers by using a film roll vertically stretching machine at the stretching temperature and the stretching magnification shown in table 1, the membrane material was horizontally stretched at the stretching temperature and the stretching magnification shown in table 1 by using a film tenter equipment produced by Kyoto Machinery Co., Ltd. Thermal relaxation was performed in the condition shown in table 1 to obtain a film.

Materials used in the examples and the comparison examples are as shown below.

By using a differential scanning calorimeter (DSC-7) produced by PerkinElmer Inc, each polypropylene resin was heated from 25° C. up to 240° C. at a heating speed of 10° C./minute and held for one minute. Thereafter the polypropylene resin was cooled from 240° C. down to 25° C. at a cooling speed of 10° C./minute and held for one minute. When the polypropylene resin was heated again from 25° C. up to 240° C. at the heating speed of 10° C./minute and held for one minute, whether a peak of the crystal fusion temperature (Tmβ) derived from the β crystal was detected in the range of 145° C. and less than 160° C. Results of the detection are shown in table 1.

(a) Polypropylene Resin

PP-1: "Prime PP F300SV (commercial name)" produced by Prime Polypro Inc., MFR: 3.0 g/10 minutes)

When the temperature of the polypropylene resin was raided again, only the crystal fusion peak temperature (Tmα) derived from the α crystal of polypropylene was detected at 166° C., whereas the crystal fusion peak temperature (Tmβ) derived from the β crystal was not detected. That is, PP-1 did not have the β activity.

βPP-1:

After N,N'-dicyclohexyl-2,6-naphthalene dicarboxylic acid amide (β1) was added to the polypropylene resin (PP-1) at a mass ratio of PP-1/β1=100/0.1, these components were supplied to a twin screw extruder (diameter: 40 mm φ, L/D=32) produced by Toshiba Machine Co., Ltd. After the components were fused and mixed with each other at a set temperature of 280° C., a strand was cooled in a tank to solidify it. Thereafter the strand was cut with a pelletizer to prepare a pellet of the mixture of the polypropylene resin (PP-1) and the β crystal nucleating agent (β1).

When the temperature of the polypropylene resin was raised again, the crystal fusion peak temperature (Tmβ) derived from the β crystal of the polypropylene and the crystal fusion peak temperature (Tmα) derived from the α crystal were detected at 154° C. and 168° C. respectively.

That is, the βPP-1 hadthe β activity. The degree of the β activity computed from the equation shown below was 80%.

Degree of βactivity(%)=[ΔHmβ/(ΔHmβ+ΔHmα)]×100

ΔHmβ: crystal fusion heat amount, derived from the β crystal, which is detected in a range not less than 145° C. nor more than 160° C.

ΔHmα: crystal fusion heat amount, derived from the α crystal, which is detected in a range not less than 160° C. nor more than 175° C.

βPP-2: A pellet "Bepol B-022SP (commercial name)" (MFR: 0.3 g/10 minutes) produced by Aristech Inc. The pellet is the propylene resin to which the β crystal nucleating agent was added.

When the temperature of the polypropylene resin was raised again, the crystal fusion peak temperature (Tmβ) derived from the β crystal of the polypropylene and the crystal fusion peak temperature (Tmα) derived from the α crystal were detected at 151° C. and 169° C. respectively.

That is, it was found that the βPP-2 had the β activity. The degree of the β activity computed from the equation shown below was 78%.

(b) Polymethylpentene Resin

HR-1: "TPX RT-18 (commercial name)" produced by Mitsui Chemicals Inc., (MFR: 26 g/10 minutes, Tm: 237° C.)

(C) Filler

FL-1: Barium sulfate "B55 (commercial name)" produced by Sakai Chemical Co., Ltd., (average particle diameter: 0.66 μm)

FL-2: Barium sulfate "B54 (commercial name)" produced by Sakai Chemical Co., Ltd. (average particle diameter: 1.2 μm)

(d) Plasticizer

PL-1: "Hicaster Wax HCOP (commercial name)" produced by Hokoku Oil Mill Co., Ltd.

TABLE 1

| | First layer | Second layer | | | Cast roll Temperature (° C.) | Vertical stretching Magnification @Temperature (° C.) | Horizontal stretching Magnification @Temperature (° C.) | Thermal relaxation Relaxation ratio @Temperature (° C.) |
|---|---|---|---|---|---|---|---|---|
| | Resin | Resin | Filler | Plasticizer | | | | |
| Example 1-1 | βPP-1 | HR-1 | FL-1 | PL-1 | 125 | 4.0 @85 | 5.0 @135 | 3% @135 |
| Lower stage: Part by mass | 100 | 47.5 | 50.0 | 2.5 | | | | |
| Example 1-2 | βPP-1 | HR-1 | FL-1 | PL-1 | 125 | 4.0 @85 | 5.0 @145 | 5% @140 |
| Lower stage: Part by mass | 100 | 47.5 | 50.0 | 2.5 | | | | |
| Example 1-3 | βPP-2 | HR-1 | FL-1 | PL-1 | 125 | 4.0 @85 | 5.0 @140 | 5% @140 |
| Lower stage: Part by mass | 100 | 47.5 | 50.0 | 2.5 | | | | |
| Example 1-4 | βPP-1 | HR-1 | FL-2 | PL-1 | 125 | 5.0 @85 | 3.0 @140 | 5% @140 |
| Lower stage: Part by mass | 100 | 47.5 | 50.0 | 2.5 | | | | |
| Comparison Example 1-1 | βPP-1 | Uncontained | Uncontained | Uncontained | 125 | 4.0 @85 | 5.0 @140 | 5% @140 |
| Lower stage: Part by mass | 100 | — | — | — | | | | |
| Comparison Example 1-2 | PP-1 | HR-1 | FL-1 | PL-1 | 125 | 4.0 @85 | 5.0 @140 | 5% @140 |
| Lower stage: Part by mass | 100 | 47.5 | 50.0 | 2.5 | | | | |

Various properties of the obtained films of the examples 1-1 through 1-4 and comparison examples 1-1 and 1-2 were measured and evaluated. Table 2 shows the results.

(1) Ratio Among Layers

A section of each laminated porous film was cut to observe the cut piece with a scanning electron microscope (S-4500 produced by Hitachi, Ltd). The ratio among layers was measured from the structures of the layers and the thicknesses of the layers.

(2) Thickness

The in-plane thickness was measured at 30 points at random with a dial gauge of 1/1000 mm. The average of the thicknesses was set as the thickness.

(3) Air Permeability Resistance (Gare Value)

The air permeability resistance (second/100 ml) was measured in accordance with JIS P8117.

(4) Porosity

The porosity is a numerical value showing the ratio of the volume of spaces to the entire volume of the film. The porosity was computed by measuring a substantial mass W1 of the film and computing a mass W0 when the porosity is 0% from the density and thickness of the resin composition. Based on values obtained in this manner, the porosity was computed.

Porosity $Pv(\%) = \{(W0-W1)/W0\} \times 100$ (5) Pin Puncture Strength

In accordance with Official Japan Agricultural Standard No. 1019, the pin puncture strength was measured in the condition in which the puncture diameter was 1.0 mm, the front end thereof was 0.5 R, and the pin puncture speed was 300 mm/minute.

(6) BD Characteristic

Figure 2A:
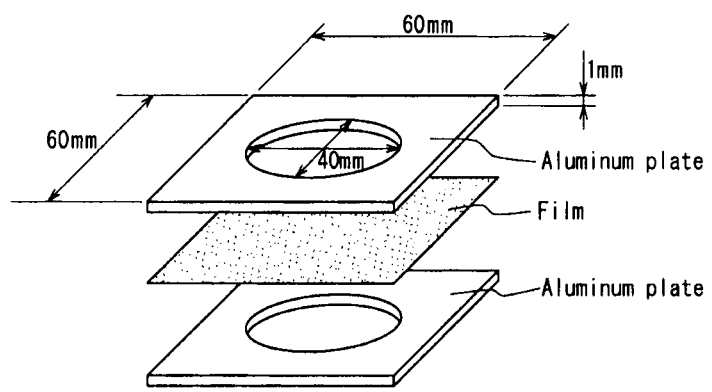
FIG. 2 shows a method of binding a film in measurement of a BD characteristic and a β crystal generation power.

The obtained film was cut squarely in a dimension of 60 mm (vertical length)×60 mm (horizontal length). As shown in FIG. 2A, the film was sandwiched between two aluminum plates (material: JIS standard A5052, size: 60 mm (vertical length), 60 mm (horizontal length, 1 mm (thickness) where a circular hole having a diameter of 40 mm φ was formed at a central portion. As shown in 2B, the periphery of the film was bound with clips (double clip "Christo-J35" (commercial name) produced by Kokuyo Co., Ltd.)

The film bound with the two aluminum plates was put in an oven (Tabai gear oven "GPH200" produced by Tabai Espec Corporation, damper was closed) whose temperature was set to 200° C. After the internal temperature of the oven reached 200° C., the film was held therein for two minutes. After the elapse of two minutes, the film was taken out of the oven immediately to check the state of the film and judge its configuration-maintaining performance.

Films broken were marked with "X", whereas films which maintained the original configuration were marked with "○".

When the film cannot be cut in a dimension of 60 mm×60 mm, a specimen may be prepared by adjusting the position of the specimen so that the specimen is mounted at the circular hole, having the diameter of 40 mm φ, which is disposed at the central portion of the aluminum plate.

(7) β Activity

By using the differential scanning calorimeter (DSC-7) produced by PerkinElmer Inc, the film was heated from 25° C. up to 240° C. at a heating speed of 10° C./minute and held for one minute. Thereafter the film was cooled from 240° C. down to 25° C. at a cooling speed of 10° C./minute and held for one minute. Thereafter the film was heated again from 25° C. up to 240° C. at the heating speed of 10° C./minute and held for one minute. Whether the film had the β activity is judged according to whether a peak of the crystal fusion temperature (Tmβ) derived from the β crystal was detected in the range of 145° C. to 160° C. when the film was heated again from 25° C. up to 240° C.

○ was marked on films in which Tmβ was detected in the range of 145° C. to 160° C. (films have β activity).

X was marked on films in which Tmβ was not detected in the range of 145° C. to 160° C. (films do not have β activity). The β activity was measured on specimens having an amount of 10 mg by using nitrogen as an atmospheric gas.

(8) β Crystal Generation Power

Figure 2B:
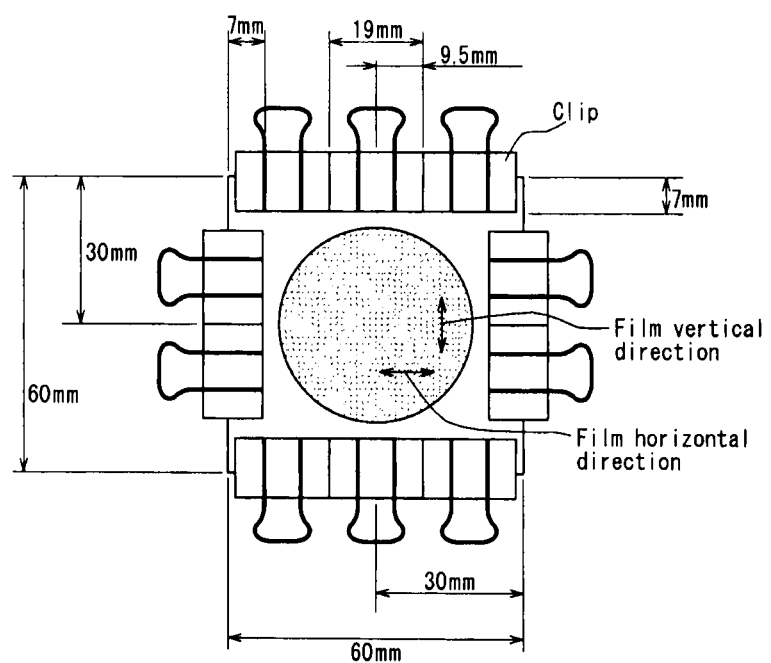

Similarly to the measurement of the BD characteristic, the film was cut squarely in a dimension of 60 mm (vertical length)×60 mm (horizontal length) and was fixed, as shown in FIGS. 2A, 2B.

The film bound with two aluminum plates was put in a blow isothermal instrument (Model: DKN602 produced by Yamato Science Corporation) having a set temperature of 180° C. and display temperature of 180° C. After the film was held therein for three minutes, set temperature was altered to 100° C., and the film was gradually cooled to 100° C. for not less than 10 minutes. When the display temperature became 100° C., the film was taken out of the blow isothermal instrument. The film was cooled for five minutes in an atmosphere at 25° C. with the film bound with the two aluminum plates. Thereafter wide-angle X-ray measurement was carried out on the circular portion, having the diameter of 40 mm φ, which is disposed at the central portion of the aluminum plate in the following measuring conditions.

Wide-angle X-ray measuring device: Model Number: XMP18A produced by Mac science Co., Ltd.

X-ray source: CuK α ray, output: 40 kV, 200 mA

Scanning method: 2θ/θ scan, 2θ range: 5° to 25°, scanning interval: 0.05°, scanning speed: 5°/minute Whether the film had the β crystal generation power was evaluated from a peak derived from a (300) surface of the β crystal of polypropylene.

○: When the peak was detected in the range of 2θ=16.0° to 16.5°, it was judged that the film had the β crystal generation power.

X: When the peak was not detected in the range of 2θ=16.0° to 16.5°, it was judged that the film had did not have the β crystal generation power.

When the film cannot be cut in a dimension of 60 mm×60 mm, a specimen may be prepared by adjusting the position of the film so that film is mounted at the circular hole, having the diameter of 40 mm φ, which is disposed at the central portion of the aluminum plate.

TABLE 2

| Unit | Construction of layers | Ratio between layers | Thickness μm | Air permeability resistance Second/100 ml | Porosity % | Pin puncture strength N | BD characteristic | β activity | β crystal generation power |
|---|---|---|---|---|---|---|---|---|---|
| Example 1-1 | PP/HR/PP | 1/1/1 | 26 | 370 | 50 | 3.04 | ○ | ○ | ○ |
| Example 1-2 | PP/HR/PP | 1/1/1 | 28 | 420 | 53 | 2.75 | ○ | ○ | ○ |
| Example 1-3 | PP/HR/PP | 1/1/1 | 26 | 720 | 49 | 3.04 | ○ | ○ | ○ |
| Example 1-4 | PP/HR/PP | 1/1/1 | 24 | 1050 | 47 | 3.02 | ○ | ○ | ○ |
| Comparison example 1-1 | PP | 1 | 20 | 520 | 52 | 3.14 | X | ○ | ○ |
| Comparison example 1-2 | PP/HR/PP | | | Broken during stretching | | | | | |

As apparent from table 2, the film of the comparison example 1-1 consisting of the first layer did not have the BD characteristic. The film of the comparison example 1-2 containing the propylene resin not having the β activity was broken while it was being stretched. Thus a laminated porous film could not be formed.

On the other hand, the laminated porous films of the present invention had the air permeability resistance suitable for the battery separator and a proper degree of strength. It has been found that the laminated porous films have the BD characteristic superior to that of a laminated porous film consisting of a monolayer.

As described above, the laminated porous film of the first embodiment of the present invention has a sufficient intercommunicable performance and yet has an intended strength and further is capable of displaying an excellent BD characteristic. Thus the laminated porous film can be suitably utilized as the battery separator.

The laminated porous film of the second embodiment is described below.

Similarly to the first embodiment, the laminated porous film of the second embodiment has also the first layer containing the polypropylene resin and the heat-resistant second layer.

The second layer is composed of a composition containing a mixed resin of the polypropylene resin and a thermoplastic resin (hereinafter referred to as "HM resin") whose crystal fusion peak temperature is not less than 170° C. On the other hand, it is preferable that the first layer does not contain the thermoplastic resin (HM resin) whose crystal fusion peak temperature is not less than 170° C. and has the crystal fusion peak temperature not less than 100° C. and less than 170° C. The first layer is provided with a mechanical strength.

Similarly to the first embodiment, the laminated porous film of the second embodiment has at least one of the β activity and the β crystal generation power. Because the details of the β activity and the β crystal generation power are similar to those of the first embodiment, description thereof is omitted herein. Because the construction of the first layer is also similar to that of the first layer of the first embodiment, description thereof is omitted herein.

The total mass of the polypropylene resin (PP resin) and the HM resin of the composition of the second layer is favorably not less than 70 mass % for the whole mass of the composition of the second layer, more favorably not less than 80 mass %, and most favorably not less than 90 mass %

The mixing mass ratio of the PP resin to the HM resin is favorably 10 to 90/90 to 10, more favorably 20 to 80/80 to 20, and most favorably 30 to 70/70 to 30. When the content of the HM resin is not less than 10 mass % in 100 mass % which is the sum of the PP resin and the HM resin, the second layer is capable of displaying the BD characteristic at a moderate temperature. On the other hand, when the content of the HM resin is not more than 90 mass % in 100 mass % which is the sum of the PP resin and the HM resin, the second layer can be easily made porous, which is preferable.

It is favorable that the content of the PP resin is large. The ratio of PP resin to the HM resin is more favorably 60 to 90/40 to 10 and most favorably 60 to 70/40 to 30.

In composing the laminated porous film of not less than three layers and composing the second layer of a plurality of layers, the mixing mass ratio between the PP resin and the HM resin in one of the second layers is set to the above-described specified range.

The mixing mass ratio of the PP resin/the HM resin in other layers is 10 to 99/90 to 1, favorably 30 to 99/70 to 1, more favorably 60 to 99/40 to 1, and most favorably 60 to 90/40 to 10.

Let it be supposed that the first layer consists of a plurality of layers. Because it is necessary for the laminated porous film to be provided with at least one layer which displays the BD characteristic, first layers other than the first layer which displays the BD characteristic do not necessarily have to have the BD characteristic. Therefore in the first layer, the content of the HM resin should be not less than 1 mass % in 100 mass % which is the sum of the PP resin and the HM resin. Needless to say, no problem occurs when the first layers entirely display the BD characteristic. It is preferable that the first layers entirely display the BD characteristic. When the content of the HM resin is not more than 90 mass % in 100 mass % which is the sum of the PP resin and the HM resin, it is easy to make the first layer porous, which is preferable.

In the first layer, the content of the PP resin is set to favorably not less than 70 mass % for the whole mass of the first layer, more favorably not less than 80 mass %, and most favorably not less than 90 mass %. To improve the mechanical strength of the laminated porous film, the PP resin may be combined with other thermoplastic resin.

It is important that the thermoplastic resin (HM resin) whose crystal fusion peak temperature is not less than 170° C. has the crystal fusion peak temperature in this temperature range. Because at least the second layer contains the thermoplastic resin (HM resin), the laminated porous film of the second embodiment has an excellent heat resistance and is capable of displaying an excellent break-down characteristic. Although the upper limit of the crystal fusion peak temperature of the thermoplastic resin (HM resin) is not limited to a specific value, it is favorable that the upper limit of the crystal fusion peak temperature thereof is set to not more than 350° C. because it is possible to prevent the resin from deteriorating at a molding processing time and keep the mechanical strength of the obtained laminated porous film. The upper limit of the crystal fusion peak temperature thereof is more favorably not more than 300° C.

The HM resin shows not less than 170° C. in the peak value of its crystal fusion temperature detected when the HM resin is heated from 25° C. to 400° C. at a heating speed of 10 C/minute in accordance with JIS k7121 by using a differential scanning calorimeter.

The HM resin to be used in the present invention is not limited to a specific one. It is possible to use any of the HM resin, provided that it is different from the polypropylene resin and that it satisfies the condition of the crystal fusion peak temperature. As necessary it is possible to use a mixture of not less than two kinds of resins.

Specifically it is possible to use resins similar to the thermoplastic resins which are used in the first embodiment and have the crystal fusion peak temperature at 200° C. It is possible to preferably use not less than one kind of resin selected from among polyester resin, polystyrene resin, fluorine resin, and polymethylpentene. From the standpoint of the compatibility of the polypropylene resin with these resins to be mixed therewith, the polymethylpentene is especially favorable.

The viscosity of the HM resin at a fusing time is not limited to a specific value. But to favorably disperse the HM resin and the PP resin in each other and allow the laminated porous film to be more uniform and homogenous, it is preferable to select the HM resin whose viscosity is similar to that of the PP resin. The melt viscosity is adjustable according to the molecular weight of the resin.

In addition to the above-described components, additives described in the first embodiment may be added to the resin of the first layer and that of the second layer in a range in which the addition of the additives to the resins does not outstandingly damages the effect of the present invention.

As necessary, rubber components such as the thermoplastic elastomer described in the first embodiment may be added to the resin of the first layer and that of the second layer in a range in which the addition thereof does not damage the heat-resistant property of the laminated porous film, specifically the BD characteristic thereof.

Similarly to the first embodiment, the structure of the laminated porous film of the second embodiment is not limited to a specific one, provided that the laminated porous film has the first and second layers, but other layers may be laminated thereon within a range in which the function of the laminated porous film of the present invention is not interfered or known treatment may be appropriately made. The configuration and thickness of the laminated porous film are similar to those of the laminated porous film of the first embodiment.

The properties of the laminated porous film of the second embodiment can be freely adjusted according to the layer construction, the ratio between the thicknesses of layers, the composition of each layer, and a production method. Similarly to the first embodiment, it is preferable that the BD characteristic of the laminated porous film is displayed at not less than 200° C.

Similarly to the first embodiment, the air permeability resistance of the laminated porous film is 1 to 10000 seconds/100 ml, and the porosity thereof is 5 to 80%. The pin puncture strength is favorably not less than 1.5N, more favorably not less than 2.0N, and most favorably not less than 3.0N. Similarly to the first embodiment, the anisotropy is set small. Thus "MD strength/TD strength" is set to not less than 0.05 nor more than 20.

Because the method of producing the laminated porous film of the second embodiment is similar to that of the first embodiment, the description thereof is omitted herein.

Description of Third Embodiment

The laminated porous film of the third embodiment is described below.

The third embodiment is different from the second embodiment in that the first layer of the third embodiment also consists of a mixed resin of the PP resin and the HM resin and that the mixing ratio of the HM resin in the first layer is set lower than that of the HM resin in the second layer.

That is, it is preferable that in the third embodiment, a plurality of layers containing the mixed resin of the PP resin and the HM resin is formed. The mixing ratios of the HM resin in these layers are different from one another.

Specifically the difference between the content ratio (mass %) of the HM resin in a layer (second layer) having the largest content of the HM resin and a layer (first layer) having the smallest content of the HM resin is set to favorably 1 to 50 mass %, more favorably 5 to 40 mass %, and most favorably 10 to 30 mass %

The mixing ratio of the PP resin/the HM resin in layers other than the first and second layers is set to 10 to 99/90 to 1, favorably 30 to 99/70 to 1, more favorably 60 to 99/40 to 1, and most favorably 60 to 90/40 to 10.

Because the BD characteristic can be displayed by the second layer, other layers do not have to be necessarily provided with the BD characteristic. Therefore in the other layers, the content of the HM resin should be not less than 1 mass % in 100 mass % which is the sum of the PP resin and the HM resin. When the content of the HM resin exceeds 90 mass % in 100 mass % which is the sum of the PP resin and the HM resin, it is difficult to make the film porous.

Because other components and constructions of the third embodiment are similar to those of the second embodiment, the description thereof is omitted herein.

Similarly to the laminated porous film of the first embodiment, the laminated porous films of the second and third embodiments can be suitably used as a separator of a nonaqueous electrolyte battery such as a lithium-ion rechargeable battery utilized as the power source of various electronic apparatuses and the like. When the laminated porous films of the second and third embodiments are used as the battery separator, it is preferable that the air permeability resistance thereof is set to 5 to 3000 seconds/100 ml and that the porosity thereof is 30 to 70%.

The nonaqueous electrolyte battery accommodating the laminated porous film as the separator thereof has the same construction as that of the battery of the first embodiment shown in FIG. 1.

The examples of the second and third embodiments and comparison examples are described below.

A pick-up direction (flow direction) in which the laminated porous film is picked up is described as a "vertical" direction, whereas a direction perpendicular to the vertical direction is described as a "horizontal" direction.

Examples 2-1 Through 2-6 and Comparison Examples 2-1 Through 2-3

As shown in table 3, the materials of the second layer were supplied to a same-direction twin screw extruder (diameter: 30 mm φ, L/D=30) produced by Techno Bell Co., Ltd. The materials of the first layer were supplied to a same-direction twin screw extruder (diameter: 40 mm φ, L/D=32) produced by Toshiba Machine Co., Ltd. After the materials were fused and mixed with each other respectively at 290° C., they was extruded from a T die via a mono-layer feeding block, a two-kind two-layer feeding block or a two-kind three-layer feeding block according to the construction of each layer shown in table 2. After the materials of each of the first and second layers were picked up by a cast roll having the temperature shown in table 2, the materials were cooled to solidify them. Thereby unstretched membrane materials each having a width of 300 mm and a thickness of 180 μm were obtained. At that time, the fused membrane materials were in contact with the cast roll (cooled) for 12 seconds.

After the obtained unstretched membrane materials were vertically stretched between rollers by using a film roll vertically stretching machine at the stretching temperature and the stretching magnification shown in table 1, the membrane materials were horizontally stretched by using a film tenter equipment produced by Kyoto Machinery Co., Ltd. at the stretching temperature and the stretching magnification shown in table 2. Thermal relaxation was performed in the condition shown in table 1 to obtain a laminated porous film.

Materials used in the examples 2-1 through 2-6 and the comparison examples 2-1 through 2-3 are as shown below.

Because the polypropylene resin, the PP-1, βPP-1, and βPP-2 are identical to those of the examples of the first embodiment, the description thereof is omitted herein.

(a) thermoplastic resin (HM resin) whose crystal fusion peak temperature is not less than 170° C.

SPS: Syndiotactic polystyrene "ZAREC 90Z (commercial name)" produced by Idemitsu Kosan Co., Ltd. (Tm: 272° C., Density: 1.04 g/cm$^3$)

PBT: Polybutylene terephthalate "DURACON 600FP (commercial name)" produced by Polyplastics Co., Ltd. (Tm: 224° C., Density: 1.43 g/cm³)

PMP: Polymethylpentene "TPX 18R (commercial name)" produced by Mitsui Chemicals Inc. (Tm: 237° C., Density: 0.833 g/cm³)

(b) Thermoplastic Resin Other than HM Resin

HDPE: High-density polyethylene "HI-ZEX HZ2200J (commercial name)" produced by Prime Polymer Corporation. (Tm: 134° C., Density: 0.964 g/cm³)

TABLE 3

| | Item | Example 2-1 | Example 2-2 | Example 2-3 | Example 2-4 | Example 2-5 | Example 2-6 | Comparison example 2-1 | Comparison example 2-2 | Comparison example 2-3 |
|---|---|---|---|---|---|---|---|---|---|---|
| Second layer | βPP-1 | 70 | 75 | 85 | | 75 | 70 | 70 | 100 | 70 |
| | βPP-2 | | | | 75 | | | | | |
| | SPS | 30 | | | 25 | | 20 | | | |
| | PBT | | 25 | | | | | | | 30 |
| | PMP | | | 15 | | 25 | | | | |
| | HDPE | | | | | | 10 | 30 | | |
| First layer | βPP-1 | 100 | | 100 | 100 | 100 | 100 | 100 | | |
| | βPP-2 | | 100 | | | | | | | |
| Construction | Construction of layers | Second layer/First layer | | | Second layer/First layer/Second layer | | | | First layer | |
| | Ratio between layers | | 1/1 | | | 1/1/1 | | 1/2/1 | Single layer | |
| Condition in production | Temperature (° C.) of cast roll | 115 | 120 | 125 | 120 | 120 | 120 | 105 | 125 | 120 |
| | Temperature (° C.) in vertical stretching | 95 | 90 | 90 | 100 | 90 | 95 | 90 | 90 | 95 |
| | Magnification in vertical stretching | ×3 | ×3 | ×4 | ×4 | ×4 | ×3 | ×3 | ×3 | ×3 |
| | Temperature (° C.) in horizontal stretching | 140 | 130 | 135 | 140 | 150 | 145 | 130 | 130 | 145 |
| | Magnification in horizontal stretching | ×4 | ×5 | ×4 | ×3 | ×5 | ×5 | ×5 | ×5 | ×5 |
| | Relaxation temperature (° C.) | 145 | 140 | 140 | 125 | 125 | 125 | 130 | 130 | 150 |
| | Relaxation ratio | 5% | 2% | 5% | 3% | 5% | 3% | 0% | 0% | 3% |

Various properties of the obtained laminated porous films were measured and evaluated. Table 4 shows the results.

Because the method of measuring the ratio among thicknesses of layers, break-down temperature, pin puncture strength, air permeability resistance (gare value), thickness, porosity, β activity, and β crystal generation power of each film is similar to that of the first embodiment, the description thereof is omitted herein.

Films which had the pin puncture strength not less than 3.0N were marked with ⊚, those which had the pin puncture strength not less than 1.5N and less than 3.0N are marked with ○, and those which had the pin puncture strength less than 1.5N were marked with X.

Films which had the air permeability resistance not more than 500 seconds/100 ml are marked with ⊚, those which had the air permeability resistance more than 500 seconds/100 ml and not more than 2000 seconds/100 ml were marked with ○, and those which had the air permeability resistance more than 2000 seconds/100 ml were marked with X.

TABLE 4

| Items to be evaluated | Example 2-1 | Example 2-2 | Example 2-3 | Example 2-4 | Example 2-5 | Example 2-6 | Comparison example 2-1 | Comparison example 2-2 | Comparison example 2-3 |
|---|---|---|---|---|---|---|---|---|---|
| Break-down temperature (° C.) | 260 | 235 | 240 | 265 | 245 | 240 | 190 | 195 | 250 |
| Pin puncture strength (N) | 2.88 | 2.60 | 3.25 | 3.06 | 2.82 | 2.11 | 4.42 | 3.78 | 1.10 |
| | ○ | ○ | ⊚ | ⊚ | ○ | ○ | ⊚ | ⊚ | X |
| Air permeability resistance (second/100 ml) | 387 | 276 | 312 | 342 | 285 | 487 | 324 | 435 | 223 |
| | ⊚ | ⊚ | ⊚ | ⊚ | ⊚ | ⊚ | ⊚ | ⊚ | ⊚ |
| Thickness (μm) | 29 | 24 | 22 | 23 | 19 | 23 | 25 | 24 | 23 |
| Porosity (%) | 56 | 57 | 59 | 57 | 62 | 52 | 55 | 55 | 64 |
| β activity | ○ | ○ | ○ | ○ | ○ | ○ | ○ | ○ | ○ |
| β crystal generation power | ○ | ○ | ○ | ○ | ○ | ○ | ○ | ○ | ○ |

The film of the comparison example 2-1 in which the thermoplastic resin (HM resin) whose crystal fusion peak temperature was not less than 170° C. was not mixed with the composition of the second layer had the break-down temperature of 190° C. and thus did not display a sufficient break-down characteristic. The porous film of the comparison example 2-2 which had the monolayer consisting of the propylene resin had a break-down temperature of 195° C. and thus did not display a sufficient break-down characteristic.

The film of the comparison example 2-3 which had only the first layer made of the composition consisting of the mixture of the propylene resin and the HM resin had a pin puncture strength as low as 1.10 and had thus a low mechanical strength.

On the other hand, the laminated porous films of the examples of the present invention constructed in the range specified in the present invention had an excellent break-down characteristic, i.e., they had the break-down temperature not less than 235° C. and had a necessary mechanical strength and an excellent air permeability resistance.

The laminated porous film of the fourth embodiment is described below.

Similarly to the first through third embodiments, the laminated porous film of the fourth embodiment has at least two porous layers, namely, the first and second layers.

The first layer is composed of a composition containing a mixed resin of the polypropylene resin and a resin whose crystal fusion peak temperature is lower than that of the polypropylene resin and is not less than 100° C. It is preferable that the second layer is composed of a composition containing a resin whose crystal fusion peak temperature is higher than that of the polypropylene resin and that the crystal fusion peak temperature of the composition of the first layer is set lower than that of the composition of the second layer.

Specifically, the crystal fusion peak temperature of the composition of the first layer is set to a range of 100° C. to 150° C. and preferably to the range of 110° C. to 145° C.

The crystal fusion peak temperature of the composition of the second layer is set to not less than 170° C., favorably not less than 175° C., and most favorably not less than 200° C.

The laminated porous film of the fourth embodiment is so formed as to display the shut-down characteristic of closing pores at not less than 100° C. nor more than 160° C. The shut-down temperature thereof is favorably 110° C. to 150° C. and more favorably 120° C. to 145° C.

There is a possibility that when the laminated porous film of the fourth embodiment incorporated in a lithium ion battery as the separator thereof is left in a car body in summer, the temperature inside the battery becomes close to 100° C. in dependence on a place. In such a case, when the shut-down temperature exceeds 100° C., fine pores in the separator are maintained when the temperature inside the battery is not more than 100° C. Thus the separator consisting of the laminated porous film is capable of maintaining the lithium ion transmission function, which is preferable. On the other hand, let it be supposed that the shut-down temperature is not more than 160° C. When trouble occurs in the battery and the separator has a high temperature of not less than 100° C. nor more than 160° C., fine pores of the separator for the lithium ion battery are closed, thus immediately blocking the transmission of lithium ions. Thereby it is possible to prevent the temperature inside the battery from rising. Therefore it is possible to safely use the battery.

The shut-down temperature of the laminated porous film is adjusted by using a resin (B) whose crystal fusion peak temperature is lower than that of the propylene resin of the first layer. That is, the thermoplastic resin whose crystal fusion peak temperature is close to a desired shut-down temperature is used to adjust the shut-down temperature. Alternatively the shut-down temperature can be adjusted by adjusting the mass ratio of the resin (B) of the first layer or setting the stretching temperature to a temperature range which is described later.

Similarly to the laminated porous films of the first through third embodiments, the laminated porous film of the fourth embodiment breaks at a high temperature not less than 200° C. In other words, the laminated porous film of the fourth embodiment has the break-down characteristic (BD characteristic) that the laminated porous film does not break at a temperature less than 200° C. The break-down characteristic is adjusted by increasing the mass ratio of the resin, contained in the composition of the second layer, which has the crystal fusion peak temperature higher than that of the polypropylene resin.

Similarly to the laminated porous films of the first through third embodiments, the laminated porous film of the fourth embodiment has at least one of the β activity and the β crystal generation power as an important characteristic thereof. To obtain the β activity and/or the β crystal generation power, it is preferable that the composition of the first layer contains the β crystal nucleating agent. It is preferable to add the β crystal nucleating agent to the propylene resin. Because the β activity and the β crystal generation power are similar to those of the first embodiment, the description thereof is omitted herein.

The first layer is porous and composed of the composition containing the mixture of the propylene resin (PP resin) and the resin (LM resin) whose crystal fusion peak temperature is lower than that of the propylene resin and is not less than 100° C.

The total mass of the PP resin and the LM resin of the composition of the first layer is set to favorably not less than 70 mass % for the whole mass of the composition thereof, more favorably not less than 80 mass %, and most favorably not less than 90 mass %. The mixing mass ratio of the PP resin to the LM resin is 10 to 90/90 to 10, favorably 20 to 80/80 to 20, more favorably 30 to 70/70 to 30, and most favorably 50 to 90/50 to 10. It is preferable that the content of the PP resin is large. As the mixing mass ratio of the PP resin to the LM resin, 60 to 90/40 to 10 is more favorable than the above-described ratio and 60 to 70/40 to 30 is most favorable. When the content of the LM resin is not more than 10 mass % in 100 mass % which is the sum of the PP resin and the LM resin, the first layer is capable of displaying the shut-down characteristic at a proper temperature. On the other hand, when the content of the LM resin is not more than 90 mass % in 100 mass % which is the sum of the PP resin and the HM resin, the first layer can be easily made porous, which is preferable.

When the first layer consists of not less than two layers, the mixing mass ratio of the PP resin to the LM resin should fall in the above-described specified range in at least one layer. In other first layers, the mixing mass ratio of the PP resin to the LM resin is 10 to 99/90 to 1, favorably 30 to 99/70 to 1, more favorably 60 to 99/40 to 1, and most favorably 60 to 90/40 to 10.

Because it is necessary for the laminated porous film to have at least one layer which displays the shut-down characteristic, layers other than the first layer do not necessarily have to display the shut-down characteristic. Therefore in the first layer, the content of the LM resin should be not less than 1 mass % in 100 mass % which is the sum of the PP resin and the HM resin. When the content of the HM resin is not more than 1 mass % in 100 mass % which is the sum of the PP resin and the HM resin, the first layer can be easily made porous.

Because the propylene resin (PP resin) contained in the first layer is similar to that used in the first embodiment, the description thereof is omitted herein.

The first layer is made of the composition consisting of the mixed resin of the resin (LM resin) whose crystal fusion peak temperature is not less than 100° C. nor more than 150° C. and the polypropylene resin (PP resin) to impart a proper degree of the shut-down characteristic to the laminated porous film.

The crystal fusion peak temperature of the resin (LM resin) is a peak value of the crystal fusion temperature detected when the LM resin is heated from 25° C. up to 240° C. at a heating speed of 10 C/minute in accordance with JIS k7121 by using the differential scanning calorimeter.

The kind of the LM resin to be used in the present invention is not limited to a specific kind, provided that the crystal fusion peak temperature of the LM resin is lower than that of the propylene resin and is not less than 100° C.

Specifically thermoplastic resins are exemplified. It is possible to exemplify polyolefin resin such as low-density polyethylene, high-density polyethylene, linear low-density polyethylene, an ethylene-vinyl acetate copolymer, polypropylene, and polymethylpentene; polystyrene resin; polyacrylic resin; polyvinyl chloride; polyester resin; polyether resin; and polyamide resin. As necessary it is possible to use a mixture of not less than two kinds of the thermoplastic resin as the LM resin.

From the standpoint of chemical resistance, as the LM resin whose crystal fusion peak temperature is not less than 100° C. nor more than 150° C., it is favorable to use a mixture of the polyolefin resin or a mixture of the polyolefin resin and other thermoplastic resin. The polyethylene resin such as the low-density polyethylene, the high-density polyethylene, and the linear low-density polyethylene and a mixture of the polyethylene resin and other polyolefin resin are more favorable. It is most favorable to use the polyethylene resin singly. In consideration of the use of the laminated porous film as the battery separator, it is important that the laminated porous film is chemical-resistant.

The density of the polyethylene is set to favorably 0.920 to 0.970 g/cm$^3$, more favorably 0.930 to 0.970 g/cm$^3$, and most favorably 0.940 to 0.970 g/cm$^3$. When the density is not less than 0.920 g/cm$^3$, it is possible to form the first layer having a proper shut-down temperature, which is preferable. When the density is not more than 0.970 g/cm$^3$, it is possible to form the laminated porous film having the first layer having a proper shut-down temperature, and in addition the stretchability can be maintained, which is preferable. The density can be measured by using a density gradient tube method in accordance with JIS K7112.

Although the melt flow rate (MFR) of the polyethylene is not specifically limited, the melt flow rate thereof is set to favorably 0.5 to 15 g/10 minutes and more favorably 1.0 to 10 g/10 minutes. When the MFR is not less than 0.5 g/10 minutes, the melt viscosity of the resin is sufficiently low at a molding processing time and thus a high productivity can be obtained, which is preferable. When the MFR is not more than 15 g/10 minutes, the melt viscosity thereof is close to that of the polypropylene resin. Thus it is possible to obtain an improved dispersibility and consequently a homogenous laminated porous film.

The MFR is measured in accordance with JIS K7210 in the condition where temperature is 190° C. and a load is 2.16 kg.

The method of producing the LM resin represented by the polyethylene resin whose crystal fusion peak temperature is not less than 100° C. nor more than 150° C. is not limited to a specific one, but it is possible to exemplify known polymerization method using a known olefin polymerization catalyst, for example, a multi-site catalyst represented by a Ziegler-Natta type catalyst and a single-site catalyst represented by a Metallocene catalyst.

The break-down characteristic is imparted to the second layer composed of the composition containing the HM resin whose crystal fusion peak temperature is higher than that of the polypropylene resin.

The thermal property of the HM resin contained in the second layer is important. That is, it is necessary to so select the HM resin that the crystal fusion peak temperature of the composition composing the second layer is higher than that of the polypropylene resin (A).

The crystal fusion peak temperature of the HM resin is set to not less than 170° C., favorably not less than 175° C., more favorably not less than 180° C., and most favorably not less than 200° C. The upper limit of the crystal fusion peak temperature of the HM resin is set to preferably 400° C.

The crystal fusion peak temperature of the HM resin is a peak value of the crystal fusion temperature detected when the HM film is heated at a heating speed of 10 C/minute in accordance with JIS k7121 by using the differential scanning calorimeter.

As the HM resin having a higher crystal fusion peak temperature than the polypropylene resin, the HM resin, whose crystal fusion peak temperature is not less than 170° C., which is used in the second embodiment is used. More specifically it is possible to preferably use polyester resin, polystyrene resin, fluorine resin, and polymethylpentene. Olefin resin and the fluorine resin are preferable as the HM resin from the standpoint of resistance to chemicals in using the laminated porous film as the battery separator.

As necessary it is possible to use a mixture of not less than two kinds of resins for the second layer. In this case, in a range in which the use of the mixture does not damage the heat resistance of the laminated porous film, namely, the BD characteristic thereof, a mixture of not less than two kinds of the HM resins or a mixture of the HM resin and other thermoplastic resin are preferably used. The mixture of not less than two kinds of the HM resins is especially preferable.

It is preferable that in the second layer, the mass (total mass, when a plurality of the HM resins is used) of the HM resin is 70 mass % for the total mass of the resin component of the second layer. The mass of the HM resin is favorably not less than 80 mass %, more favorably not less than 90 mass %, and most favorably not less than 100 mass %

As other thermoplastic resins that can be mixed with the HM resin, it is possible to exemplify the polyolefin resin such as the low-density polyethylene, the high-density polyethylene, the linear low-density polyethylene, and the ethylene-vinyl acetate copolymer. Above all, it is preferable to use the polyolefin resin as the other thermoplastic resin from the standpoint of the resistance to chemicals in using the laminated porous film as the battery separator.

The composition of the second layer may contain a substance which enhances the formation of the porous structure. It is preferable that the composition of the second layer contains a filler. By so doing, it is possible to efficiently produce the porous structure and control the configuration of pores.

Because the filler to be contained in the composition of the second layer is similar to that used in the first embodiment, the description thereof is omitted herein.

The plasticizer described in the first embodiment may be contained in the composition of the second layer. In adding the filler to the resin of the second layer, it is preferable to add the plasticizer to the resin to improve the dispersibility of the filler.

Similarly to the first embodiment, in addition to the above-described components, the composition of the first and second layers may contain an appropriate amount of ordinary additives in a range in which they do not conspicuously inhibit the effect of the present invention.

Similarly to the first embodiment, provided that the laminated porous film of the fourth embodiment has the first and second layers composing the fundamental construction thereof, the number of layers of the laminated porous film may be increased.

Because the thickness and configuration of the laminated porous film of the fourth embodiment are similar to those of the laminated porous film of the first embodiment, the description thereof is omitted herein.

Similarly to the first through third embodiments, the laminated porous film of the fourth embodiment has the air permeability resistance of 1 to 10000 seconds/100 ml, the porosity of 5 to 80%, and the pin puncture strength at not less than 1.5N. Similarly to the first embodiment, the anisotropy is also set small.

The method of producing the laminated porous film of the fourth embodiment is similar to that of the first embodiment.

It is possible to exemplify a preferable method of forming the laminated unporous membrane material having a two-kind three-layer construction by carrying out the T die co-extrusion by using the thermoplastic resin composition consisting of the mixed resin of the polypropylene resin (PP resin) and the thermoplastic resin (LM resin) whose crystal fusion peak temperature is lower than that of the polypropylene resin and is not less than 100° C. to compose the first layer and the filler-containing thermoplastic resin composition consisting the thermoplastic resin (HM resin) whose crystal fusion peak temperature is higher than that of the polypropylene resin (PP resin) to compose the second layer and biaxially stretching the laminated unporous membrane material to allow the obtained laminated unporous film to become porous by carrying out the filler method.

Similarly to the first through third embodiments, the laminated porous film of the fourth embodiment is suitably used as the separator for the nonaqueous electrolyte battery such as the lithium-ion rechargeable battery shown in FIG. 1.

Examples 3-1 Through 3-5, Reference Example 3-1 and Comparison Examples 3-2 Through 3-3

Similarly to the second and third embodiments, the materials for the first layer shown in table 5 were supplied to the same-direction twin screw extruder (diameter: 30 mm ϕ, L/D=30) produced by Techno Bell Co., Ltd. Pellets for the second layer shown below were supplied to the same-direction twin screw extruder (diameter: 40 mm ϕ, L/D=32) produced by Toshiba Machine Co., Ltd. After the materials for the first and second layers were fused and mixed with each other at 280° C. respectively, they were extruded from the T die via the mono-layer feeding block, the two-kind two-layer feeding block or the two-kind three-layer feeding block. After the materials of each of the first and second layers were picked up by the cast roll having the temperature shown in table 2, the materials were cooled to solidify them. Thereby membrane materials each having a width of 300 mm and a thickness of 180 μm were obtained.

After the obtained membrane materials were vertically stretched by using a film roll vertically stretching machine between rollers at the stretching temperature and the stretching magnification shown in table 5, the membrane materials were horizontally stretched by using a film tenter equipment produced by Kyoto Machinery Co., Ltd. at the stretching temperature and the stretching magnification shown in table 5. Thereafter thermal relaxation was performed to obtain a laminated porous film.

Materials used for the first layer are as shown below.
(A) Polypropylene resins, namely, PP-1, βPP-1, and βPP-2 were identical to those used in the examples of the first embodiment.
(B) Resins shown below were used as the resin (LM resin) whose crystal fusion peak temperature is lower than that of the polypropylene resin and is not less than 100° C.
PE-1: High-density polyethylene "HI-ZEX HZ2200 (commercial name)" produced by Prime Polymer Corporation, (MFR: 5.2 g/10 minutes, Tm: 134° C., Density: 0.964 g/cm$^3$)
PE-2: Straight-chain low-density polyethylene "Yumeritto 3540 F (commercial name)" produced by Ube Industries Ltd., (MFR: 4.0 g/10 minutes, Tm: 123° C., Density: 0.931 g/cm$^3$)
PE-3: Straight-chain low-density polyethylene "KernelKF260 (commercial name)" produced by Japan Polyethylene Corporation, (MFR: 2.0 g/10 minutes, Tm: 93° C., Density: 0.903 g/cm$^3$)
PP-2: Metallocene polypropylene "Uintekku WFX6 (commercial name)" produced by Japan Polypropylene Corporation, (MFR: 2.0 g/10 minutes, Tm: 125° C., Density: 0.900 g/cm$^3$)

Materials shown below were used for the second layer.
(C) Resin whose crystal fusion peak temperature is higher than that of the polypropylene resin
HR-1: Polymethylpentene "TPX RT-18 (commercial name)" produced by Mitsui Chemicals Inc. (MFR: 26 g/10 minutes, density: 0.833 g, Tm: 237° C.)
(D) Filler
FL-1: Barium sulfate "B55 (commercial name)" produced by Sakai Chemical Co., Ltd. (average particle diameter: 0.66 μm)
(E) Plasticizer
PL-1: "Hicaster Wax HCOP (commercial name)" produced by Hokoku Oil Mill Co., Ltd.
Production of Pellet for Second Layer The above-described materials were blended with each other by hand at a mass ratio of HR-1/FL-1/PL-1=47.5/50/2.5 and were supplied to the same-direction twin screw extruder (diameter: 30 mm ϕ, L/D=30) produced by Techno Bell Co., Ltd. Thereafter the materials were kneaded at 280° C. to obtain a pellet for the second layer.

In table 1, the pellet was shown as HR-CPD1.

TABLE 5

| Item | | Example 3-1 | Example 3-2 | Example 3-3 | Example 3-4 | Example 3-5 | Comparison example 3-1 | Comparison example 3-2 | Comparison example 3-3 |
|---|---|---|---|---|---|---|---|---|---|
| First layer (I) | βPP-1 | 70 | 60 | | 60 | 75 | 70 | 100 | 70 |
| | βPP-2 | | | 75 | | | | | |
| | PE-1 | 30 | | 25 | 20 | | | | 30 |
| | PE-2 | | 40 | | 20 | | | | |
| | PE-3 | | | | | | 30 | | |
| | PP-2 | | | | | 25 | | | |

TABLE 5-continued

| Item | | Example 3-1 | Example 3-2 | Example 3-3 | Example 3-4 | Example 3-5 | Comparison example 3-1 | Comparison example 3-2 | Comparison example 3-3 |
|---|---|---|---|---|---|---|---|---|---|
| Second layer (II) | HR-CPD1 | 100 | 100 | 100 | 100 | 100 | 100 | | |
| Construction | Construction of layers | (II)/(I) | | | (II)/(I)/(II) | | | (I) | |
| | Ratio between layers | 1/1 | | 1/1/1 | 1/2/1 | 1/1/1 | 1/2/1 | Monolayer | |
| Condition in production | Temperature (° C.) of cast roll | 125 | 120 | 120 | 120 | 120 | 105 | 125 | 120 |
| | Temperature (° C.) in vertical stretching | 90 | 85 | 85 | 80 | 95 | 90 | 90 | 85 |
| | Magnification in vertical stretching | 4 | 3 | 4 | 4 | 3 | 3 | 3 | 3 |
| | Temperature (° C.) in horizontal stretching | 130 | 120 | 125 | 120 | 125 | 95 | 130 | 130 |
| | Magnification in horizontal stretching | 4 | 5 | 4 | 4 | 4 | 3 | 5 | 5 |
| | Relaxation temperature (° C.) | 130 | 120 | 125 | 125 | 125 | 80 | 130 | 130 |
| | Relaxation ratio(%) | 5 | 2 | 3 | 3 | 4 | 0 | 0 | 3 |

Various properties of the obtained films of the examples and comparison examples were measured and evaluated. Tables 5 and 6 show the results.

The break-down characteristic, ratio among the thicknesses of layers, thickness, air permeability resistance (gare value), pin puncture strength, porosity, β activity, and β crystal generation power of each film were measured in a manner similar to that carried out in the examples of the first embodiment.

The air permeability resistance and the pin puncture strength were evaluated based on standards similar to those of the examples of the second embodiment.

Shut-Down Characteristic

The obtained specimen film was cut squarely in a dimension of 60 mm (vertical length)×60 mm (horizontal length). As shown in FIG. 2A, the specimen film was sandwiched between two aluminum plates (material: JIS standard A5052, size: 60 mm (vertical length), 60 mm (horizontal length, 1 mm (thickness)) where a circular hole having a diameter of 40 mm φ is formed at a central portion. As shown in 2B, the periphery of the specimen film was bound with clips (double clip "Christo-J35" (commercial name) produced by Kokuyo Co., Ltd.)

The specimen film bound with the two aluminum plates was put in an oven (Tabai gear oven "GPH200" produced by Tabai Espec Corporation, damper was closed) whose temperature was set to 100° C. or 160° C. After the internal temperature of the oven reached each temperature, the specimen film was held therein for three minutes. Thereafter the specimen film was taken out of the oven immediately to cool the specimen film in an atmosphere set to 25° C. for 30 minutes with the specimen film being bound with the two aluminum plates. Thereafter the specimen film was taken out of the aluminum plates to measure the air permeability resistance of the laminated porous film at its circular portion, having a diameter of 40 mm φ, which was disposed at the central portion of the specimen film in accordance with JIS P8117.

Samples whose air permeability resistances after the heat treatment is carried out at a high temperature became not less than 10 times as large as the air permeability resistance before heat treatment is carried out were marked with ●, whereas samples whose air permeability resistances became less than 10 times were marked with ○.

In the present invention, the preferable shut-down temperature exceeds 100° C. and is not more than 160° C. Thus in the evaluation made in the present invention, it is preferable that the air permeability resistance does not increase at 100° C. and is thus marked with ○ and increases owing to shut-down at 160° C. and is thus marked with ●.

When the film cannot be cut in a dimension of 60 mm×60 mm, a specimen may be prepared by adjusting the position of the film so that film is mounted at the circular hole, having the diameter of 40 mm φ, which is disposed at the central portion of the aluminum plate.

TABLE 6

| Items to be evaluated | | Example 3-1 | Example 3-2 | Example 3-3 | Example 3-4 | Example 3-5 | Reference example 3-1 | Comparison example 3-2 | Comparison example 3-3 |
|---|---|---|---|---|---|---|---|---|---|
| Shut-down characteristic | 100° C. | ○ | ○ | ○ | ○ | ○ | ● | ○ | ○ |
| | 160° C. | ● | ● | ● | ● | ● | ● | ○ | ● |
| Break-down temperature (° C.) | 200° C. | ○ | ○ | ○ | ○ | ○ | ○ | X | X |
| Thickness (μm) | | 24 | 24 | 22 | 22 | 28 | 34 | 24 | 23 |
| Air permeability resistance (second/100 ml) | | 282 ⊚ | 462 ⊚ | 722 ○ | 451 ⊚ | 623 ○ | 56480 X | 435 ⊚ | 243 ⊚ |
| Pin puncture strength (N) | | 2.48 ○ | 2.20 ○ | 3.25 ⊚ | 3.29 ⊚ | 3.45 ⊚ | 4.23 ⊚ | 3.65 ⊚ | 1.12 X |

TABLE 6-continued

| Items to be evaluated | Example 3-1 | Example 3-2 | Example 3-3 | Example 3-4 | Example 3-5 | Reference example 3-1 | Comparison example 3-2 | Comparison example 3-3 |
|---|---|---|---|---|---|---|---|---|
| Porosity (%) | 60 | 56 | 57 | 53 | 55 | 44 | 55 | 64 |
| β activity | ◯ | ◯ | ◯ | ◯ | ◯ | ◯ | ◯ | ◯ |
| β crystal generation power | ◯ | ◯ | ◯ | ◯ | ◯ | ◯ | ◯ | ◯ |

As shown in table 6, in the film of the comparison example 3-1 containing the polyethylene whose crystal fusion peak temperature is 93° C., pores are closed at 100° C. and did not display the shut-down characteristic in a temperature range more than 100° C. and not more than 160° C. Further the film could not be made sufficiently porous and has a very large air permeability resistance.

In the film of the comparison example 3-2 which did not contain the LM resin nor had the second layer, pores were not closed even at 160° C. nor displayed the shut-down characteristic in a temperature range more than 100° C. and not more than 160° C. The film was low in its heat resistance and thus braked at 200° C. and insufficient in its break-down characteristic.

In the film of the comparison example 4-3 which did not have the second layer, the film was low in its heat resistance and thus broke at 200° C. and insufficient in its break-down characteristic. The film had a low pin puncture strength less than 1.5N and an insufficient strength.

On the other hand, the films of the examples 3-1 through 3-5 of the present invention had an air permeability resistance suitable for the battery separator and a proper degree of strength. In addition the films had favorable shut-down and break-down properties.

The laminated porous film of the fifth embodiment is described below.

The laminated porous film of the fifth embodiment has at least three layers, namely, first, second, and third porous layers.

Specifically the laminated porous film is composed of the first layer (PP layer) consisting of a composition containing the polypropylene resin of the first embodiment, the second layer (HR layer) consisting of a composition having a peak value of the crystal fusion temperature higher than a peak value of the crystal fusion temperature of the composition of the first layer, and the third layer, laminated on the first and second layers, which consists of a composition having a peak value of the crystal fusion temperature lower than a peak value of the crystal fusion temperature of the composition of the first layer. Similarly to the above-described embodiments, the laminated porous film has the β activity and/or the β crystal generation power.

The first and second layers of the fifth embodiment are similar to those of the first embodiment. The first layer is the porous layer consisting of the composition, containing the polypropylene resin, which has a large number of fine pores intercommunicable in the thickness direction thereof. The composition of the first layer contains the β crystal nucleating agent at 70 mass % for the entire mass of the first layer. The second layer consists of the composition containing the thermoplastic resin having a peak value in the crystal fusion peak temperature at not less than 200° C. Because the details of the first and second layers are similar to those of the first layer, the description thereof is omitted herein.

Similarly to the first embodiment, it is preferable that the composition of the second layer contains the filler to enhance the heat resistance and porosity thereof. The kind of the filler to be used in the fifth embodiment and the mixing amount thereof are similar to those of the first embodiment.

The third layer is the porous layer consisting of the composition having a peak value of the crystal fusion temperature lower than that of the crystal fusion temperature of the composition of the first layer.

The third layer has a large number of fine pores intercommunicable in the thickness direction thereof. If the fine pores of the third layer are closed at a temperature lower than a temperature at which the first layer is closed, the third layer may have any constructions. For example, the third layer may have a construction in which fine pores are formed in a membrane material consisting of a thermoplastic resin composition or a construction in which particulate or fibrous micro substances aggregate to form a layer and gaps between the micro substances form the fine pores. It is preferable that the third layer of the fifth embodiment has the former construction which allows the fine pores to be formed uniformly and the porosity and the like to be controlled easily.

The thermoplastic resin contained in the thermoplastic resin composition composing the third layer contains the thermoplastic resin (LM resin) having the peak value of the crystal fusion temperature at not less than 100° C. nor more than 150° C. Thereby the third layer is formed as a shut-down layer having a function of closing pores at not less than 100° C. nor more than 150° C. The crystal fusion peak temperature of the LM resin is a peak value of the crystal fusion temperature detected when the thermoplastic resin is heated at a heating speed of 10 C/minute in accordance with JIS k7121 by using the differential scanning calorimeter.

The LM resin consists of the polyethylene resin or the like and is identical to the LM resin used in the four embodiments. Thus the description thereof is omitted herein. As necessary a mixture of not less than two kinds of resins may be used for the third layer as the LM resin.

When the polyolefin resin is used as the LM resin, as other thermoplastic resins which can be mixed therewith, it is possible to list styrene resin such as styrene, AS resin, ABS resin, and PMMA resin; ester resin such as polyvinyl chloride resin, fluorine resin; polyethylene terephthalate, polybutylene terephthalate, polycarbonate, and polyarylate; ether resin such as polyacetal, polyphenylene ether, polysulfone, polyether sulfone, polyether ether ketone, and polyphenylene sulfide; and polyamide resin such as nylon 6, nylon 6-6, and nylon 6-12.

As necessary, similarly to the second layer, a rubber component such as the thermoplastic elastomer may be added to the resin of the third layer in a range in which the addition thereof does not inhibit the heat-resistant property, namely, the SD characteristic of the laminated porous film. It is possible to use the thermoplastic elastomer similar to those used for the second layer.

Additives to be ordinarily added to the resin composition may be added to the resin of the third layer in a range in which the addition of the additives does not inhibit the object of the present invention and the properties of the third layer. Specifically the additives to be added to the first and second layers can be added to the third layer.

To enhance the porosity of the third layer, it is possible to add filler similar to the resin used for the second layer to the resin of the third layer and a plasticizer to the resin of the third layer to improve the dispersibility of the filler.

The construction of the laminated porous film having the first, second, and third layers laminated one upon another is not limited to a specific construction.

Regarding the lamination ratio among the first, second, and third layers, the ratio of the first layer, the second layer, and the third layer to the whole thickness of the laminated porous film is set to favorably 5 to 90% respectively, more favorably 10 to 80% respectively, and most favorably 15 to 70% respectively. When the ratio of any one of the first layer, the second layer, and the third layer to the whole thickness of the laminated porous film is less than 5%, there is a possibility that the layer having the lamination ratio at less than 5% does not sufficiently function. Therefore it is preferable that the ratio of each of the first layer, the second layer, and the third layer to the whole thickness of the laminated porous film is not less than 5%.

Similarly to the above-described embodiments, the laminated porous film is flat or tubular. It is preferable that the laminated porous film is flat and has a thickness of 1 to 500 μm.

The properties of the laminated porous film of the present invention can be freely adjusted according to the composition of the first, second, and third layers, the number of layers to be laminated, the ratio among the thicknesses of layers to be laminated, the combination of the first, second, and third layers and other layers having properties other than those of the first, second, and third layers, and a production method.

One of the characteristics of the laminated porous film of the present invention is that it has both the SD characteristic and the BD characteristic. That is, the laminated porous film is capable of displaying the SD characteristic at a temperature lower than the peak value of the crystal fusion temperature of the propylene resin (A) and the BD characteristic at a temperature higher than the peak value of the crystal fusion temperature thereof.

The second layer is formed as a heat-resistant layer consisting of the composition containing the thermoplastic resin having the peak value of its crystal fusion temperature at not less than 200° C., thus displaying the BD characteristic at a temperature not less than 200° C. The third layer is formed as a shut-down layer consisting of the thermoplastic resin contained in the thermoplastic resin composition containing the thermoplastic resin having the peak value of its crystal fusion temperature at not less than 100° C. nor more than 150° C., thus displaying the SD characteristic at a temperature not less than 100° C. nor more than 150° C.

SD Characteristic

The laminated porous film is characterized in that it displays the SD characteristic at not less than 100° C. nor more than 150° C. That is, the shut-down temperature of the laminated porous film of the present invention is not less than 100° C. nor more than 150° C., favorably not less than 110° C. nor more than 145° C., and more favorably not less than 112° C. nor more than 140° C.

As a means for adjusting the shut-down temperature to a desired temperature in the range not less than 100° C. nor more than 150° C., the thermoplastic resin (C) having a peak value close to a desired shut-down temperature of the crystal fusion temperature is selected as the thermoplastic resin (C) contained in the third layer or the ratio of the third layer to the other layers is increased or decreased.

BD Characteristic

The laminated porous film is also characterized in that it displays the BD characteristic at not less than 200° C.

As a means for adjusting the break-down temperature to a desired temperature in the range not less than 200° C., the thermoplastic resin (B) having a peak value of the crystal fusion temperature close to the desired break-down temperature is selected as the thermoplastic resin (B) contained in the second layer. As another means, the ratio of the second layer to the other layers is increased or decreased.

The properties of the laminated porous film of the fifth embodiment are similar to those of the above-described other embodiments. Therefore the air permeability resistance is 1 to 10000 seconds/100 ml, the porosity is 5 to 80%, and the pin puncture strength is not less than 1.5N. Further the anisotropy is small.

The method of producing the laminated porous film of the fifth embodiment is similar to those of the above-described embodiments.

It is possible to exemplify a method of forming the laminated unporous membrane material consisting of at least three layers including the first, second, and third layers having the two-kind three-layer construction by carrying out the T die co-extrusion by using the thermoplastic resin composition containing the polypropylene resin to compose the first layer, the filler-containing thermoplastic resin composition having a higher peak value of its crystal fusion temperature than that of the crystal fusion temperature of the polypropylene resin to compose the second layer, and the filler-containing thermoplastic resin composition having a peak value of its crystal fusion temperature lower than that of the crystal fusion temperature of the polypropylene resin to compose the third layer and stretching the laminated unporous membrane material to allow the obtained laminated unporous film to become porous.

As a preferable method of producing the laminated porous film of the fifth embodiment, it is possible to exemplify a method of forming the laminated unporous membrane material having a three-kind three-layer construction by the T die co-extrusion to allow the obtained laminated porous film to be porous by carrying out the filler method by using the thermoplastic resin composition, containing the polypropylene resin, which has the β activity and/or the β crystal generation power to compose the first layer, the filler-containing thermoplastic resin composition having a peak value of the crystal fusion temperature higher than that of the crystal fusion temperature of the polypropylene resin to compose the second layer, and the filler-containing thermoplastic resin composition having a peak value of the crystal fusion temperature lower than that of the crystal fusion temperature of the polypropylene resin to compose the third layer and biaxially stretching the laminated unporous membrane material to allow the obtained laminated porous film to become porous.

Specifically the propylene resin and the β crystal nucleating agent composing the first layer are mixed with each other with a Henschel mixer, a super mixer or a tumbler-type mixer or all components are put in a bag and mixed with each other by hand. Thereafter the components are fused and kneaded with a uniaxial extruder, a twin screw extruder or a kneader, preferably with the twin screw extruder to pelletize the components.

Similarly to the operation to be performed in producing the first layer, the thermoplastic resin, the filler, the plasticizer, and additives as desired all composing the second layer are mixed with one another with the Henschel mixer or the like.

Thereafter the components are fused and kneaded with the uniaxial extruder or the twin screw extruder to pelletize the components.

Similarly to the operation to be performed in producing the first layer, the thermoplastic resin, the filler, the plasticizer, and additives as desired all composing the third layer are mixed with one another with the Henschel mixer or the like. Thereafter the components are fused and kneaded with the uniaxial extruder or the twin screw extruder to pelletize the components.

The pellet of the resin composition for the first layer, the pellet of the resin composition for the second layer, and the pellet of the resin composition for the third layer are supplied to the extruders respectively to extrude them from a co-extrusion mouthpiece of a T die. The extruded laminated unporous membrane material is bi-axially stretched to form a fine porous structure in each extruded laminated unporous membrane material. In this manner, the porous film having three layers laminated one upon another is produced.

Because the method of producing the laminated porous film of the fifth embodiment is similar to that of the first embodiment, the description thereof is omitted herein.

Examples 4-1 Through 4-5 and Comparison Examples 4-1 Through 4-2, Reference Example 4-3

The structure of the first layer is identical to that of the first layer of the first embodiment. As the propylene resin, PP-1, βPP-1, and βPP-2 were used.

The structure of the second layer is identical to that of the second layer of the first embodiment. As the thermoplastic resin, polymethylpentene resin "TPXRT-18" (HR-1) produced by Mitsui Chemicals Inc. was used. As the Filler, barium sulfate "B55 (FL-1)" produced by Sakai Chemical Co., Ltd. was used. As the plasticizer, "Hicaster Wax HCOP" produced by Hokoku Oil Mill Co., Ltd. was used.

The components were blended with each other at a rate of HR-1/FL-1/PL-1=47.5/50/2.5 and supplied to the twin screw extruder (diameter: 40 φ, L/D=32) produced by Toshiba Machine Co., Ltd. After the components were fused and mixed with each other at a set temperature of 260° C., a strand was cooled in a tank to solidify it. Thereafter the strand was cut with a pelletizer to prepare a pellet. The pellet was shows as HR-CPD1 in table 7.

(C) Third Layer

As the thermoplastic resin, polyethylene "Nobatekku HD HY530 (PE-1)" produced by Japan Polyethylene Corporation was used. MFR of PE-1 is 0.55 g/10 minutes, and Tm is 134° C.

The filler and plasticizer used were identical to those of the second layer.

The components were blended with each other at the rate of PE-1/FL-1/PL-1=47.5/50/2.5 and supplied to the twin screw extruder (diameter: 40 mm φ, L/D=32) produced by Toshiba Machine Co., Ltd. After the materials were fused and mixed with each other at a set temperature of 220° C., a strand was cooled in a tank to solidify it. Thereafter the strand was cut with a pelletizer to prepare a pellet. The pellet is shown as HR-CPD1 in table 1.

After the pellet of each of the examples and the comparison examples prepared for each layer were supplied to a uniaxial extruder having a diameter of 40 mm, each pellet was extruded from the T die via a three-kind three-layer feeding block or a three-kind five-layer feeding block in the examples and a two-kind two-layer feeding block in the comparison examples. After each pellet was picked up by a cast roll having a temperature shown in table 7, the pellet was cooled to solidify it. Thereby a membrane material of each of the examples and the comparison examples having a width of 300 mm and a thickness of 180 μm was obtained. After the membrane material was vertically stretched at the stretching temperature and the stretching magnification shown in table 7 by using the film roll vertically stretching machine, the membrane material was horizontally stretched at the stretching temperature and the stretching magnification shown in table 7 by using a film tenter equipment produced by Kyoto Machinery Corporation. Thermal relaxation was performed in the condition shown in table 7 to obtain a laminated porous film of each of the examples and the comparison examples.

TABLE 7

| Kind | First layer (I) Kind of resin | Second layer (II) Kind of resin | Third layer (III) Kind of resin | Temperature (° C.) of cast roll | Vertical stretching Magnification @Temperature | Horizontal stretching Magnification @Temperature | Relaxation/ thermal fixing Relaxation ratio @Temperature |
|---|---|---|---|---|---|---|---|
| Example 4-1 | βPP-1 | HR-CPD1 | PE-CPD1 | 125 | 4 @70 | 5 @130 | 5% @125 |
| Example 4-2 | βPP-1 | HR-CPD1 | PE-CPD1 | 125 | 4 @70 | 5.5 @125 | 5% @125 |
| Example 4-3 | βPP-1 | HR-CPD1 | PE-CPD1 | 125 | 4.5 @70 | 6 @125 | 5% @125 |
| Example 4-4 | βPP-1 | HR-CPD1 | PE-CPD1 | 125 | 4 @70 | 5 @125 | 5% @125 |
| Example 4-5 | βPP-2 | HR-CPD1 | PE-CPD1 | 125 | 5 @70 | 5 @125 | 5% @125 |
| Comparison Example 4-1 | PP-1 | Uncontained | PE-CPD1 | 125 | 4 @70 | 5 @125 | 5% @125 |
| Comparison Example 4-2 | βPP-1 | Uncontained | PE-CPD1 | 125 | 4 @70 | 5 @125 | 5% @125 |
| Reference Example 4-3 | βPP-1 | HR-CPD1 | Uncontained | 125 | 4 @70 | 5 @125 | 5% @125 |

Various properties of the films of the examples and comparison examples were measured and evaluated. Table 8 shows the results.

The ratio among the thicknesses of layers, thickness, air permeability resistance (gare value), porosity, pin puncture strength, β activity, BD characteristic, β activity and β crystal generation power of each specimen film were measured in a manner similar to of the examples of the first embodiment.

The SD characteristic was measured and evaluated by carrying out a method described below.

Of temperatures at which the air permeability resistance after the heat treatment was carried out at a high temperature became not less than 10 times as large as the air permeability resistance before heat treatment was carried out, the lowest temperature was set as the shut-down temperature. Temperatures at which the air permeability resistance after the heat treatment was carried out at 99° C. became not less than 10 times as large as the air permeability resistance before the heat treatment was carried out were judged to be less than 100° C. Temperatures at which the air permeability resistance after the heat treatment was carried out at 150° C. did not become not less than 10 times as large as the air permeability resistance before the heat treatment was carried out were judged to exceed 150° C.

In the present invention, it is preferable that the shut-down temperature is not less than 100° C. nor more than 150° C. Thus the shut-down temperature was evaluated as follows:

○: The shut-down temperature is not less than 100° C. nor more than 150° C.

X: The shut-down temperature is less than 100° C. or more than 150° C.

When the film could not be cut in a dimension of 60 mm×60 mm, a specimen may be prepared by adjusting the position of the specimen so that the specimen is mounted at the circular hole, having the diameter of 40 mm φ, which is disposed at the central portion of the aluminum plate.

On the other hand, the laminated porous films of the examples 4-1 through 4-5 having the first through third layers whose structures are as specified in the present invention had the SD characteristic in the range of not less than 100° C. nor more than 150° C. and the BD characteristic at 200° C. In addition they had an air permeability resistance suitable for the battery separator and a proper degree of strength.

The laminated porous films of the first through fifth embodiments have a sufficient intercommunicable performance and yet maintain a necessary strength. In addition they are capable of displaying excellent BD characteristic. Therefore the laminated porous film can be preferably utilized as the battery separator.

What is claimed is:

1. A laminated porous film comprising:
at least two porous layers consisting of a first layer and a second layer laminated thereon,
wherein said first layer consists of a composition containing a β crystal nucleating agent and a mixed resin comprising a polypropylene resin and a resin whose crystal fusion peak temperature is lower than that of said polypropylene resin and is from 100° C. to 150° C. in a mixing mass ratio of propylene resin to resin whose crystal fusion peak temperature is lower than that of said polypropylene resin of 20:80 to 80:20; and
said second layer is a heat-resistant layer consisting of a resin composition whose crystal fusion peak temperature is higher than that of a resin composition of said first layer and not less than 200° C.;
said laminated porous film has a β activity and/or a β crystal generation power;
a shut down temperature of the laminated porous film at which pores of the porous layer are closed is set to a range of from 100° C. to 160° C.,

TABLE 8

|  | Construction of layer | Ratio between layers | Thickness (μm) | Air permeability resistance (second/100 ml) | Porosity (%) | Pin puncture strength (N) | SD characteristic | BD characteristic | β activity | β crystal generation power |
|---|---|---|---|---|---|---|---|---|---|---|
| Example 4-1 | (II)/(I)/(III) | 1/1/1 | 23 | 450 | 54 | 2.6 | ○ | ○ | ○ | ○ |
| Example 4-2 | (I)/(III)/(II) | 1/1/1 | 27 | 520 | 56 | 2.5 | ○ | ○ | ○ | ○ |
| Example 4-3 | (I)/(II)/(III) | 1/1/1 | 31 | 600 | 58 | 3 | ○ | ○ | ○ | ○ |
| Example 4-4 | (II)/(I)/(III)/(I)/(II) | 1/1/1/1/1 | 24 | 380 | 52 | 2.9 | ○ | ○ | ○ | ○ |
| Example 4-5 | (I)/(III)/(II) | 1/1/1 | 31 | 800 | 50 | 4 | ○ | ○ | ○ | ○ |
| Comparison example 4-1 | (I)/(III) | 1/1 |  |  |  | Could not be stretched |  |  |  |  |
| Comparison example 4-2 | (I)/(III) | 1/1 | 23 | 750 | 52 | 3 | ○ | X | ○ | ○ |
| Referfence example 4-3 | (I)/(II) | 1/1 | 27 | 620 | 50 | 3.1 | X | ○ | ○ | ○ |

The film of the comparison example 4-1 containing the polypropylene resin not having the β activity and having the two layers consisting of the first and third layers was broken when it was being stretched. Thus it was impossible to form a laminated porous film. The film of the comparison example 4-2 not having the second layer and having the two layers consisting of the first and third layers had the SD characteristic, but did not have the BD characteristic at 200° C. The film of the reference example 4-3 not having the third layer and having the two layers consisting of the first and second layers had the BD characteristic, but did not have the SD characteristic in the range of not less than 100° C. nor more than 150° C.

a break down temperature of the laminated porous film at which the laminated porous film breaks is not less than 200° C., and
a pin puncture strength of the laminated porous film is not less than 1.5 N.

2. The laminated porous film according to claim 1, wherein said resin whose crystal fusion peak temperature is not less than 100° C. nor more than 150° C. is polyethylene resin.

3. The laminated porous film according to claim 1, further comprising a third layer consisting of a composition whose crystal fusion peak temperature is lower than that of said composition of said first layer.

4. The laminated porous film according to claim 3, wherein said third layer contains a thermoplastic resin whose crystal fusion peak temperature is not less than 100° C. nor more than 150° C. and is formed as a shut-down layer having a function of closing pores at not less than 100° C. nor more than 150° C.

5. The laminated porous film according to claim 4, wherein said thermoplastic resin, of said third layer, whose crystal fusion peak temperature is not less than 100° C. nor more than 150° C. is polyethylene resin.

6. The laminated porous film according to claim 1, wherein said β crystal nucleating agent is mixed with said polypropylene resin at a ratio of 0.0001 to 5.0 parts by mass to 100 parts by mass of said polypropylene resin.

7. The laminated porous film according to claim 1, wherein said thermoplastic resin whose crystal fusion peak temperature is not less than 200° C. is at least one kind of a resin selected from a group consisting of a polyester resin, a polystyrene resin, a fluorine resin, and a polymethylpentene resin.

8. The laminated porous film according to claim 1, wherein an air permeability resistance is 1 to 10000 seconds/100 ml.

9. A separator for a battery comprising a laminated porous film as defined in claim 1 and having an air permeability resistance of 5 to 3000 seconds/100 ml.

10. The battery in which a separator for a battery as defined in claim 9 is incorporated.

* * * * *